US006314369B1

(12) United States Patent
Ito et al.

(10) Patent No.: US 6,314,369 B1
(45) Date of Patent: Nov. 6, 2001

(54) COMMUNICATIONS NAVIGATION SYSTEM, AND NAVIGATION BASE APPARATUS AND NAVIGATION APPARATUS BOTH USED IN THE NAVIGATION SYSTEM

(75) Inventors: Yasuo Ito; Takashi Sugawara; Naoki Gorai; Satoshi Kitano, all of Hokkaido (JP)

(73) Assignee: KabushikiKaisha Equos Research (JP)

( * ) Notice: Subject to any disclaimer, the term of this patent is extended or adjusted under 35 U.S.C. 154(b) by 0 days.

(21) Appl. No.: 09/345,479

(22) Filed: Jul. 1, 1999

(30) Foreign Application Priority Data

Jul. 2, 1998 (JP) .................................................. 10-187335
Jul. 8, 1998 (JP) .................................................. 10-192807
Nov. 20, 1998 (JP) .................................................. 10-330406

(51) Int. Cl.$^7$ ........................... G01C 21/00; G01S 13/00; G06G 7/00; G06G 17/00; G06G 19/00
(52) U.S. Cl. ........................... 701/209; 701/200; 701/201; 701/207; 701/208; 701/210; 340/990; 340/993; 340/995; 340/998; 455/32.1; 370/215; 370/252; 370/401; 370/480
(58) Field of Search ................................. 701/209, 210, 701/213, 207, 208, 200, 201, 102; 340/988, 990, 993, 995; 455/32.1; 714/746–749; 375/222; 345/335; 382/239; 370/480, 401, 252, 215

(56) References Cited

U.S. PATENT DOCUMENTS

| | | | | |
|---|---|---|---|---|
| 4,972,319 | * | 11/1990 | Delorme et al. | 364/419 |
| 5,513,110 | * | 4/1996 | Fujita et al. | 364/449 |
| 5,559,707 | * | 9/1996 | Delorme et al. | 364/443 |
| 5,948,040 | * | 9/1999 | Delorme et al. | 701/201 |
| 6,028,537 | * | 2/2000 | Suman et al. | 340/988 |
| 6,035,039 | * | 3/2000 | Tisdale et al. | 380/23 |
| 6,151,375 | * | 11/2000 | Nakatsugawa | 375/370 |
| 6,157,612 | * | 12/2000 | Weerackody et al. | 370/215 |
| 6,157,648 | * | 12/2000 | Voit et al. | 370/401 |
| 6,167,061 | * | 12/2000 | Nakatsugawa | 37/480 |
| 6,169,821 | * | 1/2001 | Fukunaga et al. | 382/239 |
| 6,178,199 | * | 1/2001 | Miller | 375/222 |

FOREIGN PATENT DOCUMENTS 0 81802 A2 * 1/1998 (EP) .

* cited by examiner

*Primary Examiner*—William A. Cuchlinski, Jr.
*Assistant Examiner*—Ronnie Mancho
(74) *Attorney, Agent, or Firm*—Lorusso & Loud

(57) ABSTRACT

In a communications navigation system, data is transmitted and received between a navigation base apparatus provided at a navigation base and each of a plurality of navigation apparatuses provided in moving bodies such as vehicles using communication. A determining section of the navigation base apparatus determines untraveled route portion by comparing user's information stored in a user information storage with information of a recommended route provided by a route search section. The navigation base apparatus extracts necessary route/guidance information for untraveled route portion determined by the determining section from route/guidance data stored in a database, and then transmits the extracted route/guidance data to the navigation apparatus identified by the identification information. The route/guidance information may be transmitted to the navigation apparatus in the form of segmented data. In this way, it becomes possible for the navigation apparatus to extract only the route/guidance information needed by the user from the route/guidance data stored in the database.

24 Claims, 33 Drawing Sheets

Fig. 4

| | Recommended Route | Destination | Departure Point | Date |
|---|---|---|---|---|
| Searched Route 1 | R24-R18-R11-R5 | Point "a" | Point "b" | February 18, 1997 |
| Searched Route 2 | R23-R16-R10-R6-R3 | Point "c" | Point "d" | October 25, 1997 |
| Searched Route 3 | R3-R6-R10-R16-R23 | Point "d" | Point "c" | October 26, 1997 |
| Searched Route 4 | R22-R15-R12-R10-R7-R8 | Point "e" | Point "f" | January 1, 1998 |

Fig. 5

| Road Number | R 3 | R 5 | R 6 | R 7 | R 8 | R 10 | R 11 |
|---|---|---|---|---|---|---|---|
| The Number of Times of Extraction | 2 | 1 | 2 | 1 | 1 | 3 | 1 |
| The Number of Times of Extraction of Road per Direction of Travel. | C4→C1 1 | C7→C3 1 | C5→C4 1 | C5→C6 1 | C6→C7 1 | C9→C5 1 | C11→C7 1 |
| | C1→C4 1 | | C4→C5 1 | | | C5→C9 1 | |

| Road Number | R 12 | R 15 | R 16 | R 18 | R 22 | R 23 | R 24 |
|---|---|---|---|---|---|---|---|
| The Number of Times of Extraction | 1 | 1 | 2 | 1 | 1 | 2 | 1 |
| The Number of Times of Extraction of Road per Direction of Travel. | C8→C9 1 | C12→C8 1 | C13→C9 1 | C15→C11 1 | C16→C12 1 | C17→C13 1 | C18→C15 1 |
| | | | C9→C13 1 | | | C13→C17 1 | |

Fig. 9

| | 1 | 2 | 3 | 4 | 5 | 6 | 7 |
|---|---|---|---|---|---|---|---|
| Road Numbers Included in the Recommended Route | R24 | R18 | R14 | R13 | R10 | R6 | R3 |
| Direction of Travel | C18→C15 | C15→C11 | C11→C10 | C10→C9 | C9→C5 | C5→C4 | C4→C1 |
| Traveled Route Information (a) | 1 | 1 | 0 | 0 | 0 | 0 | 0 |
| Traveled Route Information (b) | 0 | 0 | 0 | 0 | 1 | 1 | 1 |
| Traveled Route Information (c) | 0 | 0 | 0 | 0 | 0 | 0 | 0 |
| Traveled Route Information (d) | 0 | 1 | 0 | 0 | 1 | 0 | 0 |
| Traveled Route Information (e) | 1 | 1 | 0 | 0 | 2 | 1 | 1 |

| DATA OF RECOMMENDED ROUTE FROM DEPARTURE POINT (INTERSECTION C0) TO DESTINATION (INTERSECTION C5) | R100—R200—R300—R400—R500 |

(B)

| DATA OF RECOMMENDED ROUTE FROM DEPARTURE POINT (INTERSECTION C0) TO DESTINATION (INTERSECTION C5) | R100 | R200 | R300 | R400 | R500 |

Fig. 17

INDEX DATA

| | | |
|---|---|---|
| (a) | Road R100 | Length of Road R100 | Amount of Data included in Segmented Data for Road R100 |
| (b) | Road R200 | Length of Road R200 | Amount of Data included in Segmented Data for Road R200 |
| (c) | Road R300 | Length of Road R300 | Amount of Data included in Segmented Data for Road R300 |
| (d) | Road R400 | Length of Road R400 | Amount of Data included in Segmented Data for Road R400 |
| (e) | Road R500 | Length of Road R500 | Amount of Data included in Segmented Data for Road R500 |

| Road data | |
|---|---|
| Road Number | 65248 |
| Node Point Data | ND1, ND2, ········ |
| Road Name | xx road |
| Road Classification | Highway |
| Road Length | 45 Km |
| ⋮ | ⋮ |

(B)

| Intersection Data | |
|---|---|
| Intersection Number | 02564 |
| Intersection Name | Intersection xx |
| Intersection Position | Longitude:xx<br>Latitude:xx |
| ⋮ | ⋮ |

COMMUNICATIONS NAVIGATION SYSTEM, AND NAVIGATION BASE APPARATUS AND NAVIGATION APPARATUS BOTH USED IN THE NAVIGATION SYSTEM

BACKGROUND OF THE INVENTION

1. Field of the Invention

The present invention relates to a communications navigation system in which transmission and reception of data concerning position information and route/guidance information necessary for route guidance is carried out using communication between a navigation apparatus as a terminal which is mounted on a moving body such as a vehicle or formed into a portable mobile terminal and a navigation base apparatus acting as a base, thereby providing route information and guidance information (hereinafter, referred to as "route/guidance information" or "route/guidance data") to the navigation apparatus to carry out route guidance.

2. Description of the Prior Art

In the navigation systems commonly being used, a navigation apparatus is mounted on a moving body such as a vehicle, in which route guidance is carried out by utilizing map data stored in a recording medium such as CD-ROM provided in the respective vehicles. However, such systems require the user thereof to sometime buy new CD-ROMs in order to obtain new information concerning the construction of new roads and the abolition of old roads and the like. Further, when the type of recording medium is changed (e.g., to DVD-ROM) or when a different format is used with the same type of recording medium, the navigation apparatus must be replaced with other one that is suited for such new type recording medium or format.

In view of such problems, Japanese Laid-Open Patent Application No. HEI 10-19588 discloses a communications navigation system in which map images and recommended route data necessary for guiding a vehicle to a destination are transmitted from a navigation base (center) to a vehicle such as an automobile.

In more details, in this system, communication is carried out between a route/guidance data transmission system at the navigation base and a vehicle navigation apparatus mounted on the vehicle. The route/guidance data transmission system includes a database which stores data necessary for guiding a vehicle to a destination. In response to a request from the navigation apparatus, the route/guidance data transmission system carries out a route search to search a recommended route, and then reads out necessary route/guidance data from the database. After these operations are completed, the route/guidance data transmission system transmits the route/guidance data of the recommended route to the navigation apparatus. Then, the navigation apparatus displays guidance information based on the route/guidance data of the recommended route transmitted from the route/guidance data transmission system.

In the above-described conventional communications navigation system, all of the route/guidance data from the departure point to the destination produced at the navigation base is transmitted to the navigation apparatus as they are. In the vehicle, route/guidance information corresponding to the present position of the vehicle is successively displayed on the display of the navigation apparatus all over the route from the departure point to the destination.

However, the above-described communications navigation system involves the following problems.

(1) First, as described above, in the conventional communications navigation system, all of the route/guidance data from the departure point to the destination are transmitted to the vehicle. Therefore, the amount of the data to be transmitted becomes huge, so that it takes a long time to transmit the data and further it is necessary for the navigation apparatus to temporally store the huge amount of the transmitted data. Further, such a long data transmission time not only increases communication cost at the user but also lengthens the time required for processing the data. In particular, when the distance between the departure point and the destination is long, such increases in the communication time and communication cost reach a degree that can not be disregarded. Furthermore, such long communication time gives rise to communication rush, which in turn leads to a problem in that communication errors or communication interrupts are likely to occur.

Further, it seems that in many cases users recognize traveled roads on which the users have traveled in the past. In such cases, the users will be able to reach the destination without detailed route guidance if users can have route/guidance information only for untraveled portions in the route to the destination. This means that transmission of the route/guidance information for such traveled roads leads to increase in the amount of data to be transmitted.

(2) In the conventional navigation system, the route/guidance data to the destination is adapted to be transmitted by compressing it in order to shorten the time required for the data transmission. In this case, at the navigation apparatus that received the compressed data, the compressed data for all over the route is expanded at one time when the data is to be reproduced. Therefore, there is a problem in that a large load is given to the navigation apparatus and therefore a processing performance is lowered.

Further, the expanded route/guidance data must be stored in a storage device until the vehicle on which the navigation apparatus is mounted reaches the destination. In this case, since the data size of the expanded route/guidance data is too large, it is necessary to equip with a large capacity storage device in the navigation apparatus, which results in a problem in that the size of the storage device becomes too large.

Furthermore, when a communication error occurs during the data transmission from the navigation base, it becomes necessary to retransmit all the compressed route/guidance data to the destination again after the communication be restored, thus leading to further increase in the required communication time. Further, normally, the compressed route/guidance data forms single data as a whole. Therefore, in the case where a part of the route/guidance data has been already received before the occurrence of the communication error and then the remaining data has been received later after the restore of the communication, there is a case that it is difficult to process and reproduce the route/guidance data. This means that there is a problem in that restoring process is difficult when communication error occurs during the data transmission, so that it is not possible to provide the route/guidance information in an effective manner.

Moreover, when a communication error such as interruption of communication occurs during the data transmission, it is not possible to carry out route guidance until the communication be restored. This prevents the users from effectively utilize the route guidance, thus leading to, in the worst case, the situation that the user can not start from the present position.

(3) In the conventional communications navigation system described above, all the route/guidance data from the departure point to the destination produced at the navigation base apparatus is transmitted to the navigation apparatus. In this way, at the vehicle, route/guidance information corresponding to the current position of the vehicle is successively displayed in the display of the navigation apparatus.

However, in the case where vehicles return from the destination to the departure point, it is believed that most of the vehicles travel on the same road in the opposite direction not so long as there is a specific situation such as a road repair or the like. In this case, the navigation base searches the same route on the both directions thereof, and substantially the same route/guidance data is transmitted. Further, there is also a case where a part of the newly searched route is common with that of the previously searched route.

In the conventional communications navigation system, however, route/guidance data for a newly searched route is transmitted from the navigation base to the navigation apparatus every time upon a search request. Therefore, if there are common portions between the previously transmitted route/guidance data which is stored in the navigation apparatus and the route/guidance data for the newly searched route, the navigation base is required to transmit unnecessary route/guidance data. This results in unnecessary increase in the communication time and the communication costs.

SUMMARY OF THE INVENTION

The present invention has been made in view of the problems described above. Accordingly, an object of the present invention is to provide a communications navigation system which can shorten communication time and reduce communication cost.

Another object of the present invention is to provide a communications navigation system which can compactify the navigation apparatus.

Other object of the present invention is to provide a communications navigation system which can reduce the load at the navigation apparatus to improve the processing performance.

Yet another object of the present invention is to provide a reliable communications system which can prevent communication errors due to communication rush or the like.

Yet another object of the present invention is to provide a communications navigation system in which a user can obtain route/guidance information to a destination even when a communication error such as interruption of communication occurs.

Yet other object of the present invention is to reduce the amount of data to be transmitted from the navigation base to the moving body, shorten the time required for the data transmission and reduce the communication cost, by transmitting only unoverlapped necessary data to the navigation apparatus.

Yet other object of the present invention is to make it possible to carry out sufficient route guidance in spite of the reduced amount of data transmitted to the moving body.

In view of these objects as described above, the present invention is directed to a communications navigation system in which data is transmitted and received between a navigation base apparatus provided at a navigation base and each of a plurality of navigation apparatuses provided in moving bodies such as vehicles using communication. In the communications navigation system, at least one navigation apparatus in the plurality of the navigation apparatuses includes transmitting and receiving means for transmitting at least data concerning the current position of the moving body, the destination thereof and its identification information to the navigation base apparatus and for receiving data from the navigation base apparatus, and the navigation base apparatus includes route/guidance data storage means which stores route/guidance data therein, route search means for searching a recommended route based on the data of the current position of the vehicle and the destination thereof which have been received from the navigation apparatus, and determination means for determining, based on the identification information received from the navigation apparatus, necessary route/guidance information that a user of the moving body having the navigation apparatus needs to have with regard to the recommended route, wherein the navigation base apparatus extracts data corresponding to the necessary route/guidance information determined by the determination means from the route/guidance data stored in the route/guidance data storage means, and then transmits the extracted route/guidance data to the navigation apparatus identified by the identification information.

As described above, in the communications navigation system according to the present invention, when the navigation apparatus transmits a request for route/guidance data to the navigation base apparatus, the identification information which is used to identify the navigation apparatus is also transmitted. At the navigation base apparatus, the determination means determines based on the identification information necessary route/guidance information that is needed by the user of the vehicle on which the navigation apparatus is mounted with regard to the recommended route. Then, route/guidance information which has been determined by the determination means to be necessary route/guidance information is extracted from the route/guidance data stored in the route/guidance data storage means and the extracted route/guidance data is transmitted to the navigation apparatus identified by the identification information.

By determining the necessary route/guidance information that is needed by the user of the vehicle on which the navigation apparatus is mounted by referring to the identification information of the navigation apparatus and then transmitting the necessary data from the navigation base apparatus to the navigation apparatus, it becomes possible to reduce an amount of the data to be transmitted and to shorten the time required for the data transmission. Further, at the navigation apparatus, the amount of data to be stored can be reduced, thereby enabling to simplifying devices at the navigation apparatus.

In more details, in this invention, all the route/guidance data that are normally needed for route guidance are stored in the route/guidance data storage means. When current position information and destination information are received from the navigation apparatus, a recommended route is searched. Then, route/guidance data corresponding to the recommended route is extracted, and the extracted data is transmitted to the navigation apparatus identified by the identification information.

In this case, the plurality of the vehicles have traveled different routes in the past. Further, depending on the users of the vehicles, necessary route/guidance information are different from each other. Therefore, all of the users of the vehicles do not need to have the same route/guidance data. In view of the above, in the present invention, each navigation apparatus is identified by its identification information, and the necessary route/guidance information for the recommended route that is needed by the user of the navigation apparatus is determined by referring to the identification information. Then, only the thus determined necessary route/guidance information is extracted from the route/guidance data stored in the route/guidance data storage means and then only the extracted route/guidance data is transmitted to the navigation apparatus. In this way, the present invention responds to different requests from the respective navigation apparatuses, thereby enabling to reduce the amount of data to be transmitted to the moving bodies.

In the communications navigation system of the present invention, the determining means includes user's information storage means which stores the identification information of the respective navigation apparatuses and user's information for determining the necessary route/guidance data for respective users of the plurality of moving bodies on which the navigation apparatuses are mounted so that each identification information is associated with the corresponding user's information of the user of the moving body on which the navigation apparatus identified by the identification information is mounted, wherein the determination means determines the necessary route/guidance information for the respective user by referring to the user's information stored in the user information storage means.

By referring to such user's information, it becomes possible to determine as to whether the route/guidance information is needed by the user of the vehicle on which the navigation apparatus is mounted.

In this case, it is preferred that the determination means includes untraveled route portion determining means for determining an untraveled route portion which is a part of the recommended route on which the moving body having the navigation apparatus is considered to have not yet traveled, based on the user's information stored in the user's information storage means, wherein the navigation base apparatus extracts only route/guidance data for the untraveled route portion determined by the untraveled route portion determining means from the route/guidance data stored in the route/guidance data storage means as the necessary route/guidance data, and then transmits the extracted route/guidance data to the navigation apparatus identified by the identification information.

It seems that a user of the navigation apparatus does not need to have route/guidance data for the roads in the recommended route on which the user has traveled several times. Therefore, in such a case, it is sufficient for the user to have route/guidance data only for the untraveled portions in the recommended route. This makes it possible to reduce the amount of data to be transmitted to the navigation apparatus.

In this case, it is preferred that the user information storage means includes traveled route information storage means which stores information concerning traveled routes that the moving body on which the navigation apparatus is mounted is considered to have traveled in the past as the user's information, wherein the untraveled route portion determining means determines the untraveled route portion by comparing the traveled route information stored in the traveled route information storage means with the information of the recommended route provided by the route search means.

By referring to the traveled route information of the respective moving body in this way, it becomes possible to determine the untraveled route portion for each moving body.

The traveled route information can be produced based on the route/guidance data that has been transmitted from the navigation base apparatus to the navigation apparatus. Alternatively, the traveled route information can be produced based on route information that the navigation base apparatus has received from the navigation apparatus, in which the route information includes information concerning routes that the moving body on which the navigation apparatus is mounted has ever traveled.

Further, the untraveled route portion determining means may determine a portion of the recommended route as the untraveled route portion only in the case where the traveled route information shows that the vehicle has not yet traveled on the portion of the recommended route more than a predetermined number of times. This is because there is a case that each users has a different standard for the number of times of past travel for determining as to whether the portion of the recommended route should be the untraveled route portion or not. Further, there is also a case that a user wants to have route/guidance information for the traveled route portion, and on the contrary there is also a case that a user does not hope to have route/guidance information for the untraveled route portion. For these reasons, it is preferred that the number of times of past travel for determining as to whether a portion of the recommended route should be the untraveled route portion can be selected depending on the circumstances at the respective users. In this way, it becomes possible to satisfy desires of the respective users flexibly.

Further, in the present invention, it is preferred that the navigation base apparatus is constructed so as to be able to transmit the route/guidance data to the navigation apparatus in the form of divided route/guidance data for each of segments which are formed by dividing the recommended route into a plurality of parts.

By transmitting the route/guidance data for the untraveled route portion from the navigation base apparatus by dividing the route/guidance information into a plurality of segments as described above, it is possible to reduce the amount of data to be transmitted in each of the segments since each segment includes a small amount of data, thereby making it possible to reduce to be influenced by communication errors. Further, at the navigation apparatus, the received data can be processed in each of the segments, thereby improving data processing ability.

Furthermore, in the present invention, it is preferred that the navigation apparatus further includes data storage means for storing predetermined route/guidance data, data synthesizing means for synthesizing the route/guidance data received from the navigation base apparatus with the predetermined route/guidance data stored in the data storage means, and route guidance means for performing route guidance using the synthesized route/guidance data by the synthesizing means.

Namely, the navigation apparatus of the moving body stores predetermined route/guidance data in advance, and the route/guidance data received from the navigation base apparatus is synthesized with the stored predetermined route/guidance data to carry out route guidance using the synthesized data. Therefore, it is not necessary for the navigation base apparatus to transmit overlapped data that has been already stored in the navigation apparatus, thereby enabling to reduce an amount of data to be transmitted, shorten the time required for data transmission and reduce communication cost.

In this case, it is preferred that the predetermined data stored in the data storage means can be constituted from the route/guidance data which has been received from the navigation base apparatus. In such a case, the navigation base apparatus recognizes the data stored in the navigation apparatus based on the identification information, so that the navigation base apparatus transmits route/guidance data for the recommended route except for the predetermined data stored in the data storage means.

Another aspect of the present invention is directed to communications navigation system in which data is transmitted and received between a navigation base apparatus provided at a navigation base and each of a plurality of navigation apparatuses provided in moving bodies such as vehicles using communication. In this navigation system, at least one navigation apparatus in the plurality of the navigation apparatuses includes transmitting means for transmitting at least data concerning the current position of the destination thereof and its identification information to the navigation base apparatus, and receiving means for receiving data from the navigation base apparatus, and the navigation base apparatus includes route/guidance data storage means which stores route/guidance data therein, receiving means for receiving the data concerning the current position of the vehicle, the destination thereof and its identification information from any one of the navigation apparatuses, user information storage means which stores user's information which is used to specify route/guidance data to be transmitted to the respective navigation apparatuses, the user's information being prepared so as to be associated with each of the identification information, route searching means for searching a recommended route from the current position of the vehicle to a destination thereof based on the data of the current position of the vehicle and the destination thereof which have been received from the navigation apparatus, transmission data extracting means which determines necessary route/guidance data to be transmitted to the navigation apparatus specified by the identification information and then extracts data corresponding to the necessary route/guidance data from the route/guidance data stored in the route/guidance data storage means, and transmitting means for transmitting the route/guidance data extracted from the route/guidance data storage means to the navigation apparatus specified by the identification information.

Further, the other aspect of the present invention is directed to a navigation base apparatus for transmitting route/guidance data to a navigation apparatus which is mounted on a moving body such as a vehicle, the navigation base apparatus being separately located from the moving body. The navigation base apparatus comprises a data storage device which stores route/guidance data; receiving means for receiving data concerning a current position of the moving body and a destination of the moving body from the navigation apparatus of the moving body; determination means for determining a portion of a route to a destination which corresponds to the destination data received by the receiving means, for which a user of the moving body who has transmitted the data concerning the destination needs to have route/guidance information; extraction means for extracting route/guidance data for the portion of the route which has been determined by the determination means to be necessary for the user of the moving body from the route/guidance data stored in the data storage device; and transmitting means for transmitting the route/guidance data extracted by the extraction means to the navigation apparatus mounted on the moving body.

According to the navigation base apparatus constructed as described above, route/guidance data only for the portion of the route for which it is determined by the determination means that a user of the moving body needs to have route/guidance information is transmitted to the navigation apparatus, so that it is possible to reduce the amount of data to be transmitted and lower the communication cost.

In this case, it is preferred that the navigation base apparatus further comprises user information storage means which stores the identification information of the respective moving bodies and determination information which is used to determine the portion of the route for which the respective user needs to have route/guidance information so that each identification information is associated with the corresponding determination information, in which the receiving means receives the data concerning the current position of the moving body, the destination thereof and the identification information, and the determination means reads out the determination information corresponding to the identification information of the moving body received by the receiving means, and then determines based on the read out determination information the portion of the route in the route from the current position of the moving body to the destination thereof for which the user needs to have the route/guidance information.

Further, other aspect of the present invention is directed to a communications navigation system in which data is transmitted and received between a navigation base apparatus provided at a navigation base and each of a plurality of navigation apparatuses each provided in a moving body such as a vehicle using communication. In this navigation system, at least one navigation apparatus in the plurality of the navigation apparatuses includes transmitting and receiving means for transmitting at least data concerning the current position of the moving body, the destination thereof and its identification information to the navigation base apparatus and for receiving data from the navigation base apparatus, and the navigation base apparatus includes route/guidance data storage means which stores route/guidance data therein, and route search means for searching a recommended route based on the data of the current position of the moving body and the destination thereof which have been received from the navigation apparatus, wherein the navigation base apparatus is constructed so as to be able to transmit the route/guidance data to the navigation apparatus in the form of divided route/guidance data for each of segments which are formed by dividing the recommended route into a plurality of parts.

According to the communications navigation system described above, the route/guidance data for the searched recommended route is transmitted from the navigation base apparatus by dividing the route/guidance information into a plurality of segments as described above, it is possible to reduce the amount of data to be transmitted in each of the segments since each segment includes a small amount of data, thereby making it possible to reduce to be influenced by communication errors. Further, at the navigation apparatus, the received data can be processed in each of the segments, thereby improving data processing ability.

Yet other aspect of the present invention is directed to a navigation base apparatus for transmitting route/guidance data to a navigation apparatus which is mounted on a moving body such as a vehicle, the navigation base apparatus being separately located from the moving body. The navigation base apparatus comprises a data storage device which stores route/guidance data; receiving means for receiving data concerning a current position of the moving body and a destination of the moving body from the navigation apparatus mounted on the moving body; segmented data producing means for producing segmented data by dividing the route to the destination corresponding to the data from the current position of the moving body to the destination thereof into a plurality of portions and then extracting route/guidance data for the respective portions of the divided route; and transmitting means for transmitting the respective segmented data produced by the segmented data producing means to the moving body having the navigation apparatus identified by the identified information.

According to the navigation base apparatus described above, the route/guidance data for the searched recommended route is transmitted from the navigation base apparatus by dividing the route/guidance information into a plurality of segments as described above, it is possible to reduce the amount of data to be transmitted in each of the segments since each segment includes a small amount of data, thereby making it possible to reduce to be influenced by communication errors. Further, at the navigation apparatus, the received data can be processed in each of the segments, thereby improving data processing ability.

In this case, it is preferred that the transmitting means transmits the segmented data for a portion of the route for which the user needs to have the route/guidance information at first. Further, it is also preferred that the transmitting means transmits the plurality of segmented data produced by the segmented data producing means sequentially in the order beginning from the segmented data for a portion of the route which is the closest to the moving body. This allows the navigation apparatus to process the received segmented data to reproduce it as soon as the navigation apparatus receives each segmented data. Further, even when a communication error such as interruption of communication would occur during the data transmission, it is possible for the navigation apparatus to continue route guidance using the received segmented data that has been already received.

Further, in this case, it is also preferred that the navigation base apparatus further comprises communication error detecting means for determining as to whether the transmission and reception of the respective segmented data transmitted by the transmitting means has been carried out without any trouble and detecting a communication error for a segmented data transmission when the transmission and reception of the segmented data was incomplete, wherein when the communication error detecting means detects a communication error in the transmission of a specified segmented data, the remaining data beginning from the specified segment is retransmitted. In this way, it becomes unnecessary for the navigation base apparatus to retransmit all the route/guidance data again when a communication error would occur during the data transmission. This makes it possible to reduce the amount of data to be transmitted and to lower the communication cost.

Yet other aspect of the present invention is directed to a communications navigation system in which data is transmitted and received between a navigation base apparatus provided at a navigation base and each of a plurality of navigation apparatuses provided in moving bodies such as vehicles using communication. In this communications navigation system, at least one navigation apparatus in the plurality of the navigation apparatuses includes transmitting and receiving means for transmitting at least data concerning the current position of the vehicle and the destination thereof to the navigation base apparatus and for receiving data from the navigation base apparatus, and the navigation base apparatus includes route/guidance data storage means which stores route/guidance data therein, and route search means for searching a recommended route based on the data of the current position of the vehicle and the destination thereof which have been received from the navigation apparatus, in which the navigation base apparatus extracts data corresponding to the recommended route searched by the route search means from the route/guidance data stored in the route/guidance data storage means, and then transmits the extracted route/guidance data to the navigation apparatus, wherein the navigation apparatus further includes data storage means for storing predetermined route/guidance data, data synthesizing means for synthesizing the route/guidance data received from the navigation base apparatus with the predetermined route/guidance data stored in the data storage means, and route guidance means for performing route guidance using the synthesized route/guidance data by the synthesizing means.

In this communications navigation system, the navigation apparatus of the moving body stores predetermined route/guidance data in advance, and the route/guidance data received from the navigation base apparatus is synthesized with the stored predetermined route/guidance data to carry out route guidance using the synthesized data. Therefore, it is not necessary for the navigation base apparatus to transmit overlapped data that has been already stored in the navigation apparatus, thereby enabling to reduce the amount of data to be transmitted, shorten the time required for data transmission and reduce communication cost.

In the communications navigation system described above, it is preferred that the navigation apparatus is adapted to transmit identification information for identifying the navigation apparatus to the navigation base apparatus. The navigation base apparatus is constructed so as to be able to determine necessary route/guidance data to be transmitted to the navigation apparatus based on predetermined data related to the identification information received from the navigation apparatus, and extract data corresponding to the necessary route/guidance information from the route/guidance data stored in the route/guidance data storage means and then transmit the extracted data to the navigation apparatus identified by the identification information. Further, the data synthesizing means is constructed so as to be able to synthesize the route/guidance data received from the navigation base apparatus with the predetermined data stored in the data storage means.

In this case, it is further preferred that the predetermined route/guidance data stored in the data storage means includes the route/guidance data that has been received from the navigation base apparatus. In this way, it is possible for the navigation base apparatus to recognize the data stored in the navigation apparatus based on the identification information. Consequently, the navigation base apparatus is allowed to transmit only route/guidance data for the recommended route by excluding the predetermined data stored in the navigation apparatus.

Further, in the communications navigation system described above, the predetermined data stored in the data storage means may be constituted from guidance data associated with all routes. In this way, it becomes unnecessary for the navigation base apparatus to transmit any guidance data to the navigation apparatus, thereby enabling to further reduce the amount of data to be transmitted.

Yet other object of the present invention is directed to a navigation apparatus used in a communications navigation system in which data is transmitted and received between a navigation base apparatus provided at a navigation base and each of a plurality of navigation apparatuses provided in moving bodies such as vehicles using communication. In this navigation apparatus, each of the plurality of navigation apparatuses includes transmitting and receiving means for transmitting at least data concerning the current position of the vehicle, the destination thereof and its identification information to the navigation base apparatus and for receiving data from the navigation base apparatus. Further, the navigation base apparatus includes route/guidance data storage means which stores route/guidance data therein, and route search means for searching a recommended route based on the data of the current position of the vehicle and the destination thereof which have been received from the navigation apparatus, in which the navigation base apparatus extracts data corresponding to the recommended route searched by the route search means from the route/guidance data stored in the route/guidance data storage means, and then transmits the extracted route/guidance data to the navigation apparatus identified by the identification information. The navigation apparatus further includes data storage means for storing predetermined route/guidance data, data synthesizing means for synthesizing the route/guidance data received from the navigation base apparatus with the predetermined route/guidance data stored in the data storage means, and route guidance means for performing route guidance using the synthesized route/guidance data by the synthesizing means.

Yet other aspect of the present invention is directed to a navigation apparatus to be mounted on a moving body such as a vehicle for performing route guidance to a destination by receiving route data transmitted from a navigation base apparatus which is located separately from the moving body. The navigation apparatus comprises storage means which stores map data; receiving means for receiving route data transmitted from the navigation base apparatus; received data storage means for storing the route data received by the receiving means; detecting means for detecting the current position of the moving body; map data read out means for reading out map data for an area corresponding to the current position of the moving body detected by the detecting means; route data read out means for reading out route data for an area corresponding to the current position of the moving body from the received data storage means; and guidance means for performing route guidance based on data obtained by synthesizing the read out map data and the read out route data.

In this navigation apparatus, it is preferred that the map data storage means stores image data for backgrounds such as topographical map. Further, it is also preferred that the map data storage means stores image data for landmarks.

Other objects, structures and advantages of the present invention will be apparent when the following detailed description of the preferred embodiments will be considered taken in conjunction with the accompanying drawings.

BRIEF DESCRIPTION OF THE DRAWINGS

FIG. 4 is a chart which shows examples of recommended routes previously searched at the navigation base apparatus in response to recommended route search requests from the navigation apparatus.

FIG. 5 is a chart which represents traveled route information stored in a traveled route information storage at the navigation base apparatus.

FIG. 9 is a chart which shows a method of determining untraveled route portions by comparing the traveled route information with the searched recommended route.

FIG. 10 is a chart showing respective route/guidance information produced based on the results of the determination of the untraveled route portions shown in FIG. 9.

FIG. 14 is a chart showing data of recommended route searched by a route search section of the navigation base apparatus.

FIG. 17 shows the details of the index data in FIG. 16.

FIG. 24(A), FIG. 24(B) and FIG. 24(C) are tables which show examples of contents of road data, intersection data and route data, respectively, which are stored in a database of the navigation base apparatus.

DETAILED DESCRIPTION OF THE PREFERRED EMBODIMENTS

First, a general description of a communications navigation system according to the present invention will be given.

The communications navigation system according to the present invention carries out transmission and reception of data between a navigation base apparatus and each of a plurality of navigation apparatuses provided in moving bodies (e.g., motor vehicles) using communication.

Each of the navigation apparatuses is capable of transmitting data concerning the current position of the respective vehicle, the destination thereof and its identification information (ID data) to the navigation base apparatus.

The navigation base apparatus searches a recommended route based on the data of the current position of the vehicle and the destination thereof which have been transmitted from the navigation apparatus. Then, the navigation base apparatus extracts route/guidance data related to the searched recommended route and transmits such route/guidance data to the navigation apparatus identified by the ID data.

Next, with reference to the appended drawings, a detailed description will be given for a first embodiment of the communication-type navigation system according to the present invention.

First, with reference to FIG. 1, a detailed description will be given for the structure of the navigation apparatus used in the navigation system according to the first embodiment of the present invention.

Figure 1:
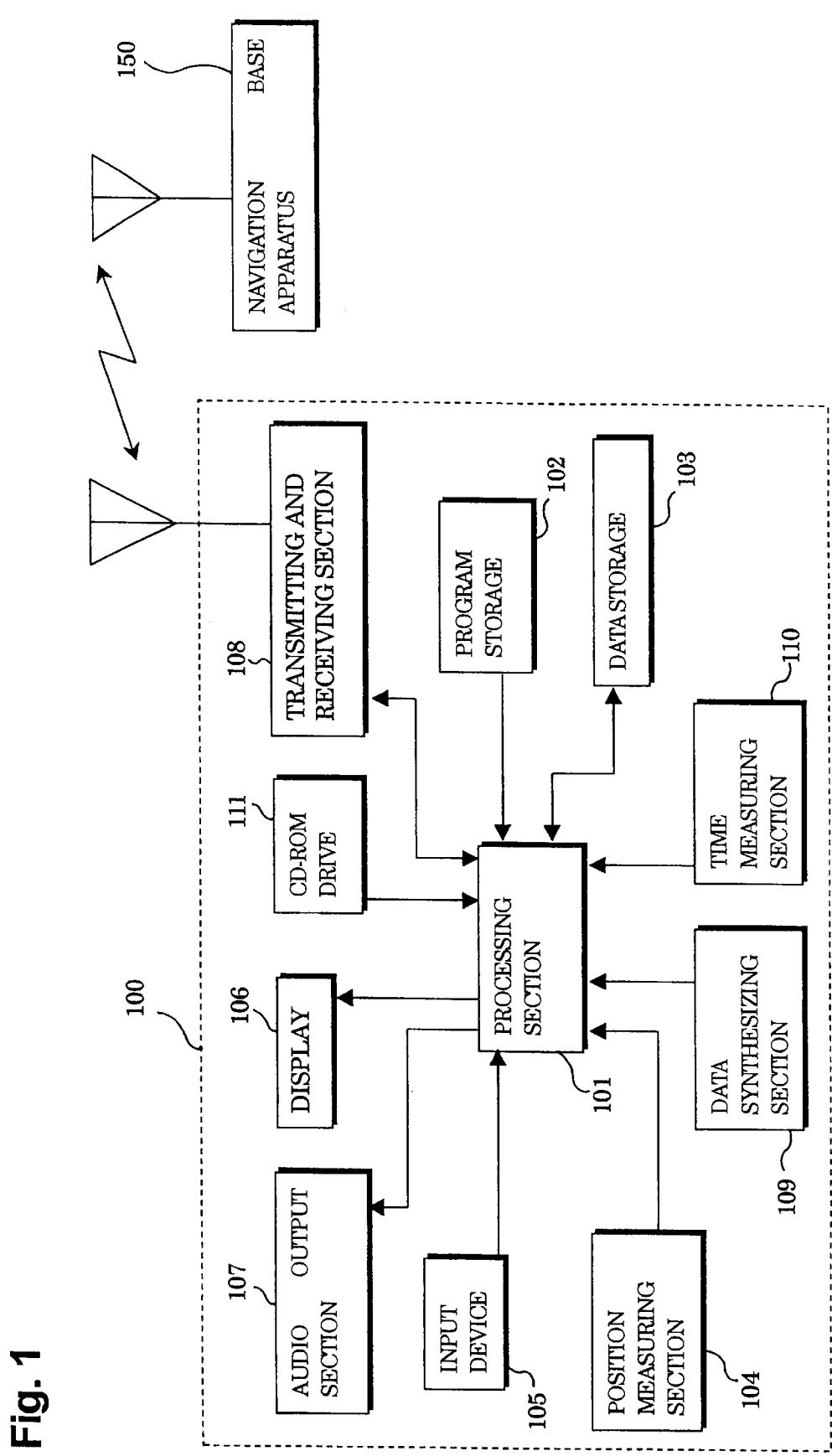
FIG. 1 is a schematic view which shows a general structure of a navigation apparatus used in a navigation system according to the first embodiment of the present invention.

FIG. 1 is a block diagram which shows a general structure of a navigation apparatus 100.

As shown in FIG. 1, the navigation apparatus 100 is roughly equipped with a transmitting and receiving section (transmitting means/receiving means/transmitting and receiving means) 108 for transmitting data concerning the current position of the vehicle, the destination thereof and its identification information (ID data) to the navigation base apparatus and receiving data from the navigation base apparatus; an input device 105 to enable a user to input a destination and various requests; a program storage 102 for storing various programs such as a program for transmitting data, a program for receiving data and a program for displaying maps on a display and the like; a processing section 101 constructed from a CPU and the like; an audio output section 107 for outputting audio guidance; a CD-ROM drive 111 for reading data from map data and the like stored in a CD-ROM; a position measuring section 104 for measuring the current position of the navigation apparatus; a time measuring section 110 for measuring the current time; and a data storage 103 constructed from a RAM or the like for storing various data.

The position measuring section 104 utilizes GPS or differential GPS (D-GPS) to measure the current position of the vehicle on which the navigation apparatus 100 is mounted. For this purpose, the position measuring section 104 is equipped with a GPS receiver to receive signals from a plurality of satellites, and sensors such as a velocity sensor and direction sensor to measure the relative position of the vehicle. The velocity sensor and direction sensor are used for self-contained navigation. Further, by using such velocity sensor and direction sensor, it becomes possible to correct measurement errors in the current position measured using GPS. Furthermore, even if the navigation apparatus 100 is unable to receive satellite signals, it becomes possible to measure the current position for example.

The input device 105 includes various switches, a touch panel, a remote control system, and a voice-activated data input device. By means of the touch panel, a user can input data or commands by touching icons on a display screen, with a finger. Further, by means of the voice-activated input device, a user can input data or commands using his or her own voice.

The display 106 is constructed from a display such as a liquid crystal display or CRT (Cathode-Ray Tube).

The transmitting and receiving section 108 transmits current position data, destination data, time data and ID data to the navigation base apparatus 150 with a prescribed time interval. Further, the transmitting receiving section 108 receives the required route/guidance information from the navigation base apparatus 150. This transmitting and receiving section 108 includes a modem and terminal adapter. In order to carry out transmission and reception of data between the navigation base apparatus 150 and the navigation apparatus 100, an existed communication system such as car phones, portable phones or PHS (Personal Handy-phone System) may be utilized.

At this point, it should be noted that "current position data" includes data concerning the current position of the vehicle measured by the position measuring section 104 of the navigation apparatus 100. This current position data is measured by the position measuring section 104 with a prescribed time interval and then transmitted to the navigation base apparatus 150. When a recommended route search is carried out, the current position data is used as data of the departure point. By means of the current position data, while route guidance is conducted, the navigation base apparatus 150 can grasp the position of the vehicle on which the navigation apparatus 100 is mounted. Further, the current position data may be used to determine the timing for transmitting route/guidance information to the navigation apparatus 100.

"Destination data" includes information concerning the destination, and this destination data is used to carry out a recommended route search. The destination data is inputted by means of the input device 105 of the navigation apparatus 100. For example, the name, address and/or telephone number may be inputted as destination data.

"Time data" includes information concerning the time when the current position of the vehicle is measured, and the time data is measured by the time measuring section 110 of the navigation apparatus 100. The time is measured each time upon the measurement of the current position, and then the time data is transmitted to the navigation base apparatus 150 together with the current position data. Then, based on the time data and current position data, the navigation base apparatus 150 can accurately determine the travel conditions of the vehicle on which the navigation apparatus 100 is mounted.

"Identification information (ID data)" is data that identifies a particular navigation apparatus from the plurality of navigation apparatuses served by the navigation base apparatus 150. By referring to the ID data, the navigation base apparatus 150 can identify the navigation apparatus that has transmitted such data, from the plurality of navigation apparatuses served by the navigation base apparatus 150.

Next, with reference to FIG. 2, a detailed description will be given for the structure of the navigation base apparatus used in the navigation system according to the first embodiment of the present invention.

Figure 2:
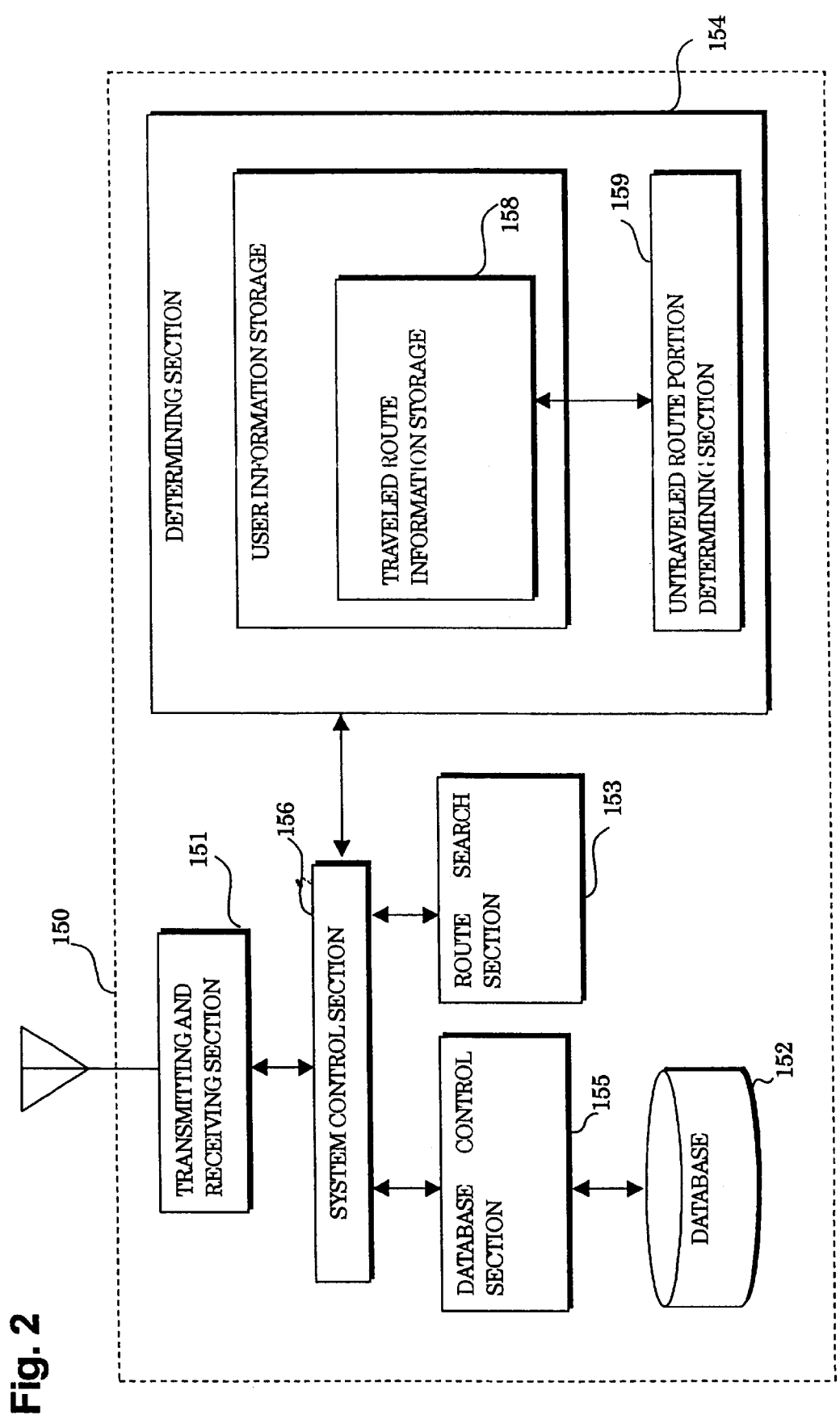
FIG. 2 is a schematic view which shows a general structure of a navigation base apparatus used in the navigation system according to the first embodiment of the present invention.

FIG. 2 is a block diagram which shows a general structure of a navigation base apparatus 150.

As shown in FIG. 2, the navigation base apparatus 150 is roughly equipped with a transmitting and receiving section (transmitting means/receiving means/transmitting means) 151 to enable the transmission and reception of data; a database (route/guidance data storage means/data storage device) 152 for storing route/guidance data; a route search section (route search means) 153 for searching recommended routes to the destination based on current position data and destination data received from the navigation apparatus 100; a determining section (determining means) 154 for determining, based on the ID data received from the navigation apparatus 100, necessary route/guidance information that a user of the moving body having the navigation apparatus needs to have with reference to the recommended route; a database control section (transmission data extracting means) 155 for extracting data corresponding to the route/guidance data determined by the determining section 154 from the database 152; and a system control section 156 for controlling each of these elements.

Hereinbelow, a description will be made with reference to the structure of the navigation base apparatus 150 and the function of each of the elements thereof.

The transmitting and receiving section 151 receives current position data, destination data, time data and ID data from one of the plurality of navigation apparatuses, and transmits route/guidance information extracted by the database control section 155 to the navigation apparatus identified by the ID data. The structure of the transmitting and receiving section 151 is similar to the transmitting and receiving section 108 of the navigation apparatus 100 described above.

The route search section 153 searches a recommended route from the current position to the destination in response to a recommended route search request from a user. In this regard, the recommended route to the destination is searched in accordance with factors such as driving distance, driving time and the like. Further, the recommended route to the destination can be searched in accordance with other data such as data related to traffic congestion and road repair. In this connection, data related to traffic congestion and road repair can be obtained by utilizing various road data providing services such as VICS (Vehicle Information & Communication System) and the like.

The determining section 154 includes traveled route information storage (traveled route information storage means/user information storage means) 158. This traveled route information storage 158 stores the ID data of the respective navigation apparatuses and traveled route information (user's information) for determining the necessary route/guidance data for respective users of the plurality of vehicles under the condition that each ID data is associated with the corresponding traveled route information of the user of the vehicle on which the navigation apparatus specified by the ID data is mounted. The determining section 154 determines the necessary route/guidance information for the respective user based on the traveled route information stored in the traveled route information storage 158.

In this regard, the traveled route information stored in the traveled route information storage 158 includes information concerning traveled routes that the vehicle on which the navigation apparatus is mounted is considered to have traveled thereon. The traveled route information for a particular navigation apparatus is produced based on the route/guidance information that has been transmitted from the navigation base apparatus 150 to the navigation apparatus 100.

Further, the determining section 154 includes an untraveled route portion determining section (untraveled route portion determining means) 159 for determining an untraveled route portion which is a part of the recommended route on which the vehicle having the navigation apparatus is considered to have not yet traveled, with reference to the traveled route information stored in the traveled route information storage 158.

The untraveled route portion determining section 159 determines the untraveled route portion by comparing the traveled route information stored in the traveled route information storage 158 with the data of the recommended route provided by the route search section 153. Namely, the untraveled route portion determining section 159 determines a portion of the recommended route as the untraveled route portion only in the case where the traveled route information shows that the vehicle has not yet traveled on the portion of the recommended route.

In this connection, route/guidance data is previously stored in the database 152. This route/guidance data includes road names, intersection names, road type (e.g., classification such as highway or general road), names of buildings along the roads, speed limit, number of lanes and the like.

In particular, the route/guidance data stored in the database 152 is segmented for each road. In the present invention, each "road" refers to a portion of a route from one intersection to the next intersection. Further, "route/guidance data for each road" refers to data that includes information concerning a road (a portion of a route).

The route/guidance information to be transmitted to the navigation apparatus 100 is extracted from the route/guidance data stored in the database 152 by the database control section 155 based on the data of the searched recommended route. This extracted route/guidance information includes data concerning roads contained in the searched recommended route.

In this embodiment, this route/guidance information can be constructed from a plurality of blocks (segments) as described later. According to the segmented route/guidance data structure described above, it becomes easy for the database control section 155 to extract route/guidance information corresponding to the data of the searched recommended route from the route/guidance data stored in the database 152.

Further, with the segmented route/guidance data structure described above, it becomes also possible to transmit the route/guidance information to the navigation apparatus 100, because the data transmission can be made in each segment.

Furthermore, by employing such method of transmitting the route/guidance information in the form of segments, it becomes possible to reduce the amount of data to be retransmitted to the navigation apparatus 100 when an interruption or the like occurs in the communication line during data transmission.

Furthermore, by employing such method of transmitting the route/guidance data in the form of segments, it is possible for the navigation apparatus 100 to process the route/guidance information received from the navigation base apparatus 150 in each of the segments. As a result, it becomes possible to improve the data processing performance of the navigation apparatus 100.

The system control section 156 is constructed from a processor which includes a CPU and a memory. In this connection, the memory in the system control section 156 serves as a working area when various programs are executed.

Next, with reference to FIGS. 3, 4 and 6, a description will be given for the untraveled route portion determining process which is carried out in the navigation base apparatus 150 of the communication-type navigation system according to the first embodiment of the present invention.

Figure 3:
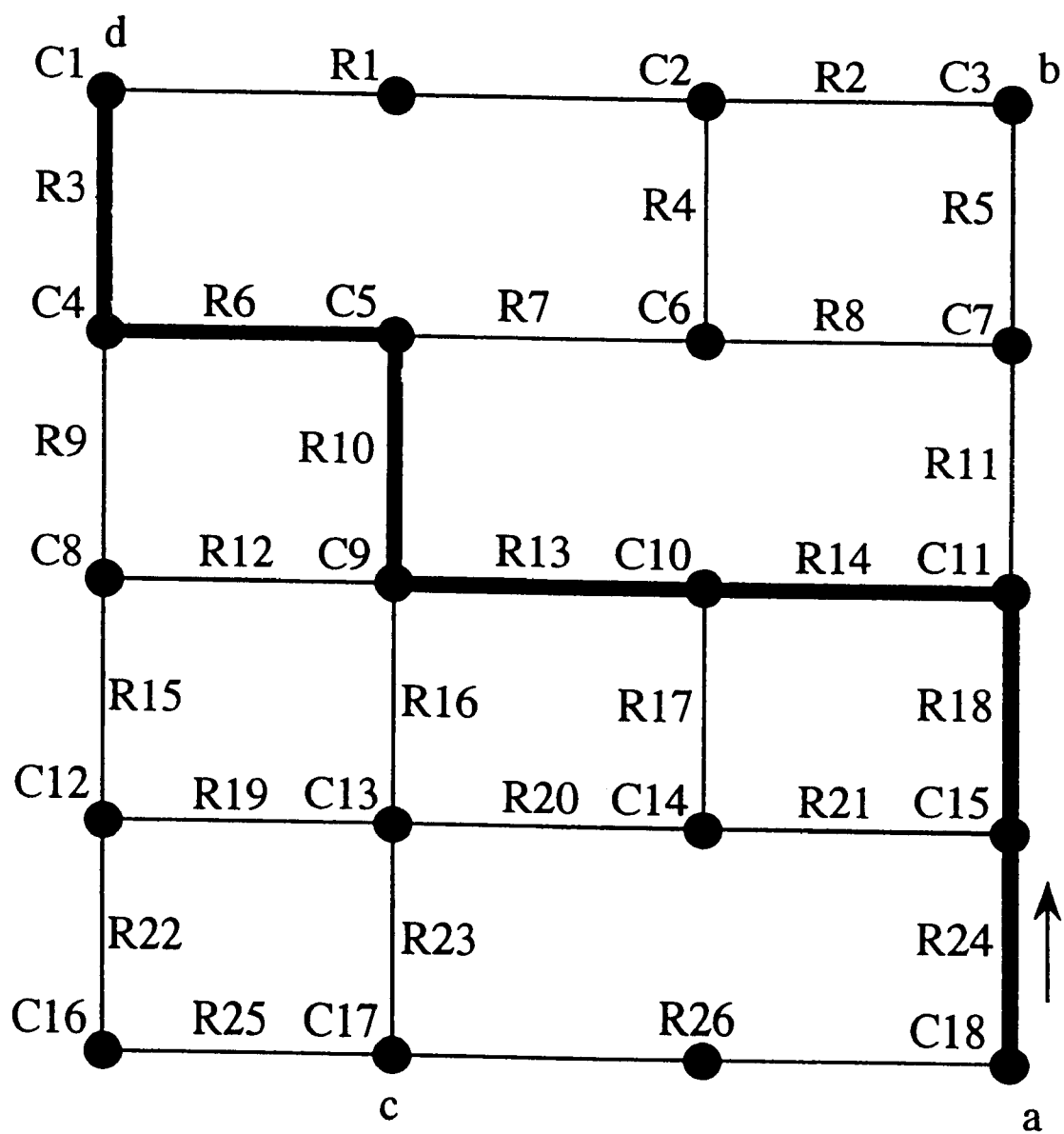
FIG. 3 is a schematic diagram which shows an example of a searched recommended route.

FIG. 3 is a schematic diagram which shows an example of a searched recommended route. In this case, "Cn" (where "n" is an integer) represents intersections and "Rn" (where "n" is an integer) represents roads. Further, for convenience sake in presenting a description, the intersections C18, C3, C17 and C1 are respectively shown as points "a", "b", "c" and "d". Furthermore, the route represented by the bold line in FIG. 3 shows the searched recommended route from the departure point (point "a") to the destination (point "d") which is determined in response to a recommended route search request from the user.

FIG. 4 shows an example of recommended routes which have previously been searched at the navigation base apparatus 150 in response to the recommended route search requests from the navigation apparatus 100 identified by a certain ID. In particular, the data listed in FIG. 4 indicates that route/guidance information for Searched Routes 1 to 4 were previously transmitted to the navigation apparatus 100 from the navigation base apparatus 150.

For example, in FIG. 4, Searched Route 1 indicates that a route passing through "Road R24—Road R18—Road R11—Road R5" was searched on Feb. 18, 1997 in response to a request for searching a recommend route from point "a" (departure point) to point "b" (destination).

FIG. 5 shows an example of traveled route information produced based on the route/guidance information for Searched Routes 1 to 4 shown in FIG. 4 which have been previously transmitted from the navigation base apparatus 150 to the navigation apparatus 100. Namely, FIG. 5 is a chart showing the traveled route information stored in the traveled route information storage 158.

In FIG. 5, the traveled route information is represented by (1) data of the road numbers for the roads which have been extracted (searched) as portions of recommended routes in the previous recommended route searches; (2) data showing the number of times that each road has been extracted as a portion of a recommended route in the previous recommended route searches (the number of times of the extraction); and (3) data showing the number of times of the extraction of the road per direction of travel.

This traveled route information is used as information related to the user (user's information), and is compared with data of the recommended route described below when the untraveled route portion determining section 159 determines the untraveled route portions.

Now, a description is made with regard to the case where the route from point "a" (departure point) to point "d" (destination) represented by the bold line in FIG. 3 is searched as a recommended route by the route search section 153 in response to a recommended route search request from the user. In this case, data of the recommended route is represented by the road numbers shown in FIG. 6. In this regard, "data of the recommended route" refers to data for specifying the road numbers of all the roads included in the searched recommended route.

Figure 6:
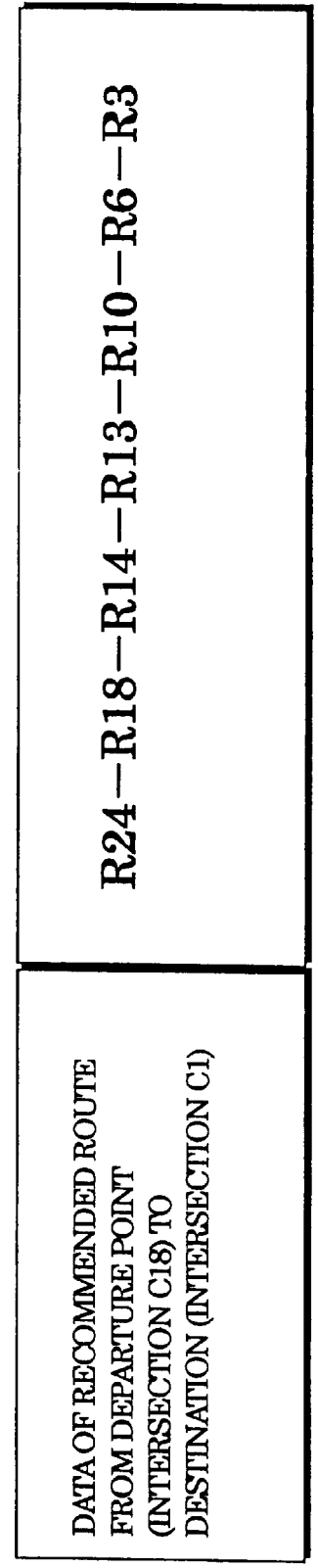
FIG. 6 is a diagram which shows data of recommended route searched by a route search section of the navigation base apparatus.

In the data of the recommended route shown in FIG. 6, the searched recommend route is represented as a route sequentially passing through Road R24, Road R18, Road R14, Road R13, Road R10, Road R6 and Road R3 to reach the destination.

Figure 7:
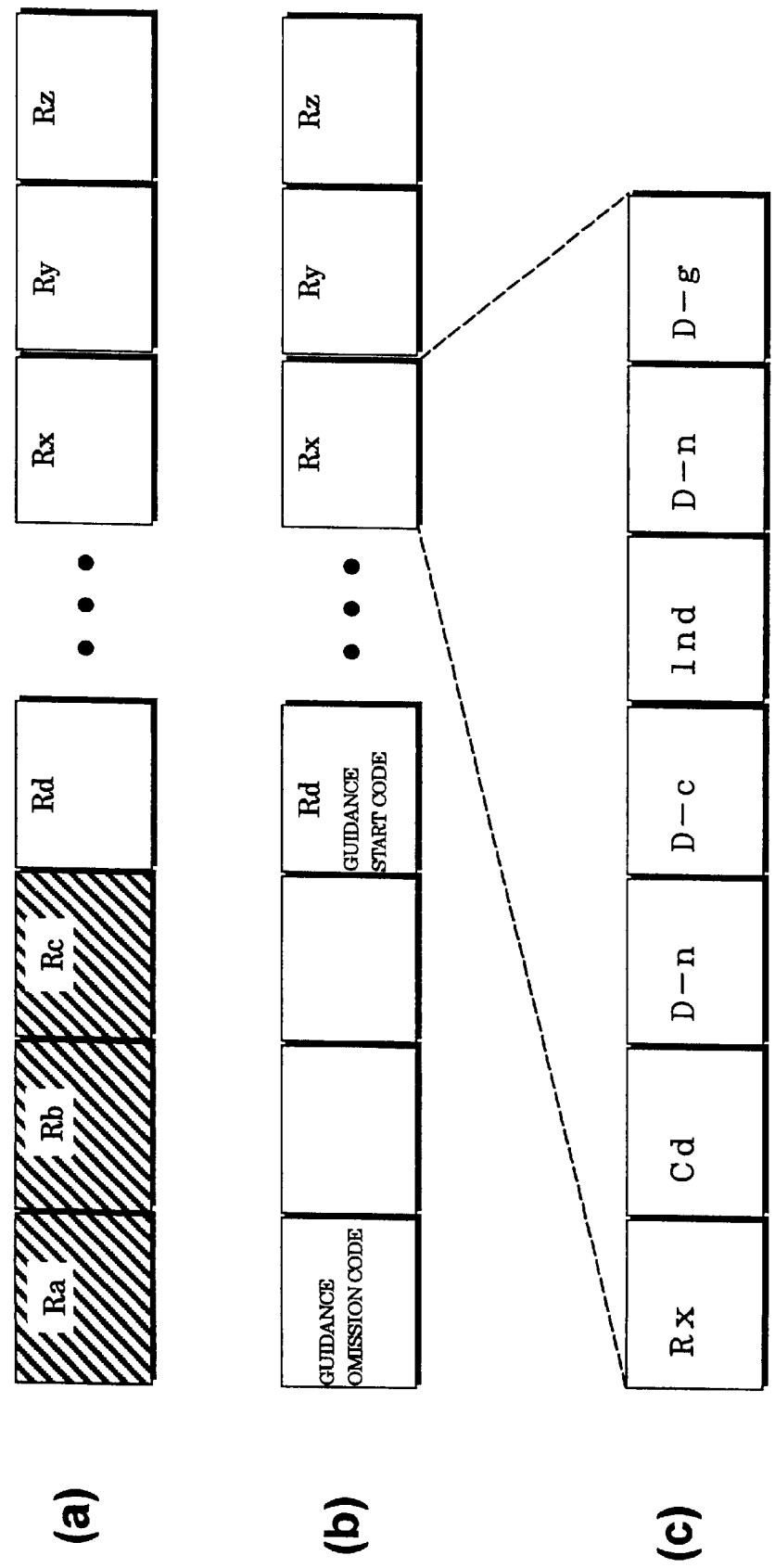
FIG. 7(a) is a diagram showing data concerning untraveled route portions produced by comparing data of a recommended route newly searched by the route search section with the traveled route information stored in the traveled route information storage.
FIG. 7(b) is a diagram showing untraveled route data, which corresponds to the data shown in FIG. 7(a).
FIG. 7(c) shows data structure (data format) of a part of route/guidance information.

Next, with reference to FIG. 7, a description will be given for the untraveled route data.

Namely, FIG. 7(a) is a diagram which shows data concerning untraveled route portions produced by comparing the data of the recommended route newly searched by the route search section 152 with the traveled route information stored in the traveled route information storage 158. In this diagram, Ra, Rb, Rc, Rd, . . . , Rx, Ry and Rz represent respectively the road numbers of all the roads included in the newly searched recommended route. Further, in FIG. 7(a), the blocks that are shaded with slanting lines (the blocks for Road Ra, Road Rb and Road Rc) in FIG. 7(a) indicate roads judged to be traveled roads. On the other hand, the blocks which have no slanting-line shading (the blocks for Road Rd, . . . , Road Rx, Road Ry and Road Rz) in FIG. 7(a) indicate roads judged to be untraveled roads by the untraveled route portion determining section 159.

The data shown in FIG. 7(a) is used for the production of "untraveled route data" which will be described with relation to FIG. 7(b). Further, the data shown in FIG. 7(a) is constructed from a plurality of blocks, with each block including data (road number data) corresponding to the road number of the road. Further, each block comprised of a road number is linked to prescribed data in the route/guidance data stored in the database 152. For example, the block comprised of road number data for Road Ra is linked to route/guidance data concerning Road Ra in the route/guidance data of the database 152.

Based on the data shown in FIG. 7(a), untraveled route data as shown in FIG. 7(b) is produced.

Namely, FIG. 7(b) is a diagram of untraveled route data corresponding to the data shown in FIG. 7(a).

In this regard, "untraveled route data" refers to data used for extracting route/guidance information concerning the searched recommended route from the route/guidance data stored in the database 152. As shown in FIG. 7(b), this untraveled route data is constructed from a block which includes a guidance omission code; a block which includes a guidance start code and road number data for road which has been judged to be untraveled route portion; a block which includes road number data for road which has been judged to be untraveled route portion. Based on such untraveled route data, the database control section 155 extracts the necessary route/guidance information from the route/guidance data stored in the database 152.

In more details, in the example shown in FIG. 7(a), instead of route/guidance information, the guidance omission code is written into the block for Road Ra (that is, a first block which has been judged to be traveled road). Further, the guidance start code and the route/guidance information for road Rd are written into the block for Road Rd (that is, a fourth block which has been judged to be untraveled road).

In FIG. 7(b), the guidance omission code is used to indicate that there is no need to carry out route guidance for the roads starting from Road Ra. In other words, the guidance omission code indicates that there is no need to extract and transmit route/guidance information for the roads starting from Road Ra.

Further, in FIG. 7(b), the guidance start code is used to indicate that route guidance needs to be carried out for the roads starting from Road Rd. In other words, the guidance start code indicates that route/guidance data for the roads starting from Road Rd have to be extracted and transmitted.

In this way, by producing untraveled route data which includes such guidance omission code and guidance start code, it becomes possible for the navigation base apparatus 150 to extract only the necessary route/guidance information for the untraveled route portions determined by the untraveled route portion determining section 159 from the route/guidance data stored in the database 152, and then transmit such extracted route/guidance information to the navigation apparatus 100 identified by the ID data described above. In other words, by referring to the thus produced untraveled route data, it becomes possible for the navigation apparatus 150 to extract only the route/guidance information needed by the user from the route/guidance data stored in the database 152.

Further, by extracting and transmitting only the route/guidance information for the untraveled route portions of the recommended route, it becomes possible to reduce the amount of data to be transmitted from the navigation base apparatus 150 to the navigation apparatus 100 compared with conventional navigation systems.

Furthermore, by reducing the amount of data to be transmitted from the navigation base apparatus 150 to the navigation apparatus 100, it becomes possible to shorten the time (communication time) required for transmission and reception of such data. As a result, it becomes possible to reduce communication cost when data is transmitted and received via phone lines compared with conventional navigation systems.

Moreover, by shortening communication time, the arrangement described above makes it possible to reduce the frequency of occurrence of communication errors during the transmission and reception of data compared with prior art navigation systems.

FIG. 7(c) is a diagram showing the data structure (data format) of the route/guidance information. Namely, FIG. 7(c) is a diagram showing the details of the route/guidance information for Road Rx that should be included in the block Rx shown in FIG. 7(b).

Based on the untraveled route data shown in FIG. 7(b), route/guidance information like that shown in FIG. 7(c) is extracted from the route/guidance data stored in the database 152 for each untraveled road included in the searched recommended route. Then, such extracted route/guidance information is respectively written into blocks which include the corresponding road number data.

As shown in FIG. 7(c), the route/guidance information is constructed from a plurality of fields.

For example, the route/guidance data shown in FIG. 7(c) includes a field Rx for storing data corresponding to the road number;

a field Cd for storing data corresponding to the intersection number; a field D-n for storing data showing the size of the next field; a field D-c for storing data concerning the coordinate axes for the route; a field lnd for storing data which specifies the process that should be carried out at the intersection; a field D-n for storing data showing the size of the next field; and a field D-g for storing data concerning the processes that can be carried out at the intersection.

For example, by referring to the data in the field lnd, it becomes possible to decide which of the various types of data included in the field D-g have to be used for the route guidance. In this connection, the field lnd stores various data such as data for selecting a type of guidance in which only the intersection name is displayed, data for selecting a type of guidance in which only audio guidance is carried out based on audio data, or data for selecting a type of guidance in which all processes is carried out.

In the field D-g, various data such as bit map data for landmarks, data concerning the display position for the landmarks, data concerning the name of the intersection, data concerning the shape of the intersection to be used when displaying an enlarged view of the intersection, and audio data to be used when carrying out audio guidance are stored.

Examples of route guidance carried out using each of the data described above are shown in FIG. 8.

Figure 8:
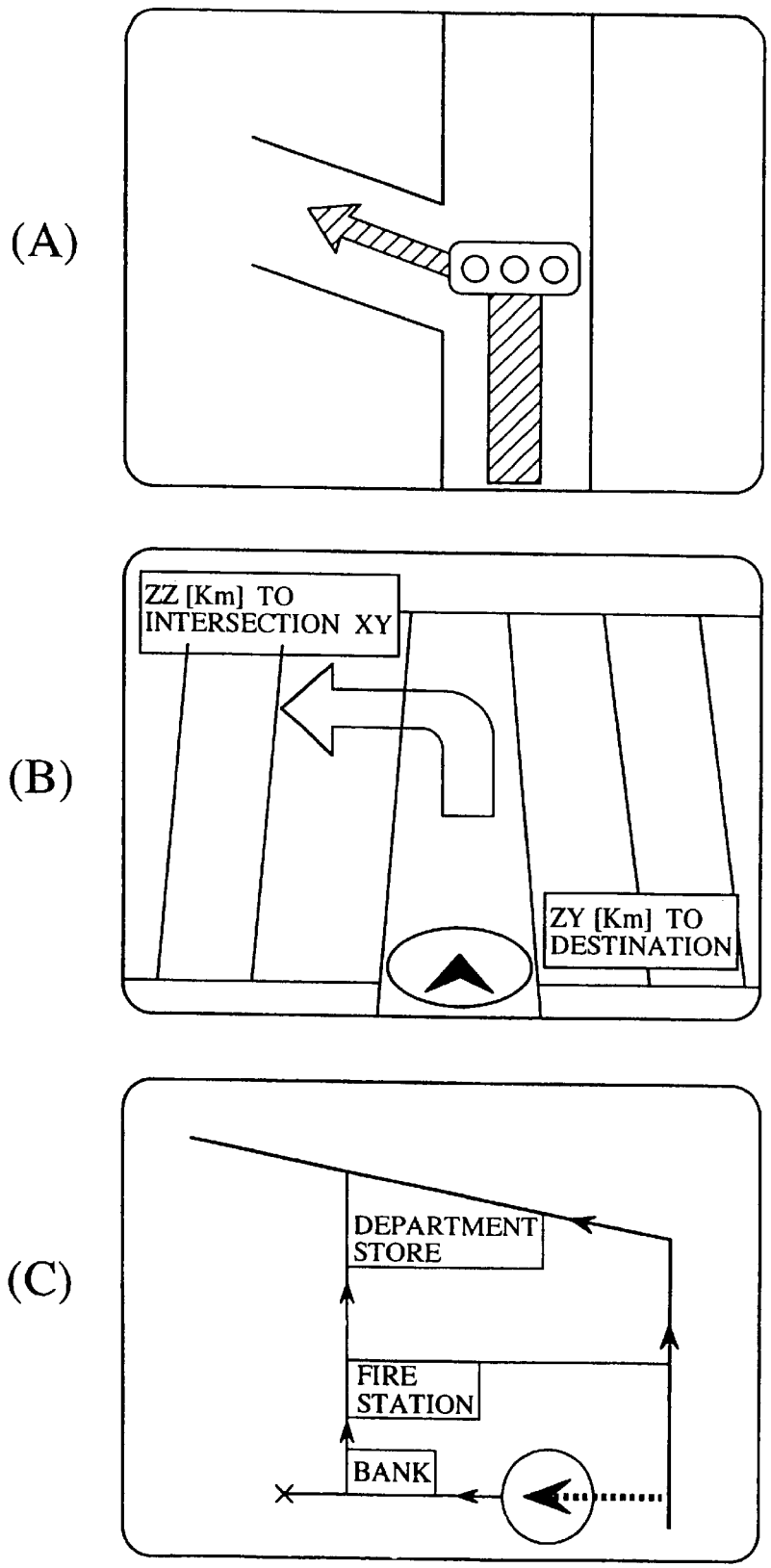
FIG. 8 illustrates examples of route guidance displayed on a display of the navigation apparatus.

FIG. 8 shows examples of route guidance displayed on the display 106 of the navigation apparatus 100. Namely, FIG. 8(a) shows an example of route guidance carried out by displaying an enlarged view of the intersection, FIG. 8(b) shows an example of route guidance carried out just before the vehicle reaches the intersection, and FIG. 8(c) shows an example of route guidance normally carried out while the vehicle is driving along an untraveled route.

The examples of FIG. 8 will now be described below in relation to the field D-g shown in FIG. 7(c).

By using "data concerning the shape of the intersection" included in the field D-g, it becomes possible to display an enlarged view of the intersection, as shown in FIG. 8(a).

Further, by using "data concerning the name of the intersection" included in the field D-g, it becomes possible to display a text message such as "ZZ [km] to Intersection XY", as shown in FIG. 8(b).

Furthermore, by using "bit map data for landmark" included in the field D-g, it becomes possible to display the landmark "DEPARTMENT STORE", as shown in FIG. 8(c).

Moreover, by using "audio data" included in the field D-g, it becomes possible to output the audio guidance "ZZ kilometers to Intersection XY."

Next, a specific example of how untraveled route data is produced will be described with reference to FIGS. 9 and 10.

FIG. 9 is a chart which shows schematically the method of determining untraveled route portions. Namely, FIG. 9 shows the state that the untraveled route portion determining section 159 is determining the untraveled route portion by comparing the traveled route information stored in the traveled route information storage 158 with the data of the recommended route provided by the route search section 153.

As shown in FIG. 9, the data of the recommended route shown in FIG. 6 is established as data of the recommended route that should be compared with the traveled route information.

Further, in the example shown in FIG. 9, traveled route information is established for the assumption case where only Searched Route 1, Searched Route 2, Searched Route 3 or Searched Route 4 shown in FIG. 4 has been previously searched or for the assumption case where Searched Routes 1 to 4 have been previously searched, and they are indicated by the traveled route information (a)–(e), respectively. Thus obtained traveled route information (a)–(e) is then compared with data of the recommended route.

For example, in the case where only Searched Route 1 shown in FIG. 4 has been searched as a recommended route in response to a recommended route search request from the user identified by a certain ID, the data shown by the traveled route information (a) is stored in the traveled route information storage 158.

The traveled route information (a) indicates that the vehicle on which the navigation apparatus 100 is mounted has passed once through the road R24 from the intersection C18 to the intersection C15, and once through the road R18 from the intersection C15 to the intersection C11, with respect to the recommended route shown in FIG. 6. Further, the traveled route information (a) also indicates that the vehicle has not passed even once through the roads R14, R13, R10, R6 and R3.

In the case where Searched Route 1, Searched Route 2, Searched Route 3 and Searched Route 4 shown in FIG. 4 have been searched as recommended routes in response to recommended route search requests from the user identified by a certain ID, the data shown in the traveled route information (e) is stored in the traveled route information storage 158.

The traveled route information (e) indicates that the vehicle on which the navigation apparatus 100 is mounted has passed twice through the road R10 from the intersection C9 to the intersection C5, once through the road R24 from the intersection C18 to the intersection C15, once through the road R18 from the intersection C15 to the intersection C11, once through the road R6 from the intersection C5 to the intersection C4, and once through the road R3 from the intersection C4 to the intersection C1, with respect to the recommended route shown in FIG. 6, Further, the traveled route data (e) indicates that the vehicle has not passed even once through the roads R14 and R13, with respect to the recommended route shown in FIG. 6.

Figure 10:
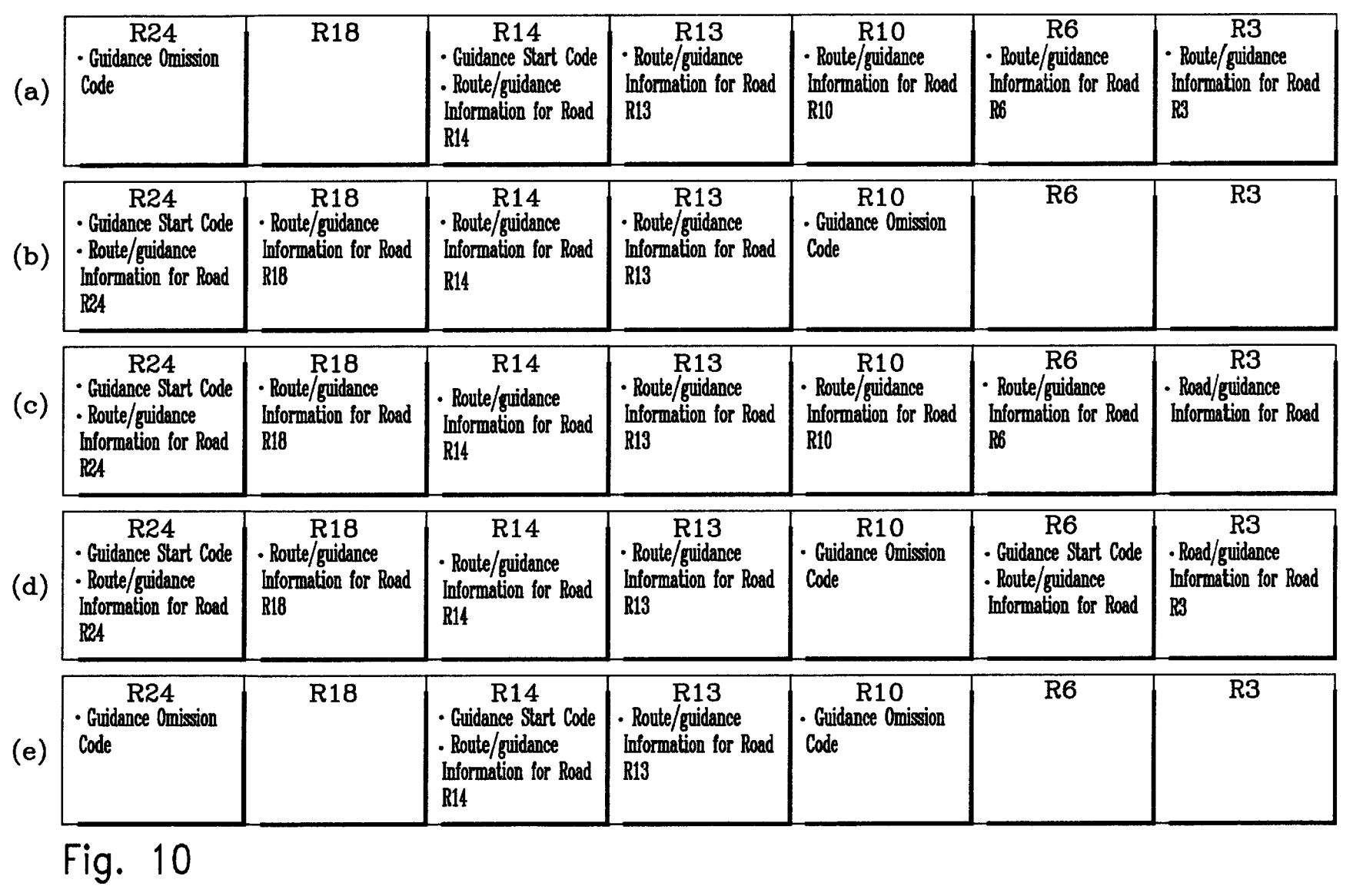

Now, by comparing "traveled route information" as shown in FIG. 9 with "data of recommended route data" as shown in FIG. 6, the untraveled route portion determining section 159 determines the untraveled route portions in the recommended route, which are then used to produce the route/guidance information shown in FIG. 10. Namely, by referring to the traveled route information, the untraveled route portion determining section 159 determines those roads that the vehicle on which the navigation apparatus 100 is mounted has not passed through as untraveled route portions, which are then used to create untraveled route data. Then, the database control section 155 produces the route/ guidance information like that shown in FIG. 10 based on the thus produced untraveled route data.

FIG. 10 is a diagram of route guidance information corresponding to each traveled route information shown in FIG. 9.

In FIG. 10, FIG. 10(a) shows route/guidance information produced based on the untraveled route data formed from the traveled route information (a) shown in FIG. 9, FIG. 10(b) shows route/guidance information produced based on the untraveled route data formed from the traveled route information (b) shown in FIG. 9, FIG. 10(c) shows route/ guidance information produced based on the untraveled route data formed from the traveled route information (c) shown in FIG. 9, FIG. 10(d) shows route/guidance information produced based on the untraveled route data formed from the traveled route information (d) shown in FIG. 9, and FIG. 10(e) shows route/guidance information produced based on the untraveled route data formed from the traveled route information (e) shown in FIG. 9.

Next, with reference to FIG. 9, a description will be given for the specific examples of each route/guidance information shown in FIG. 10.

First, the route/guidance information shown in FIG. 10(a) will be described.

As shown in FIG. 10(a), a guidance omission code and route/guidance information are written into the block for the road R24. This guidance omission code indicates that no route guidance needs to be carried out for the roads after the road R24. In accordance with this guidance omission code, the navigation apparatus 100 omits the route guidance for the road R24.

Further, the block for the road R18 is arranged after the block for the road R24. As shown in FIG. 10(a), neither a guidance start code nor route guidance information has been written into the block for the road R18. In this case, in accordance with the guidance omission code written into the block for the road R24, the navigation apparatus 100 omits the route guidance for the road R18.

Arranged after the block for the road R18 is the block for the road R14. Written into this block for the road R14 is a guidance start code and route/guidance information for the road R14. This guidance start code indicates that route guidance needs to be carried out for the roads after R14. In this case, in accordance with the guidance start code written into the block for the road R14, the navigation apparatus 100 carries out route guidance for the road R14.

Arranged after the block for the road R14 is the block for the road R13. Written into this block for the road R13 is route/guidance information for the road R13. In this case, in accordance with the guidance start code written into the block for the road R14, the navigation apparatus 100 carries out route guidance for the road R13.

Further, blocks for the roads R10, R6 and R3 arranged after the block for the road R13 include route/guidance information in the same manner as the block for the roads R13. In this case, in accordance with the guidance start code written into the block for the road R14, the navigation apparatus 100 carries out route guidance for the roads R10, R6 and R3.

Next, a description will be given for the route/guidance information shown in FIG. 10(b).

As shown in FIG. 10(b), the guidance start code and the route/guidance information for the road R24 are written into the block for the road R24. This guidance start code indicates that route guidance needs to be carried out for the roads after R24. In this case, in accordance with this guidance start code, the navigation apparatus 100 carries out route guidance for the road R24.

Arranged after the block for the road R24 is the block for the road R18. Written into the block for the road R18 is route/guidance information for the road R18. In this case, in accordance with the guidance start code written into the block for the road R24, the navigation apparatus 100 carries out route guidance for the road R18.

Further, arranged after the block for the road R18 are blocks respectively related to the roads R14 and R13 in which route/guidance data for the roads R14 and R13 are respectively written. In this case, in accordance with the guidance start code written into the block for the road R24, the navigation apparatus 100 carries out route guidance for the roads R14 and R13.

Arranged after the block for the road R13 is the block for the road R10. Written into this block for the road R10 is a guidance omission code. This guidance omission code indicates that no route guidance needs to be carried out for the roads after the road R10. In accordance with this guidance omission code, the navigation apparatus 100 omits the route guidance for the road R10.

Further, blocks for the roads R6 and R3 are arranged after the block for the road R10, and as shown in FIG. 10(b), neither a guidance start code nor route/guidance information has been written into the blocks for the roads R6 and R3. In this case, in accordance with the guidance omission code written into the block for the road R10, the navigation apparatus 100 omits the route guidance for the roads R6 and R3.

Each route/guidance information shown in FIGS. 10(c), 10(d) and 10(e) are constructed from blocks which are similar to those described above for the route/guidance information shown in FIGS. 10(a) and 10(b).

Next, with reference to FIG. 11, a detailed description will be given for the process carried out in the navigation base apparatus 150.

Figure 11:
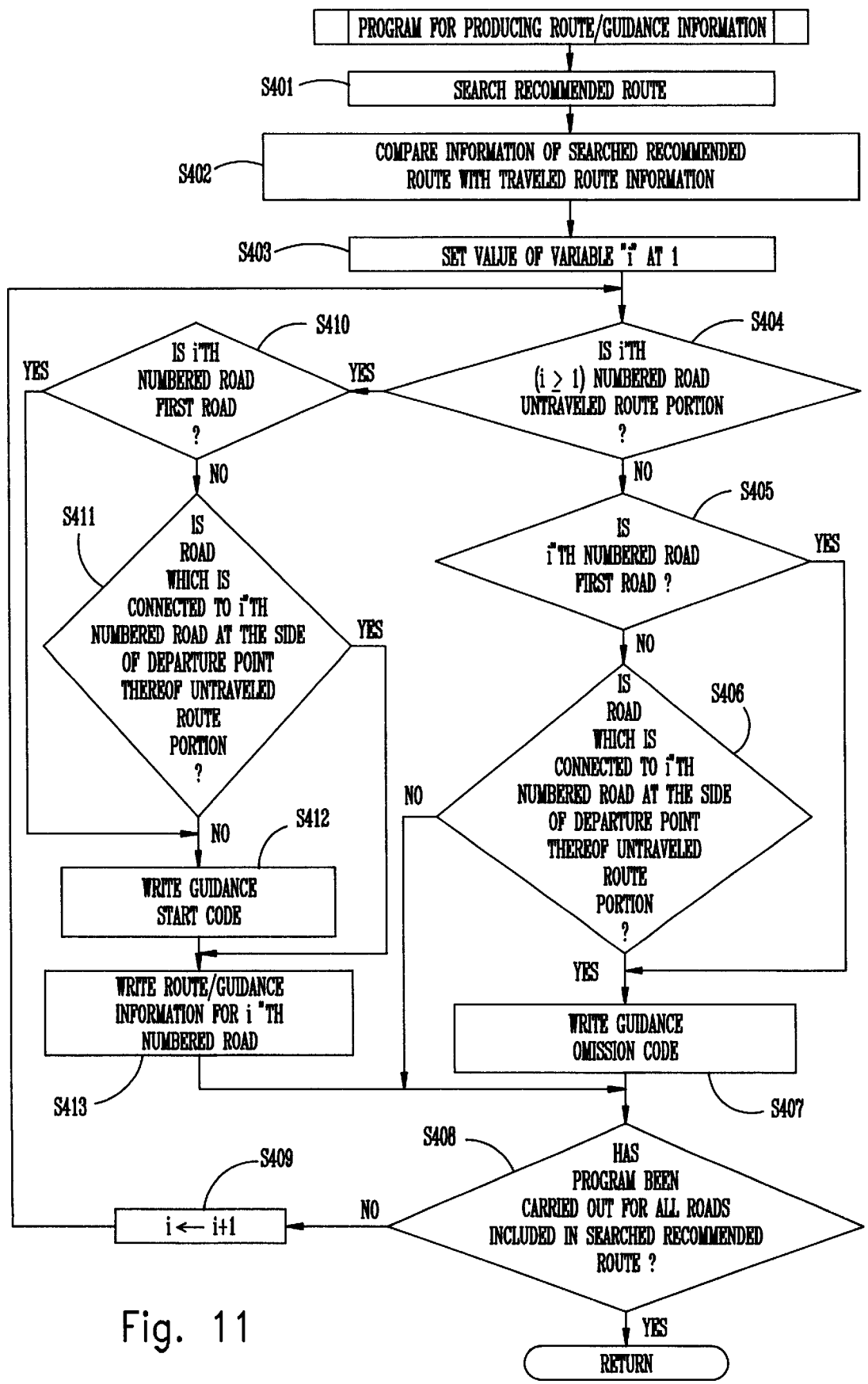
FIG. 11 is a flow chart showing a process for producing the route/guidance information.

In this regard, FIG. 11 is a flow chart showing the process for producing route/guidance information, in which "i" (which is normally an integer) is used as a variable about the order to the road.

First, at Step S401, based on the information concerning the departure point and destination received from the navigation apparatus 100, the route search section 153 of the navigation base apparatus 150 searches a recommended route to the destination (step S401/see FIG. 6).

Next, the untraveled route portion determining section 159 of the navigation base apparatus 150 compares the data of the searched recommended route with the traveled route information stored in the traveled route information storage 158 (Step S402/see FIG. 9).

Next, the untraveled route portion determining section 159 sets the value of the variable "i" at 1 (Step S403).

Now, to make it easy to understand the operations involved, the program for producing route/guidance information will be described with reference to the traveled route information (a) shown in FIG. 9 and the route/guidance information shown in FIG. 10(a).

By referring to the comparison results at Step S402, the untraveled route portion determining section 159 of the navigation base apparatus 150 makes a judgement as to whether or not the first road (road R24) is an untraveled route portion (Step S404).

As shown by the traveled route information (a) in FIG. 9, because the road R24 is a road that has been traveled through in the past by the vehicle on which the navigation apparatus 100 identified by the ID data transmitted therefrom is mounted, it is not an untraveled route portion. Accordingly, based on the user's information, the untraveled route portion determining section 159 judges that the road R24 is not an untraveled route portion ("NO" judgement at Step S404).

Next, the untraveled route portion determining section 159 makes a judgement as to whether or not the first road (road R24) is the road that will be passed through first on the recommended route by the vehicle (Step S405).

As shown by the traveled route information (a) in FIG. 9, the road R24 is the first road to be passed through by the vehicle. Accordingly, based on the data of the recommended route, the untraveled route portion determining section 159 judges that the road R24 is the first road to be passed through by the vehicle ("YES" judgement at Step S405).

Next, in accordance with the judgements made at Steps S404 and S405, the database control section 155 writes a guidance omission code (Step S407). In this way, a guidance omission code is written in the block for the road R24 shown in FIG. 10(a) (Step S407).

Next, the untraveled route portion determining section 159 makes a judgement as to whether or not the program for producing route/guidance information has been carried out for all the roads included in the searched recommended route (Step S408).

As shown in FIG. 9, in addition to the road R24, the searched recommended route includes the roads R18, R14, R13, R10, R6 and R3. Accordingly, the untraveled route portion determining section 159 makes the judgement that the program for producing route/guidance information has not been carried out for all the roads included in the searched recommended route ("NO" judgement at Step S408).

Then, at Step S409, the untraveled route portion determining section 159 adds 1 to the value of the variable "i". In other words, 1 is incremented to the value of the. variable "i" to give a new value of 2, and then the program returns to Step 404.

Next, by referring to the comparison results obtained at Step S402, the untraveled route portion determining section 159 makes a judgement as to whether or not the second road (road R18) is an untraveled route portion (Step S404).

As shown by the traveled route information (a) in FIG. 9, because the road R18 is a road that has been traveled through in the past by the vehicle on which the navigation apparatus 100 identified by the ID data is mounted, it is not an untraveled route portion. Accordingly, based on the user's information, the untraveled route portion determining section 159 judges that the road R18 is not an untraveled route portion ("NO" judgement at Step S404).

Next, the untraveled route portion determining section 159 makes a judgement as to whether or not the second road (road R18) is the road that will be passed through first on the recommended route by the vehicle (Step S405).

As shown by the traveled route information (a) in FIG. 9, the road R18 is not the first road passed through by the vehicle. Accordingly, based on the data of the recommended route, the untraveled route portion determining section 159 judges that the road R18 is not the first road passed through by the vehicle ("NO" judgement at Step S405).

Next, the untraveled route potion determining section 159 makes a judgement as to whether or not the road connected to the road R18 at the side of the departure point thereof is an untraveled route portion (Step S406). Namely, the untraveled route portion determining section 159 makes a judgement as to whether or not the road R24 connected to the road R18 at the side of the departure point thereof is an untraveled route portion.

As shown by the traveled route information (a) in FIG. 9, the road R24 is not an untraveled route portion. Accordingly, based on the user's information, the untraveled route portion determining section 159 judges that the road R24 is not an untraveled route portion ("NO" judgement at Step S406).

Next, the untraveled route portion determining section 159 makes a judgement as to whether or not the program for producing route/guidance information has been carried out for all the roads included in the searched recommended route (Step S408). At this point, because the judgment is "NO" at Step S408, the program proceeds to Step S409.

At Step S409, the untraveled route portion determining section 159 adds 1 to the value of the variable "i". Namely, 1 is incremented to the value of the variable "i" to give a new value of 3, and then the program return to Step 404.

Next, by referring to the comparison results obtained at Step S402, the untraveled route portion determining section 159 makes a judgement as to whether or not the third road (road R14) is an untraveled route portion (Step S404).

As shown by the traveled route information (a) in FIG. 9, the road R14 is an untraveled route portion. Accordingly, based on user's information, the untraveled route portion determining section 159 judges that the road R14 is an untraveled route portion ("YES" judgement at Step S404).

Next, the untraveled route portion determining section 159 makes a judgement as to whether or not the third road (road R14) is the road that will be passed through first on the recommended route by the vehicle (Step S410).

As shown by the traveled route information (a) in FIG. 9, the road R14 is not the first road passed through by the vehicle. Accordingly, based on the user's information, the untraveled route portion determining section 159 judges that the road R14 is not the first road passed through by the vehicle ("NO" judgement at Step S410).

Next, the untraveled route portion determining section 159 makes a judgement as to whether or not the road connected to the road R14 at the side of the departure point thereof is an untraveled route portion (Step S411). Namely, the untraveled route potion determining section 159 makes a judgement as to whether or not the road R18 connected to the road R14 at the departure point thereof is an untraveled route portion.

As shown by the traveled route information (a) in FIG. 9, the road R18 is not an untraveled route portion. Accordingly, based on user's information, the untraveled route portion determining section 159 judges that the road R18 is not an untraveled route portion ("NO" judgement at Step S411).

Next, in accordance with the judgements made at Steps S404 and S405, the database control section 155 writes a guidance start code into the block for the road R14 (Step S412). In accordance with this process performed at Step S412, a guidance start code is written into the block for the road R14 in FIG. 10(*a*).

Further, the database control section 155 writes route/guidance information for the third road (road R14) (Step S413). In accordance with this process performed at Step S413, route/guidance information for road R14 is written in the block for the road R14 in FIG. 10(*a*).

The process described above is repeated for the roads R13, R10, R6 and R3, and as a result, the route/guidance information shown in FIG. 10(*a*) is produced. Then, when the program for producing route/guidance information has been carried out for all the roads included in the searched recommended route ("YES" judgement at Step S408), the program shown in FIG. 11 for producing route/guidance information is ended.

In this way, by using the program shown in FIG. 11 for producing route/guidance information, it is possible to produce each of the route/guidance information shown in FIG. 10 based on each of the traveled route information shown in FIG. 9.

Further, by using the program shown in FIG. 11 for producing route/guidance information, it becomes possible for the navigation apparatus 150 to extract only the route/guidance information needed by the user from the route/guidance data stored in the database 152.

Furthermore, by extracting and transmitting only the route/guidance information needed by the user, it becomes possible to reduce the amount of data to be transmitted from the navigation base apparatus 150 to the navigation apparatus 100 compared with conventional navigation systems.

Next, a detailed description of a communication-type navigation system according to a second embodiment of the present invention will be given with reference to FIG. 12.

Figure 12:
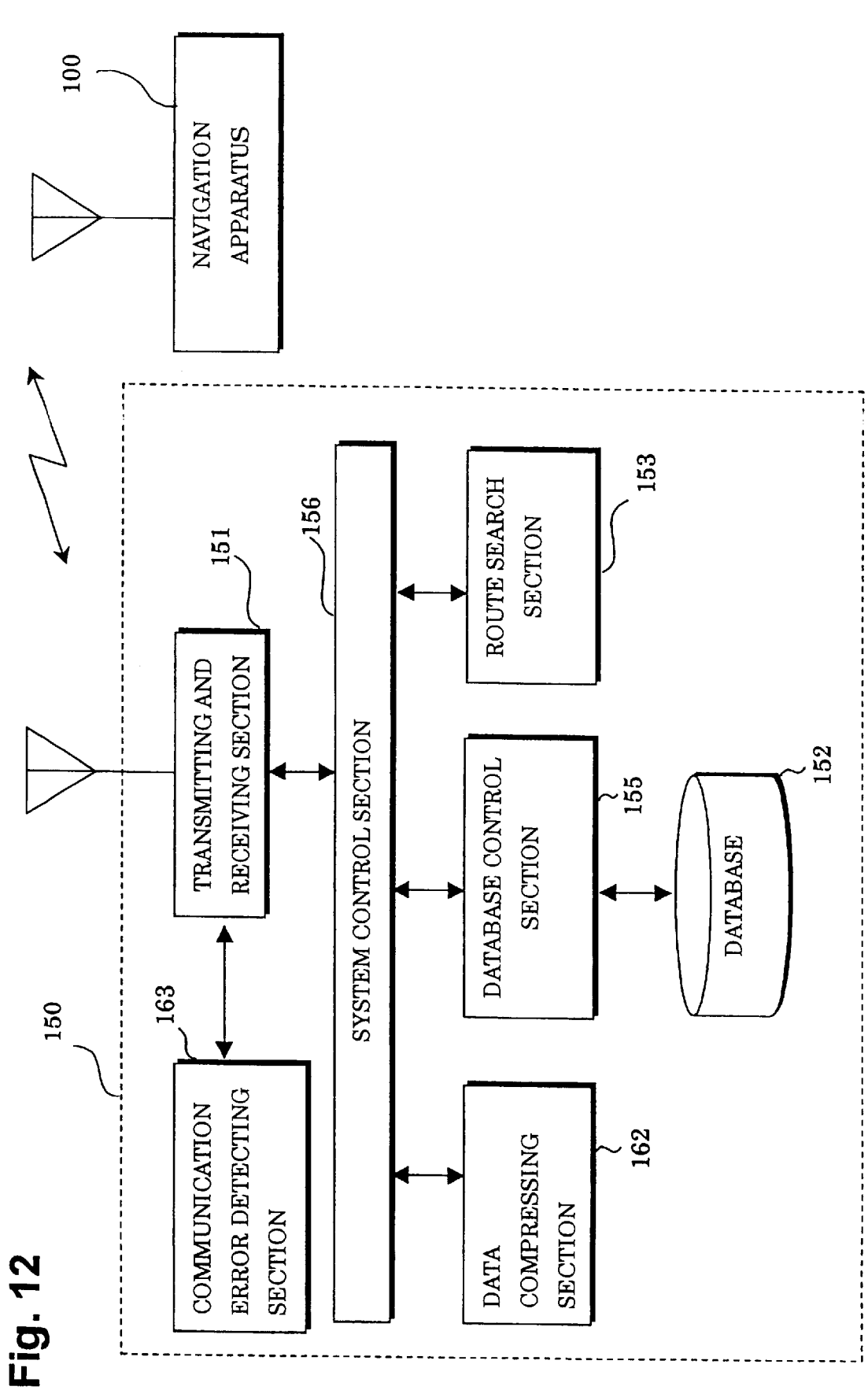
FIG. 12 is a schematic view which shows a general structure of a navigation base apparatus used in a navigation system according to the second embodiment of the present invention.

FIG. 12 is a schematic view of the navigation base apparatus 150 which communicates with the navigation apparatus 100 for transmitting and receiving various information.

As shown in FIG. 12, the navigation base apparatus 150 of the communication-type navigation system according to the second embodiment includes a transmitting and receiving section (receiving means) 151 for receiving current position data and destination data transmitted from the navigation apparatus 100; a route search section (route searching means) 153 for searching a recommended route to the destination based on the current position data and the destination data received from the navigation apparatus 100; a database (data storage device) 152 for storing route/guidance data; a database control section 155 for extracting route/guidance information for the searched recommended route from the route/guidance data stored in the database 152.

Further, the navigation base apparatus 150 includes a data compressing section (data compressing means) 162 for compressing data to be transmitted to the navigation apparatus 100, and a communication error detecting section (communication error detecting means) 163 for detecting communication errors.

In the present embodiment, in addition to serving as a means for extracting transmission data, the database control section 155 also serves as a means for producing segmented data. Namely, the database control section 155 produces segmented data by dividing the route from a departure point to a destination which is produced based on the current position data of the vehicle and the destination data thereof into a plurality of portions and then extracting route/guidance information for the respective portions of the divided route.

This segmented data is compressed by the data compressing section 162 to reduce the overall data size, and then such compressed segmented data is sent to the transmitting and receiving section 151.

Then, transmitting and receiving section 151 transmits the respective segmented data compressed by the data compressing section 162 to the vehicle having the navigation apparatus 100 identified by the ID data.

In transmitting information to the navigation apparatus 100, the transmitting and receiving section 151 transmits the segmented data for a portion of the route for which the user needs to have the route/guidance information at first. In other words, the transmitting and receiving section 151 transmits the plurality of segmented data produced by the database control section 155 sequentially in the order beginning from the segmented data for a portion of the route which is the closest to the vehicle.

Further, in transmitting information to the navigation apparatus 100, the communication error detecting section 163 determines as to whether the transmission and reception of the respective segmented data by the transmitting and receiving section 151 has been carried out without any trouble. Then, the communication error detecting section 163 detects a communication error for the segmented data transmission when the transmission and reception of the segmented data was incomplete. In this way, when the communication error detecting section detects a communication error in the transmission of the specified segmented data, the remaining data beginning from the specified segmented data is retransmitted.

Next, with reference to FIG. 13, a description will be given for the route/guidance information to be transmitted to the navigation apparatus 100 from the navigation base apparatus 150.

Figure 13:
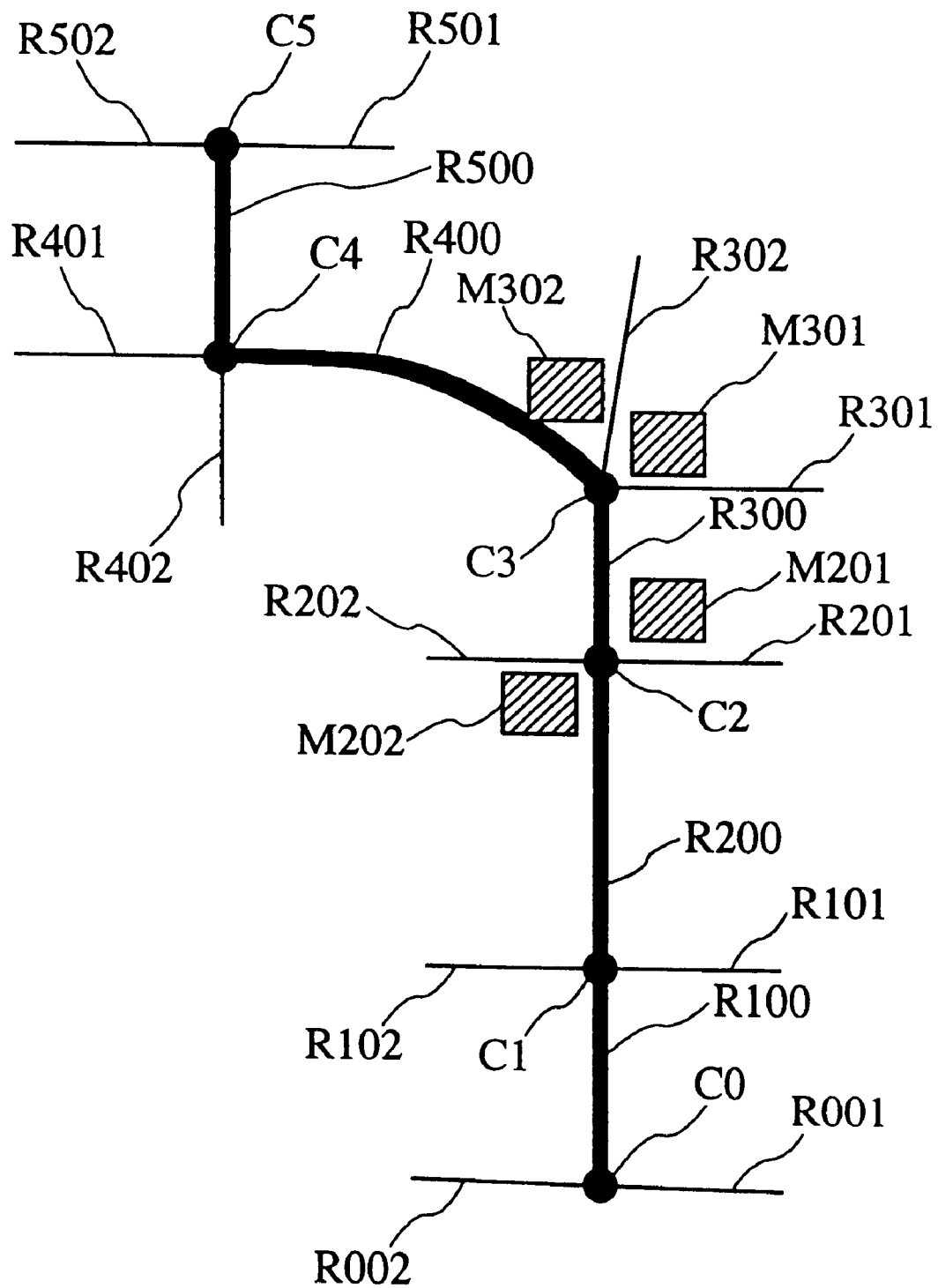
FIG. 13 is a schematic view of an example of route guidance to be displayed on a display.

FIG. 13 schematically shows an example of route guidance displayed on the display 106.

In the example shown in FIG. 13, Rn ("n" being an integer) indicates roads, Cn ("n" being an integer) indicates intersections, and Mn ("n" being an integer) indicates landmarks such as restaurants and gas stations.

Further, the route indicated by the bold line in FIG. 13 shows a recommended route from the departure point (intersection C0) to the destination (intersection C5) searched based on the current position data and the destination data received from the navigation apparatus 100.

Next, with reference to FIGS. 14 and 15, the process for displaying route guidance as shown in FIG. 13 on the display 106 of the navigation apparatus 100 will be described.

First, the route search section 153 of the navigation base apparatus 150 searches a recommended route from the departure point (intersection C0) to the destination (intersection C5) based on the current position data and the destination data received from the navigation apparatus 100. In this way, data of the recommended route as shown in FIG. 14(A) is produced.

Namely, the data of the recommended route shown in FIG. 14(A) indicates the recommended route starting at the intersection C0 and passing through the roads R100, R200, R300, R400 and R500 in this order to reach the intersection C5.

Next, the database control section 155 divides the searched recommended route from the departure point to the destination into a plurality of roads. In other words, the database control section 155 divides the data of the recommended route into a plurality of portions specified by road numbers. By dividing the data of the recommended route in this way, it becomes possible for the database control section 155 to produce segmented data as described below. In this regard, the data of the recommended route which has been divided is schematically shown in FIG. 14(B). Now, it should be noted that in the present embodiment the term "road" refers to a portion of the route between one intersection and the next intersection.

Next, by referring to the road numbers included in the information shown in FIG. 14(B), the database control section 155 extracts route/guidance information concerning each of such road numbers from the route/guidance data stored in the database 152. In this way, the segmented data corresponding to each road number is produced. Now, in the present embodiment the term "segmented data" refers to the route/guidance information corresponding to each of the divided route portions of the recommended route.

Figure 15:
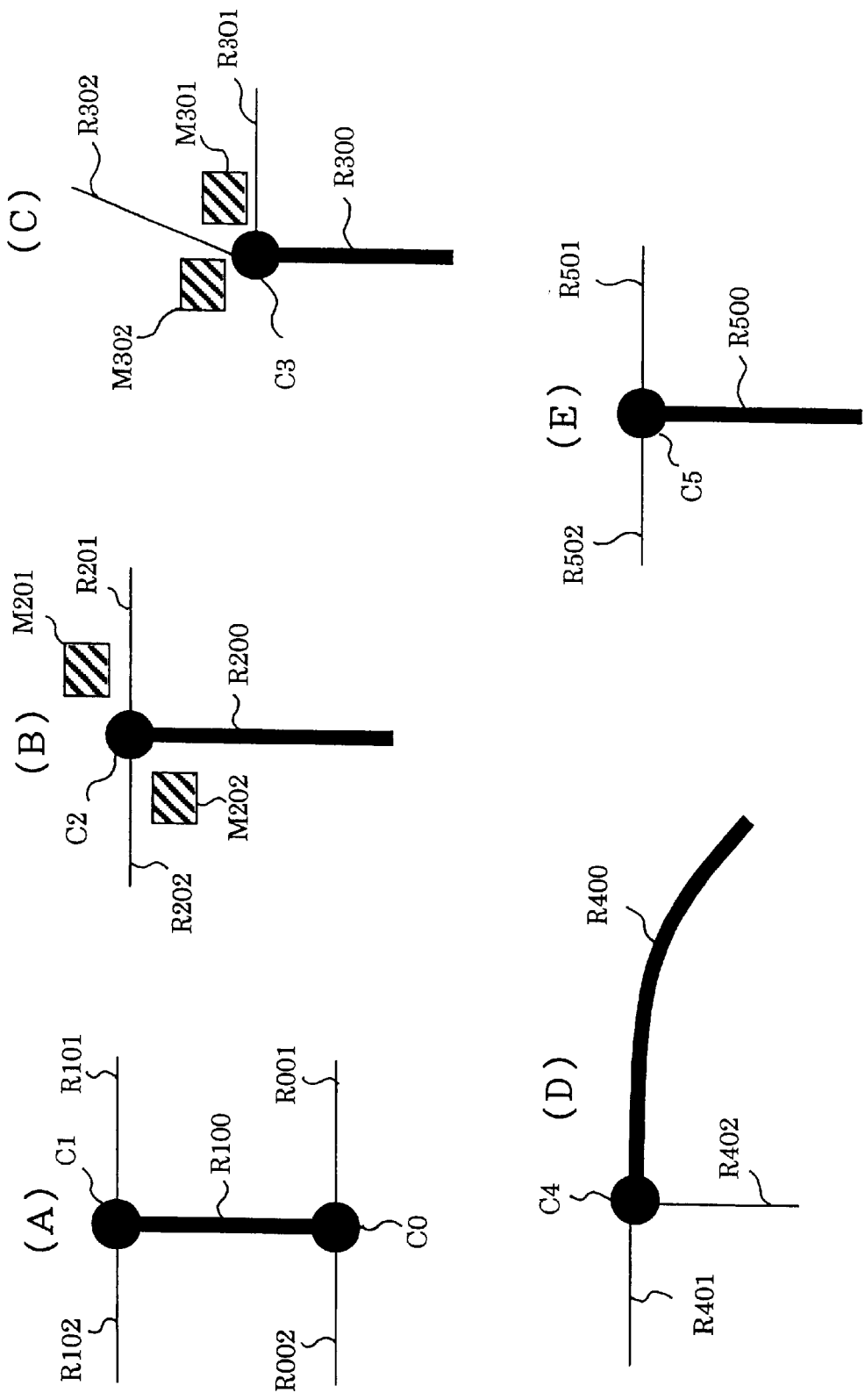
FIGS. 15(A)–(E) are schematics which respectively show segmented data.

FIG. 15 shows the segmented data which is extracted by the database control section 155 in accordance with the data shown in FIG. 14(B). Specifically, FIGS. 15(A), 15(B), 15(C), 15(D) and 15(E) respectively show segmented data for the roads R100, R200, R300, R400 and R500 which are shown in FIG. 13.

Next, each segmented data produced by the database control section 155 is compressed by the data compressing section 162 and then transmitted by the transmitting and receiving section 151 to the navigation apparatus 100.

In transmitting information to the navigation apparatus 100, the transmitting and receiving section 151 transmits the segmented data for a portion of the route for which the user needs to have the route/guidance information at first. In other words, the transmitting and receiving section 151 transmits the plurality of segmented data produced by the database control section 155 sequentially in the order beginning from the segmented data for a portion of the route which is the closest to the vehicle.

For example, in the case where the vehicle on which the navigation apparatus 100 is mounted is in a standby state near the departure point (intersection C0), the transmitting and receiving section 151 first transmits the segmented data for the road R100 (FIG. 15(A)) to the navigation apparatus 100. Then, the transmitting and receiving section 151 transmits the segmented data for the road R200 (FIG. 15(B)), the segmented data for the road R300 (FIG. 15(C)), the segmented data for the road R400 (FIG. 15(D)) and the segmented data for the road R500 (FIG. 15(E)) in this order to the navigation apparatus 100.

As described above, in the present embodiment of the communication-type navigation system, the navigation base apparatus 150 divides the data to be transmitted to the navigation apparatus 100 into a plurality of data segments. In this way, the route/guidance information can be transmitted to the navigation apparatus 100 in the form of individual data segments. Consequently, in the case where an interruption or the like occurs in the communication line during data transmission, it becomes possible to reduce the amount of data that needs to be retransmitted.

Next, with reference to FIG. 15, a description will be given for each of the data that makes up the segmented data.

The segmented data for the road R100 shown in FIG. 15(A) includes data concerning the roads R001, R002, R100, R101 and R102, and data concerning the intersection C0 and C1. In this regard, the data concerning the intersection C0 (departure point) makes it possible for the user to easily ascertain the current position. Further, the data concerning the road R100 makes it possible for the user to easily travel along the recommended route, and the data concerning the intersection C1 and the roads R101 and R102 make it possible for the user to travel from the road R100 to the road R200 without making a route error.

The segmented data for the road R200 shown in FIG. 15(B) includes data concerning the roads R200, R201 and R202, data concerning the intersection C2, and data concerning the landmarks M201 and M202. In this regard, the data concerning the road R200 makes it possible for the user to easily travel along the recommended route. Further, the data concerning the intersection C2, the roads R201 and R202, and the landmarks M201 and M202 make it possible for the user to travel from the road R200 to the road R300 without making a route error.

Now, in the same manner as the segmented data for the road R200 described above, the segmented data for the road R300 shown in FIG. 15(C), the segmented data for the road R400 shown in FIG. 15(D), and the segmented data for the road R500 shown in FIG. 15(E) include data concerning roads, intersections and landmarks.

For example, in the case where the navigation apparatus 100 receives the segmented data for the road R100 while the vehicle is in a standby state at the intersection C0, it is possible for the navigation apparatus 100 to display route guidance like that shown in FIG. 15(A) on the display 106. In this case, it becomes possible for the navigation apparatus 100 to carry out route guidance for the road R100 even when the segmented data shown in FIGS. 15(B)~15(E) have not been received.

Further, in the case where the navigation apparatus 100 has already received the segmented data for the road 200 in addition to the segmented data for the road R100, it is possible for the navigation apparatus 100 to display route guidance which includes the combination of FIGS. 15(A) and 15(B) on the display 106.

Furthermore, in the case where the navigation apparatus 100 receives each segmented data shown in FIGS. 15(A)

–15(E) while the vehicle is in a standby state at the intersection C0, it is possible for the navigation apparatus 100 to display route guidance like that shown in FIG. 13 on the display 106.

Figure 16:
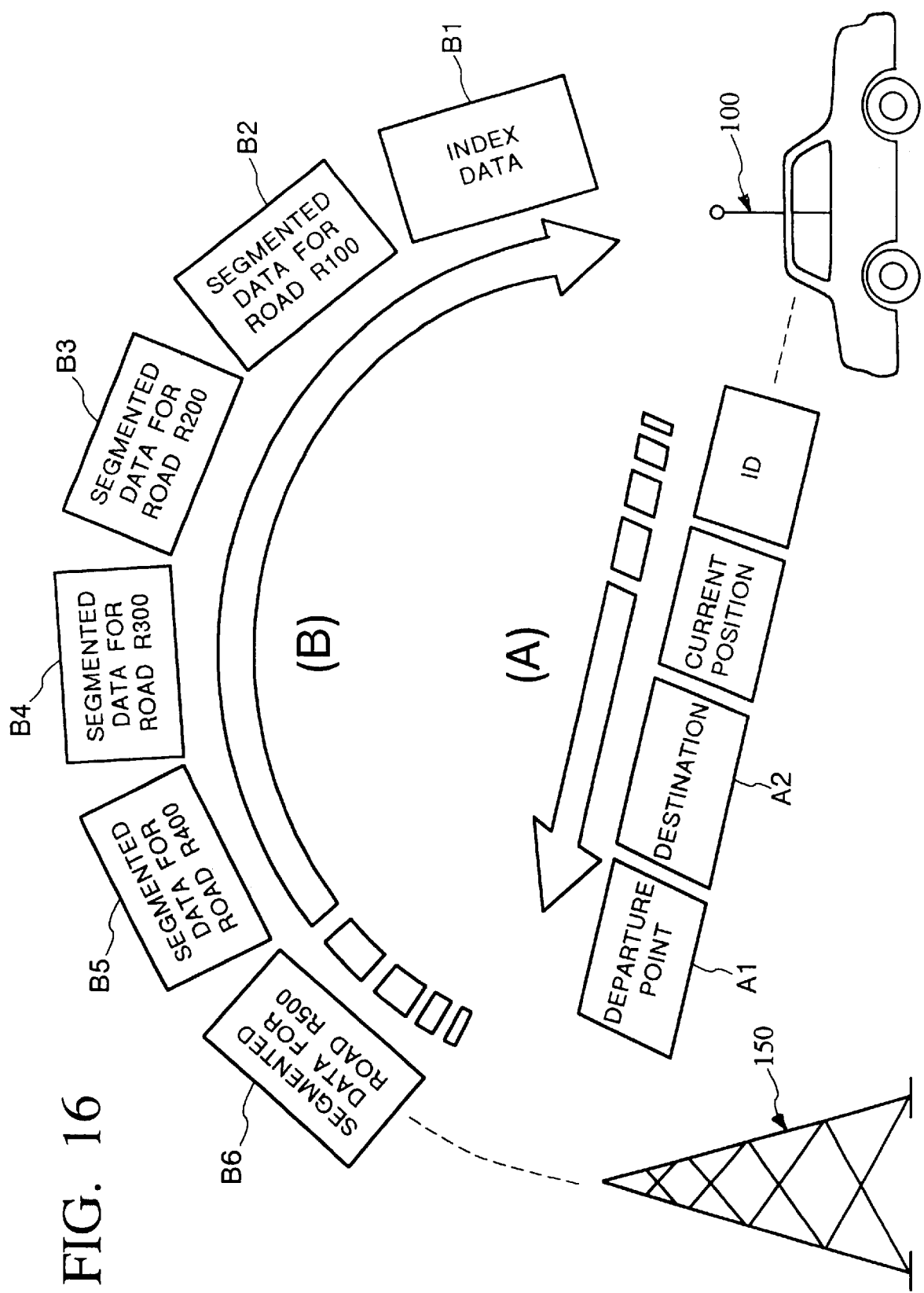
FIG. 16 is an illustration which shows the communication state between the navigation base apparatus and the navigation apparatus for the transmission and reception of data.

In this connection, FIG. 16 illustrates the communication state between the navigation base apparatus 150 and the navigation apparatus 100 for the transmission and reception of each of the data described above.

In FIG. 16, transmission of departure point data and destination data along with other data from the navigation apparatus 100 to the navigation base apparatus 150 is shown by the arrow A, and the transmission of data used for route guidance (route/guidance information) from the navigation base apparatus 150 to the navigation apparatus 100 is shown by the arrow B.

As shown in FIG. 16, in addition to the segmented data, the navigation base apparatus 150 also transmits index data B1 (described below) to the navigation apparatus 100.

As shown by the arrow B in FIG. 16, the index data B1 is the first data to be transmitted to the navigation apparatus 100 from the navigation base apparatus 150.

Further, following the index data B1, the segmented data are shown as being transmitted in the order described above.

In this regard, the segmented data B2 for road R100 corresponds to the data shown in FIG. 15(A). Similarly, the segmented data B3–B6 for the roads R200–R500 shown in FIG. 16 respectively correspond to the data shown in FIGS. 15(B)–15(E).

Next, with reference to FIG. 17, a description will be given for the structure of the index data.

FIG. 17 specifically shows the structure of the index data in FIG. 16.

As shown in FIG. 17, the index data includes a block (a) for the road R100, a block (b) for the road R200, a block (c) for the road R300, a block (d) for the road R400, and a block (e) for the road R500.

Each of these blocks includes road number data for a specific road, data showing the length of the specified road, and data showing the amount of data included in the segmented data for the specified road.

By referring to such index data, it becomes possible for the navigation apparatus 100 to quickly retrieve the segmented data and other data stored in the navigation apparatus 100.

Next, with reference to FIG. 18, a description will be given for the structure of the segmented data.

Figure 18:
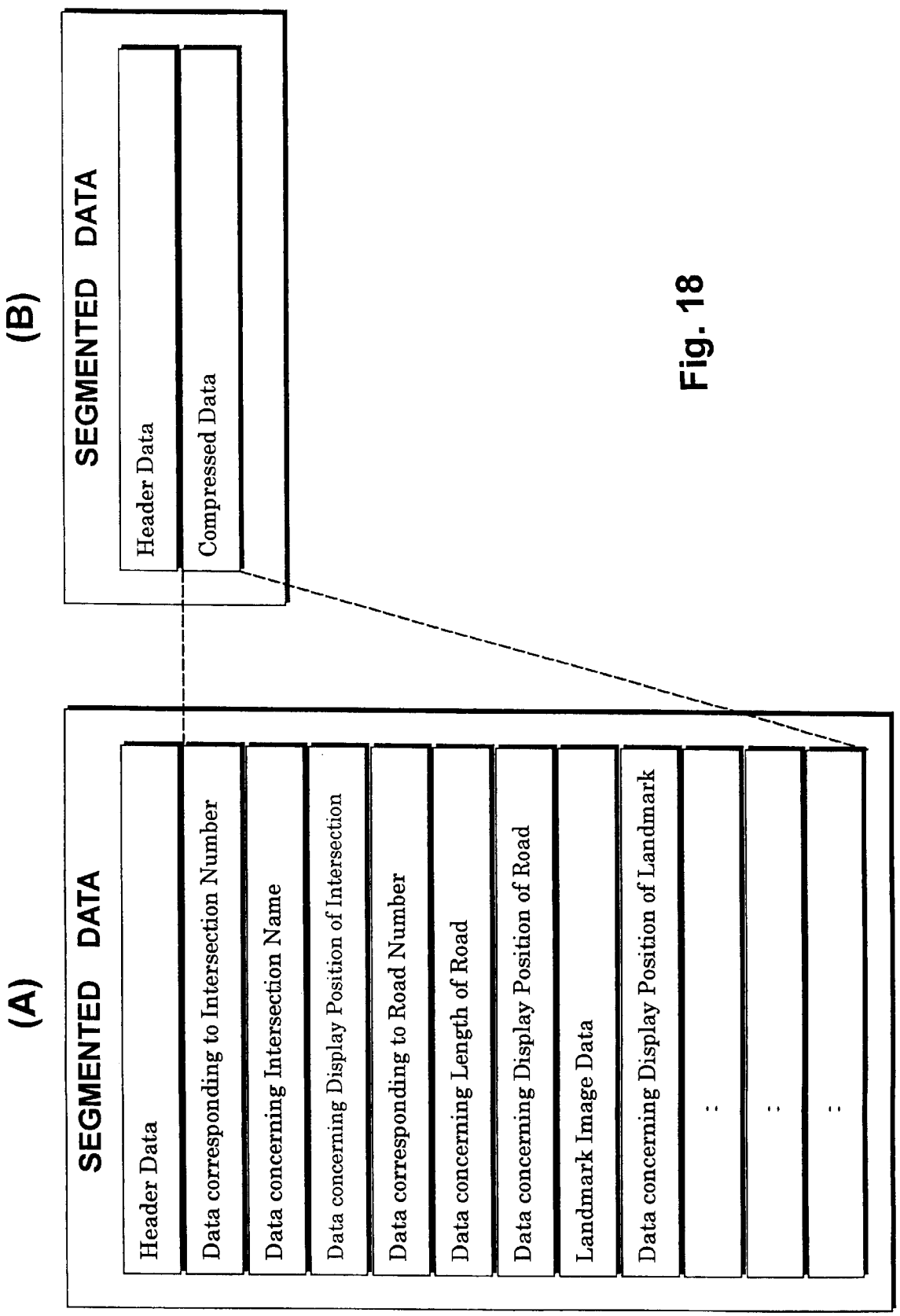
FIG. 18(A) shows a structure of segmented data.
FIG. 18(B) shows compressed segmented data which has been compressed by a data compressing section of the navigation base apparatus.

FIG. 18 is shows the structure of segmented data.

As shown in FIG. 18, the segmented data generally includes header data arranged at the head of the segmented data; data corresponding to the intersection number; data concerning the intersection name; data concerning the display position of the intersection; data corresponding to the road number; data concerning the length of the road; data concerning the display position of the road; landmark image data; data concerning the display position of the landmark; and other data.

By utilizing each of the data included in the segmented data described above, it becomes possible to display route guidance like that shown in FIG. 8 on the display 106.

Now, before the segmented data are transmitted from the navigation base apparatus 150 to the navigation apparatus 100, they are compressed by the data compressing section 162 of the navigation base apparatus 150.

In this regard, FIG. 18(B) shows the compressed segmented data after the data compressing section 162 has compressed the segmented data shown in FIG. 18(A).

As shown in FIG. 18(B), the compressed segmented data includes header data and compressed data.

In this way, by using the data compressing section 162 to compress each of the segmented data, the present embodiment makes it possible to reduce the amount of data to be transmitted from the navigation base apparatus 150 to the navigation apparatus 100 in comparison with conventional navigation systems.

Further, by reducing the amount of data to be transmitted from the navigation base apparatus 150 to the navigation apparatus 100, it becomes possible to shorten the time (communication time) required for the transmission and reception of data. As a result, when data is transmitted and received via a telephone line, the present embodiment makes it possible to reduce communication costs in comparison with conventional navigation systems.

Furthermore, by shortening the communication time, it becomes possible to reduce the frequency of occurrence of communication errors in comparison with conventional navigation systems.

Next, with reference to FIGS. 19–21, the process for the transmission and reception of data between the navigation base apparatus 150 and the navigation apparatus 100 will be described in detail.

Figure 19:
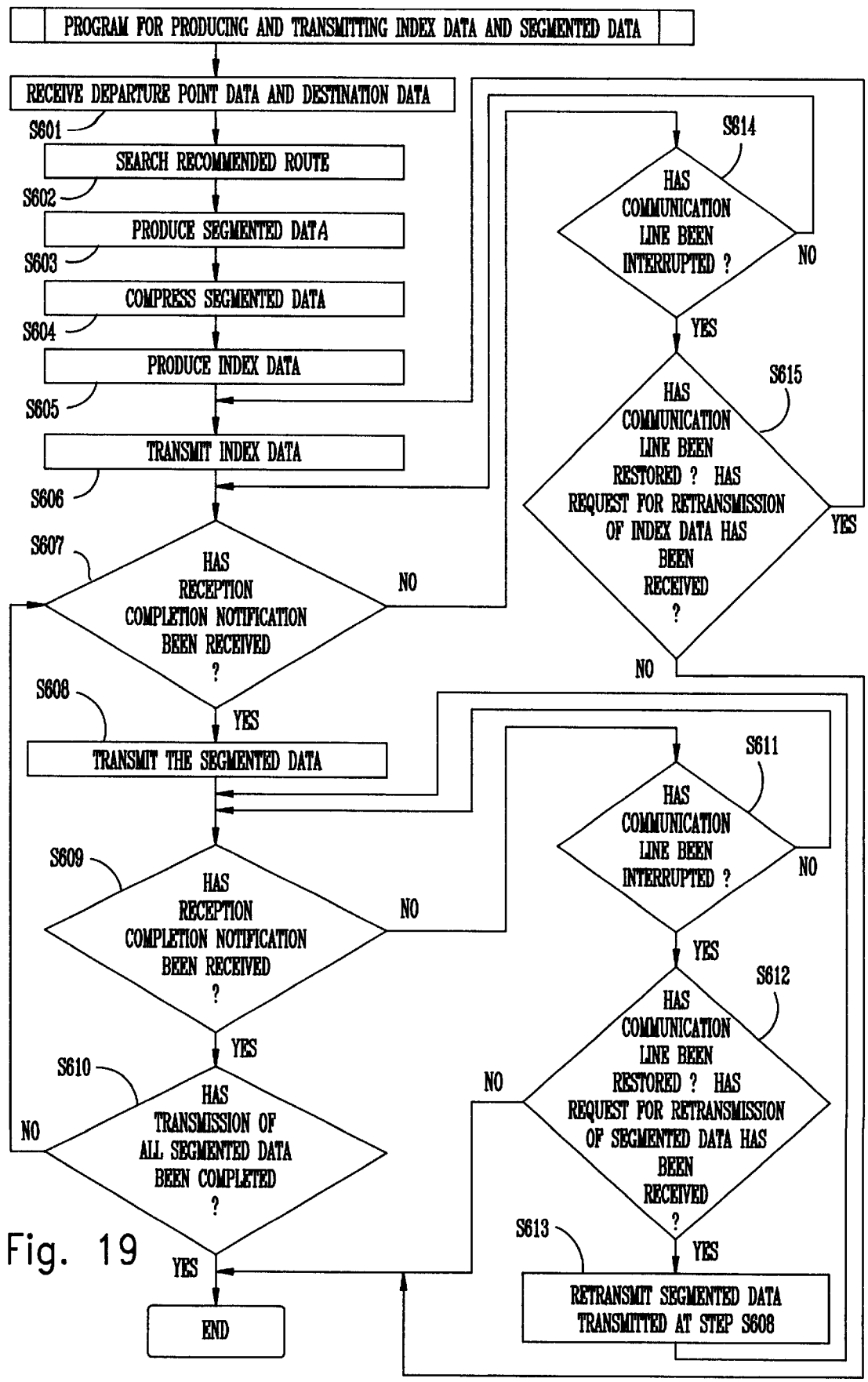
FIG. 19 is a flow chart showing a process carried out in the navigation base apparatus during transmission and reception of data between the navigation apparatus and the navigation base apparatus.

FIG. 19 is a flow chart showing the process carried out in the navigation base apparatus 150 during the transmission and reception of data between the navigation apparatus 100 and the navigation base apparatus 150. FIGS. 20 and 21 schematically show the process for transmitting and receiving data between the navigation apparatus 100 and the navigation base apparatus 150, respectively.

First, with reference to Steps S601–S610 in FIG. 19 and FIG. 20, a description will be given for the case where transmission and reception of data is carried out between the navigation base apparatus 150 and the navigation apparatus 100 without any trouble.

Figure 20:
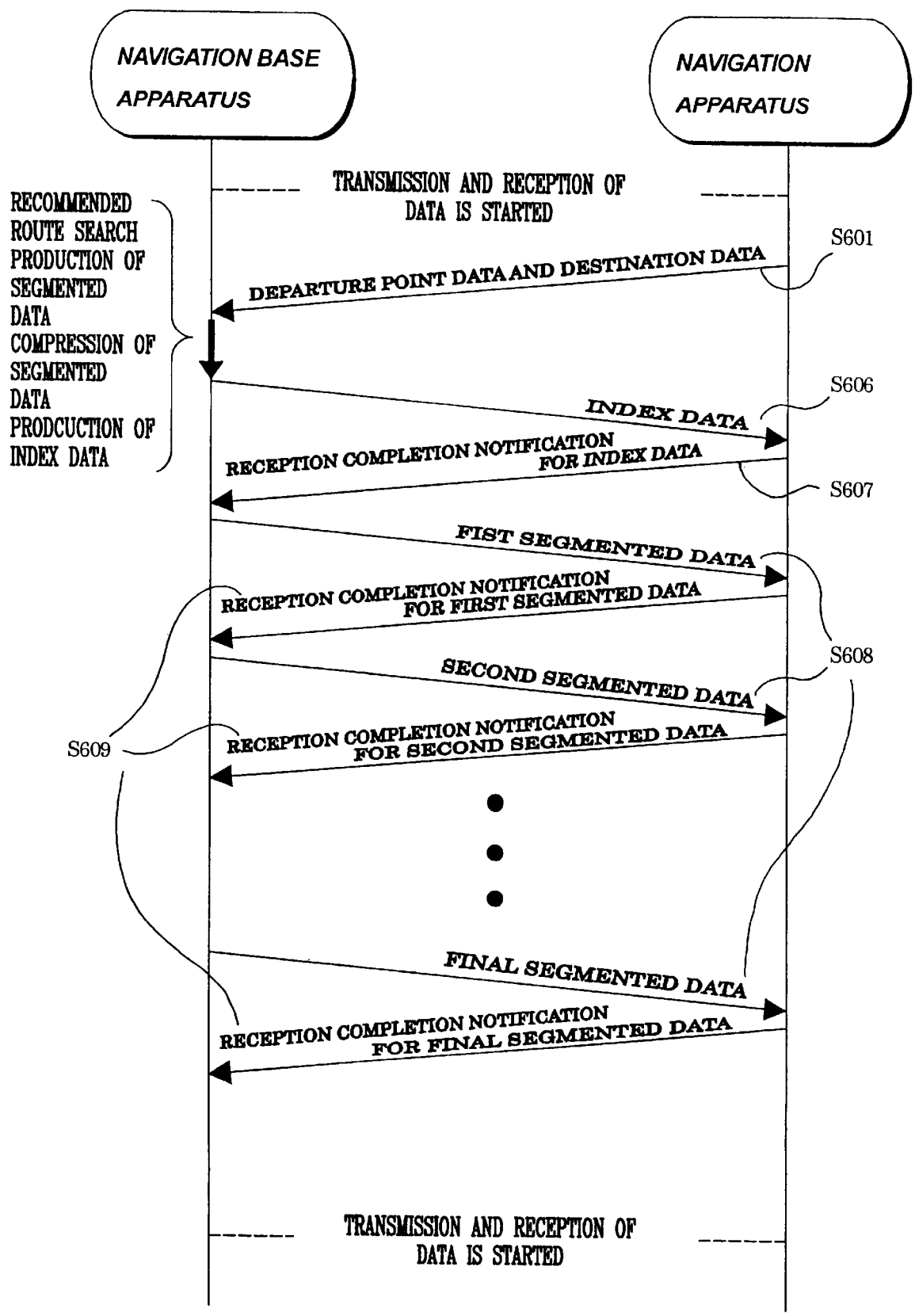
FIG. 20 schematically shows a process for transmitting and receiving data between the navigation apparatus and the navigation base apparatus.

The transmitting and receiving section 151 of the navigation base apparatus 150 receives departure point data and destination data transmitted from the navigation apparatus 100 (see Step S601 in FIGS. 19 and 20).

Next, based on the departure point data and the destination data received by the transmitting and receiving section 151, the route search section 153 of the navigation base apparatus 150 searches a recommended route from the departure point to the destination (see Step S602/FIG. 14).

Next, the database control section 155 of the navigation base apparatus 150 produces segmented data by dividing the recommended route which has been searched at step S302 into a plurality of portions and then extracting route/guidance information for the respective portions of the divided route (Step S603/see FIGS. 15(A)–15(E)).

Next, each of the segmented data produced at Step S603 are compressed by the data compressing section 162 of the navigation base apparatus 150 (Step S604/see FIG. 18(B)).

Next, by referring to each segmented data, the navigation base apparatus 150 produces index data (Step S605/see FIG. 17).

When the production of the segmented data and the index data has been completed, the transmitting and receiving section 151 of the navigation base apparatus 150 begins to transmit the index data (Step S606 in FIGS. 19 and 20). Then, when the reception of the index data by the navigation apparatus 100 has been completed, the navigation apparatus 100 transmits a reception completion notification to the navigation base apparatus 150 (Step S607 in FIG. 20). This reception completion notification includes data indicating that the reception of the index data was completed.

Then, when the navigation base apparatus 150 receives the reception completion notification from the navigation apparatus 100, the navigation base apparatus 150 judges that the transmission of the index data was successful ("YES" judgement at Step S607).

Next, the navigation base apparatus 150 begins to transmit the segmented data to the navigation apparatus 100 (Step S608 in FIGS. 19 and 20). In this regard, the segmented data is transmitted to the navigation apparatus 100 in the order shown in FIG. 16.

Then, when the reception of the segmented data by the navigation apparatus 100 has been completed, the navigation apparatus 100 transmits a reception completion notification to the navigation base apparatus 150 each time each segment data is received (Step S609 in FIGS. 19 and 20). Each of these reception completion notifications includes data indicating that the reception of the specified segmented data was completed.

Then, when the navigation base apparatus 150 receives each reception completion notification from the navigation apparatus 100, the navigation base apparatus 150 judges that the transmission of the specified segmented data was successful ("YES" judgement at Step S609).

Next, the navigation base apparatus 150 makes a judgement as to whether or not the transmission of all the segmented data produced at Step S603 has been completed (Step S610).

In the case where it is judged at Step S610 that there remain segmented data that have not been transmitted ("NO" judgement at Step S610), the program returns to Step S607 and the transmission of the remaining segmented data is carried out.

On the other hand, in the case where the transmission of all the segmented data is judged to be completed at Step S610 ("YES" judgement at Step S610), the program for producing and transmitting the index data and segmented data is ended.

Next, with reference to Steps S611–S613 in FIG. 19 and FIG. 21, a description of the process carried out in the navigation base apparatus 150 will be given for the case where a communication error occurs during the transmission of segmented data to the navigation apparatus 100.

Namely, in the case where it is judged at Step S609 that the navigation base apparatus 150 has not yet received a reception completion notification from the navigation apparatus 100 ("NO" judgement at Step S609), the navigation base apparatus 150 makes a judgement as to whether or not the communication line has been interrupted (Step S611).

In the case where it is judged at Step S611 that there is no interruption in the communication line ("NO" judgement at Step S611), the navigation base apparatus 150 waits to receive the reception completion notification from the navigation apparatus 100.

On the other hand, in the case where it is judged at Step S611 that the communication line has been interrupted ("YES" judgement at Step S611/Step S611 in FIG. 21), the navigation base apparatus 150 makes a judgement as to whether or not a communication line has been restored and whether or not a request for retransmission of the specified segmented data has been received from the navigation apparatus 100 (Step S612).

In the case where, following the interruption in the communication line, the communication line has not been reestablished and a request for retransmission of the specified segmented data has not been received from the navigation apparatus 100, the transmission and reception of the data between the navigation base apparatus 150 and the navigation apparatus 100 can not be continued.

Accordingly, in the case where it is judged at Step S612 that the communication line has not been restored and that a request for retransmission of the specified segmented data has not been received from the navigation apparatus 100 ("NO" judgement at Step S612), the program for producing and transmitting the index data and the segmented data is ended.

Figure 21:
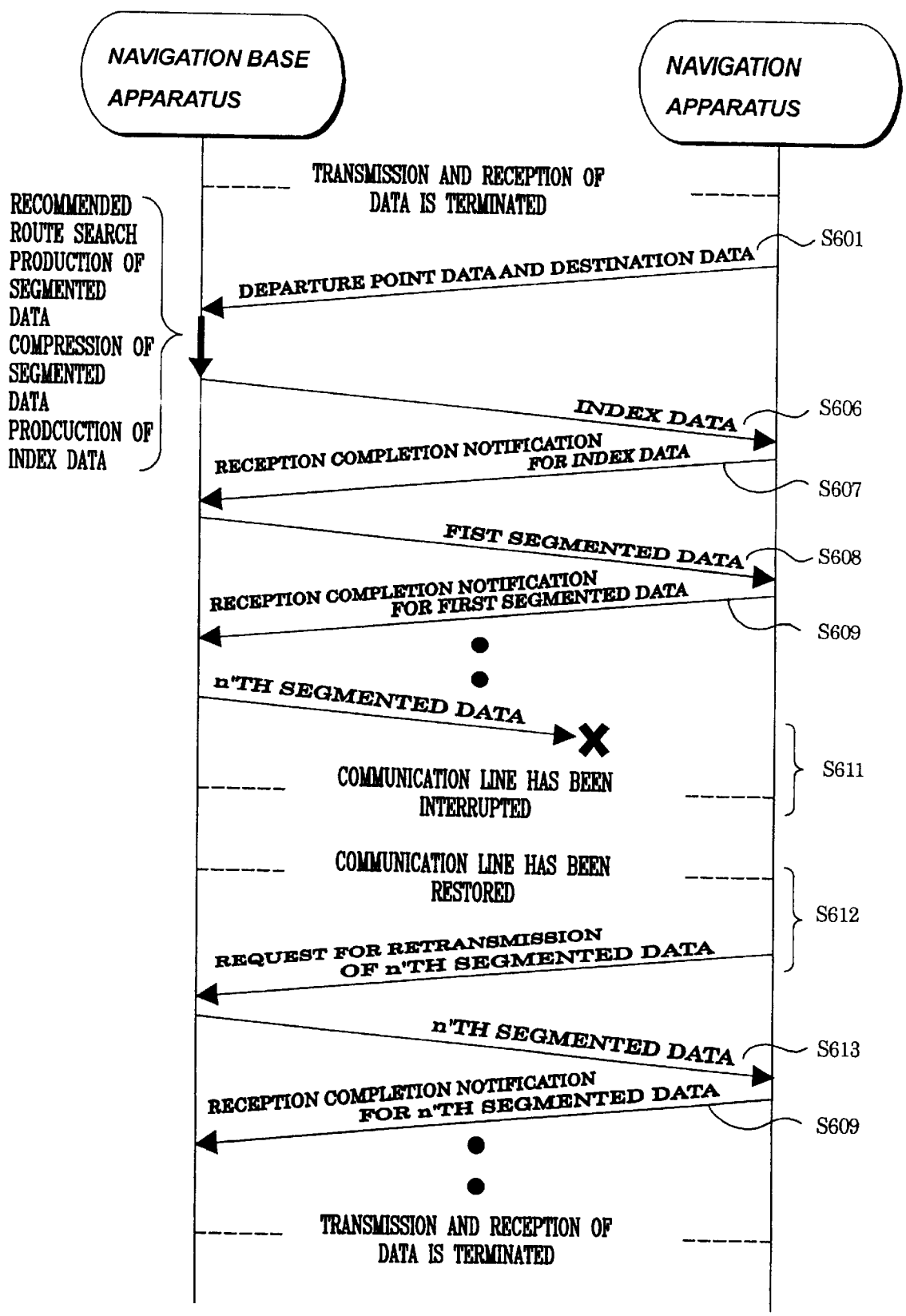
FIG. 21 schematically shows a process for transmitting and receiving data between the navigation apparatus and the navigation base apparatus.

On the other hand, in the case where it is judged at Step S612 that the communication line has been restored and that a request for retransmission of the specified data segment has been received from the navigation apparatus 100 ("YES" judgement at Step S612 in FIG. 19/Step S612 in FIG. 21), the navigation base apparatus 150 retransmits the segmented data transmitted at Step S608 (Step S613 in FIGS. 19 and 21). Then, the navigation base apparatus 150 waits to receive a reception completion notification from the navigation apparatus 100.

Next, with reference to Steps S614 and S615 of FIG. 19, a description of the process carried out in the navigation base apparatus 150 will be given for the case where a communication error occurs during the transmission of the index data to the navigation apparatus 100.

Namely, in the case where it is judged at Step S607 that the navigation base apparatus 150 has not yet received the reception completion notification for the index data ("NO" judgement at Step S607), the navigation base apparatus 150 makes a judgement as to whether or not the communication line has been interrupted (Step S614).

In the case where it is judged at Step S614 that there is no interruption in the communication line ("NO" judgement at Step S614), the navigation base apparatus 150 waits to receive the reception completion notification from the navigation apparatus 100.

On the other hand, in the case where it is judged at Step S614 that the communication line has been interrupted ("YES" judgement at Step S614), the navigation base apparatus 150 makes a judgement as to whether or not the communication line has been restored and whether or not a request for retransmission of the index data has been received from the navigation apparatus 100 (Step S615).

In the case where, following the interruption in the communication line, the communication line has not been reestablished and a request for retransmission of the index data has not been received from the navigation apparatus 100, the transmission and reception of the data between the navigation base apparatus 150 and the navigation apparatus 100 can not be continued.

Accordingly, in the case where it is judged at Step S615 that the communication line has not been restored and that a request for retransmission of the index data has not been received from the navigation apparatus 100 ("NO" judgement at Step S615), the program for producing and transmitting the index data and segmented data is ended.

On the other hand, in the case where it is judged at Step S615 that the communication line has been restored and that a request for retransmission of the index data has been received from the navigation apparatus 100 ("YES" judgement at Step S615), the navigation base apparatus 150 retransmits the index data (Step S606) and then waits to receive a reception completion notification for the index data from the navigation apparatus 100.

In accordance with the process for transmitting and receiving the data described above, the navigation apparatus 100 transmits a reception completion notification to the navigation base apparatus 150 each time upon the reception of the index data and the reception of each segmented data. Thus, by referring to these reception completion notifications, the navigation base apparatus 150 can confirm that the transmission of the data was completed. As a result, the navigation base apparatus 150 can reliably transmit data to the navigation apparatus 100.

Next, with reference to FIGS. 22 and 23, the process for expanding data and the process for erasing data carried out in the navigation apparatus 100 will be described in detail.

Figure 22:
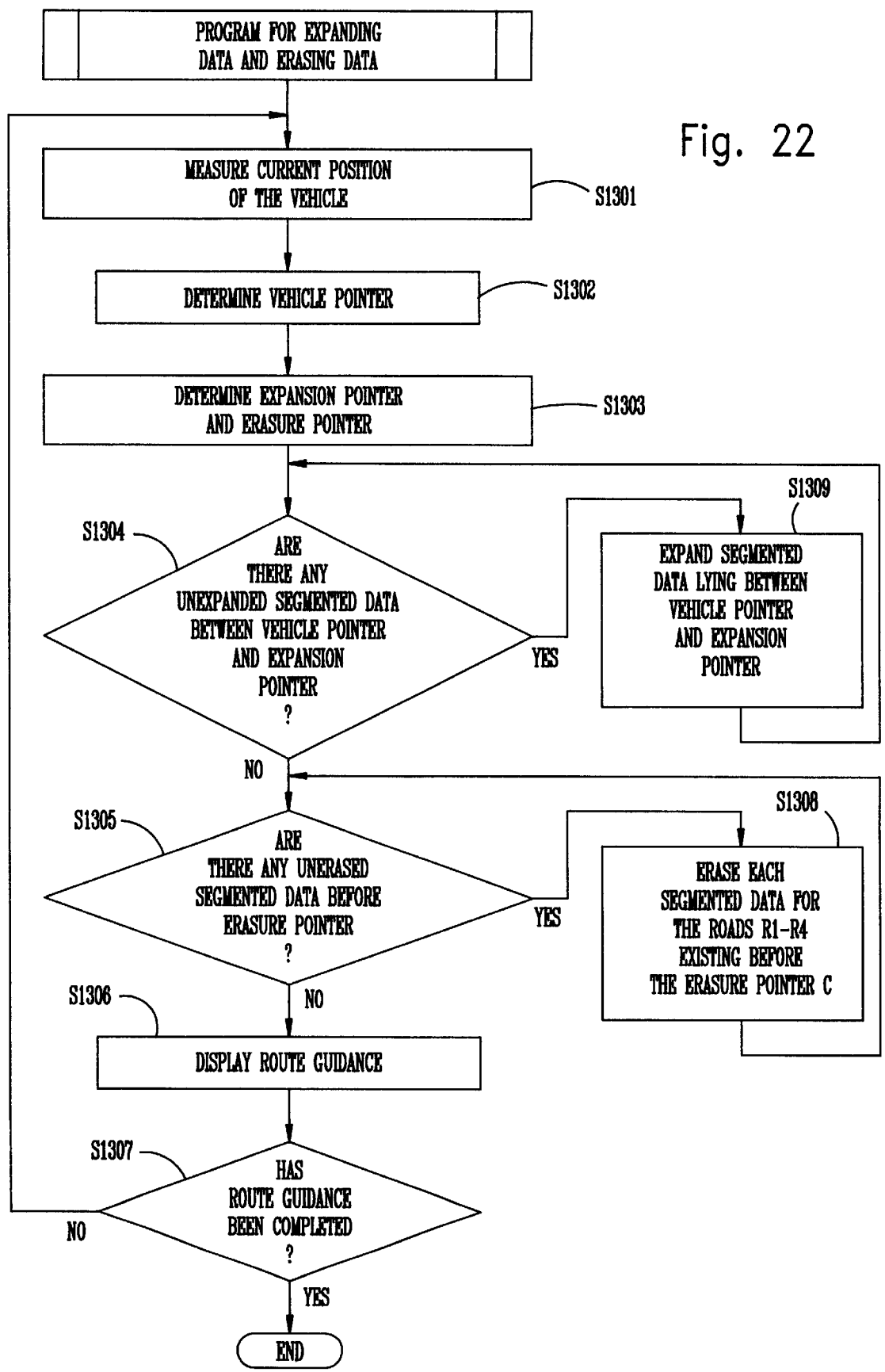
FIG. 22 is a flow chart showing processes for expanding data and for erasing data carried out in the navigation apparatus.
Figure 23:
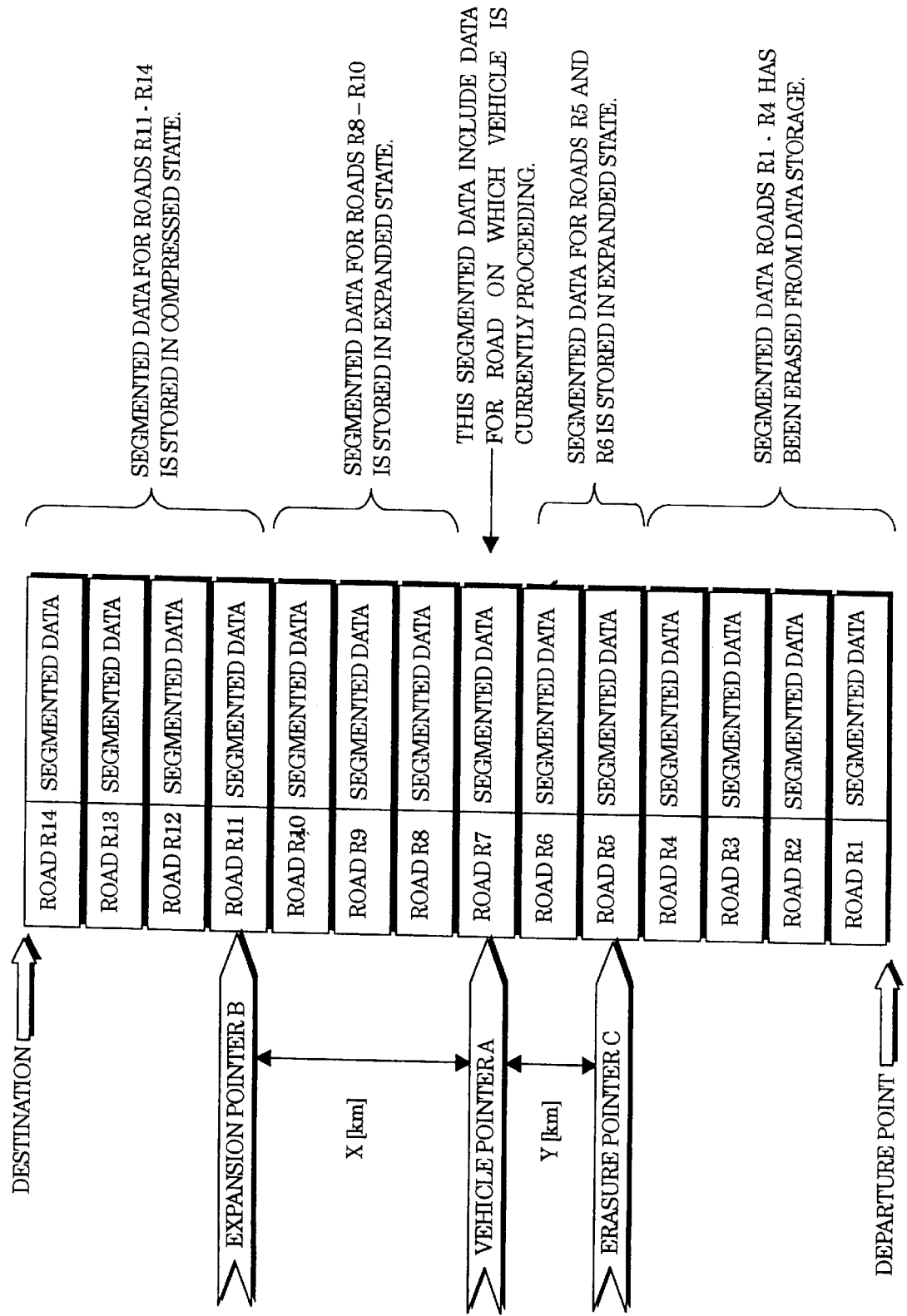
FIG. 23 schematically shows processes for expanding data and for erasing data carried out in the navigation apparatus.

FIG. 22 is a flow chart showing the process for expanding data and the process for erasing data carried out in the navigation apparatus 100, and FIG. 23 schematically shows the process for expanding data and the process for erasing data carried out in the navigation apparatus 100. Now, in the following description, it will be assumed that the searched recommended route from the departure point to the destination includes the roads R1–R14. Further, it will also be assumed that the reception of each segmented data required for route guidance has been completed at the navigation apparatus 100.

First, the position measuring section 104 of the navigation apparatus 100 (see FIG. 1) measures the current position of the vehicle on which the navigation apparatus 100 is mounted (Step S1301).

Next, based on the data concerning the current position of the vehicle measured at Step S1301, the processing section 101 of the navigation apparatus 100 determines a vehicle pointer (Step S1302/see the vehicle pointer A in FIG. 23). In the present embodiment, the vehicle pointer serves to show the current driving position of the vehicle on which the navigation apparatus 100 is mounted.

Next, with reference to the data concerning the current position of the vehicle measured at Step S1301, the processing section 101 of the navigation apparatus 100 determines an expansion pointer (Step S1303/see the expansion pointer B in FIG. 23). In the present embodiment, the expansion pointer serves to show the point on the recommended route that is at a distance of X km forward the current position (indicated by the vehicle pointer) of the vehicle, which is measured at Step S1301. In FIG. 23 the expansion pointer B is represented as being at a position located at a distance of X [km] from the vehicle pointer A. In this regard, the value of "X" may be set in advance by the user.

Further, the processing section 101 of the navigation apparatus 100 determines an erasure pointer (see Step S1303/the erasure pointer C in FIG. 23). In the present embodiment, the erasure pointer serves to show the point on the recommended route that is at a distance of Y [km] backward the current position of the vehicle, which is measured at Step S1301. In FIG. 23, the erasure pointer C is represented as being at a position located at a distance of Y [km] from the vehicle pointer A. In this regard, the value of "Y" may be set in advance by the user.

Next, with reference to the header data included in each segmented data, the processing section 101 of the navigation apparatus 100 makes a judgement as to whether or not there are any unexpanded segmented data between the vehicle pointer and the expansion pointer. In other words, the processing section 101 of the navigation apparatus 100 makes a judgement as to whether or not the segmented data for the roads existing between the vehicle pointer A and the expansion pointer B are stored in the data storage 103 in a compressed state (Step S1304).

In the case where it is judged at Step S1304 that such compressed segmented data exists in the data storage 103 ("YES" judgement at Step S1304), the segmented data are expanded (Step S1309). For the example shown in FIG. 23, each segmented data for the roads R8–R10 lying between the vehicle pointer A and the expansion pointer B is expanded by the processing section 101.

On the other hand, in the case where it is judged at Step S1304 that there are no such compressed segmented data existing in the data storage 103 ("NO" judgement at Step S1304), or in the case where the expansion process has been completed for the specified segmented data, the program in FIG. 22 proceeds to Step S1305, and a process for erasing predetermined segmented data stored in the data storage 103 is carried out.

Namely, by referring to the header data included in each segmented data, the processing section 101 of the navigation apparatus 100 makes a judgement as to whether or not there exist any unerased segmented data before the erasure pointer. In other words, the processing section 101 of the navigation apparatus 100 makes a judgement as to whether or not the segmented data for the roads that exist before the erasure pointer is stored in the data storage 103 (Step S1305).

In the case where it is judged at Step S1305 that such segmented data exists in the data storage 103 ("YES" judgement at Step S1305), the processing section 101 erases the segmented data (Step S1308). For the example shown in FIG. 23, each segmented data for the roads R1–R4 existing before the erasure pointer C is erased by the processing section 101.

On the other hand, in the case where it is judged at Step S1305 that there are no such segmented data existing in the data storage 103 ("NO" judgement at Step S1305), or in the case where the erasure process has been completed for the specified segmented data, the program in FIG. 22 proceeds to Step S1306, and route guidance is displayed on the display 106.

Then, the navigation apparatus 100 repeats the process from Step S1301 to Step S1309 until route guidance is judged to be completed at Step S1307.

Now, by carrying out the data expansion process and data erasure process described above, each segmented data stored in the data storage 103 of the navigation apparatus 100 is expanded in accordance with the driving position of the vehicle. Further, by carrying out the data expansion process and data erasure process described above, each segmented data stored in an expanded state in the data storage 103 of the navigation apparatus 100 is erased in accordance with the driving position of the vehicle. In this way, it becomes possible to construct the data storage 103 from a storage medium having a relatively small storage capacity. As a result, it becomes possible to reduce the cost of manufacturing the navigation apparatus 100 of the navigation system according to the present embodiment.

At this point, it should be noted that the present embodiment is not limited to the method of producing segmented data described above. For example, the segmented data may be produced in the following manner. First, based on the data of the recommended route searched by the route search section 153, the database control section 155 extracts the route/guidance information for the recommended route from the route/guidance data stored in the database 152. Then, the database control section 155 divides such extracted route/ guidance information into data segments corresponding to a plurality of roads of a searched recommended route.

Now, in the communication-type navigation system according to the present embodiment, the route/guidance information to be transmitted to the navigation apparatus 100 is divided by the navigation base apparatus 150 into a plurality of data segments. In this way, it becomes possible to transmit such route/guidance information to the navigation apparatus 100 in the form of separate data segments. As a result, in the case where a communication error occurs during the transmission of route/guidance information to the navigation apparatus 100, the navigation base apparatus 150 according to the present embodiment makes it possible to reduce the amount of data to be retransmitted to the navigation apparatus 100.

Further, by transmitting the route/guidance information in the form of separate data segments, it is possible for the navigation apparatus 100 according to the present embodiment to begin route guidance without having to wait for all the route/guidance information to be received. For example, when the recommended route is that shown in FIG. 13, it is possible for the navigation apparatus 100 to begin route guidance for the road R100 even when the navigation apparatus 100 is still in the process of receiving the segmented data for the road R200.

Furthermore, in the present embodiment of a communication-type navigation system, the navigation apparatus 100 processes each segmented data individually. As a result, the navigation apparatus 100 can process the route/guidance information more efficiently.

Next, a third embodiment of a communications navigation system according to the present invention will be described with reference to FIGS. 24–33. In this regard, the elements of the third embodiment that are the same as those of the first and second embodiments will be designated by the same reference characters, and for this reason a detailed description of such elements will not be given.

First, the basic structure of the communications navigation system according to the third embodiment of the present invention will be described.

In the same manner as the first and second embodiments described above, the communications navigation system according to the third embodiment carries out transmission and reception of data between the navigation base apparatus and each of a plurality of navigation apparatuses provided in vehicles using communication.

Hereinafter, the navigation base apparatus 150 used in the communications navigation system according to the third embodiment will be described.

The navigation base apparatus 150 includes a transmitting and receiving section 151, a database 152, and a route search section 153 in the same manner as the first embodiment (see FIG. 1).

In this embodiment, the navigation base apparatus 150 determines necessary route/guidance information to be transmitted to the navigation apparatus 100 by referring to the user's information stored in the navigation base apparatus 150 which is identified by the ID assigned to the respective navigation apparatus 100 in the same manner as the first embodiment. Then, the navigation base apparatus 150 extracts data corresponding to the necessary route/guidance information from the route/guidance data stored in the database 152 and then transmits the extracted data to the navigation apparatus 100 identified by the ID data.

In this embodiment, the database 152 of the navigation base apparatus 150 is constructed from a large capacity storage medium such as a hard disk or the like, and stores various navigation data (route/guidance data) necessary for carrying out route search and route guidance and the like such as data for displaying routes specified by road numbers and intersection numbers, data used for searching a recommended route, data for route guidance for the recommended route. In more details, the data stored in the database 152 is as follows, for example.

(1) Map Data:

This data is used for displaying a map on the display 106 of the navigation apparatus 100.

(2) Road Data:

This data includes various information such as road number, number and position of the nodes established on each road using Longitude and Latitude thereof, road name, road classification, road length, and images of roads (see FIG. 24(A)). In this connection, the image of each road may be formed from vector data using a plurality of coordinate data or bitmapped image data.

(3) Intersection Data:

This data includes information such as intersection number, intersection name, position of the intersection defined by Longitude and Latitude thereof, voice data for guiding to the traveling direction at the intersection, landmarks which can be utilized as guidance marks such as buildings or the like, and graphical images of prominent buildings (see FIG. 24(B)). In this connection, the "intersection" also includes forks.

(4) Search Data:

This data is used for specifying the position of the destination (which is defined by Longitude and Latitude thereof) on the basis of information such as a telephone number, address, name of the destination and the like.

In addition, in the user's information storage shown in FIG. 2, route data which has been obtained in the previous route search requests from the respective user is stored together with the ID data of the vehicle in the form of the traveled route information shown in FIG. 4.

Hereinafter, the navigation apparatus 100 used in the communications navigation system according to the third embodiment will be described.

In the same manner as the first embodiment (see FIG. 1), the navigation apparatus 100 according to the third embodiment is roughly equipped with a processing section 101, a program storage 102, a position measuring section 104, an input device 105, a display 106, an audio output section 107, and a transmitting and receiving section 108. Further, as shown in FIG. 1, the navigation apparatus 100 also includes the data storage (data storage means) 103 for storing predetermined route/guidance data, and the data synthesizing section (data synthesizing means) 109 for synthesizing route/guidance data received from the navigation base apparatus 150 with the predetermined route/guidance data stored in the data storage 103. In this navigation apparatus 100, route guidance can be carried out using the synthesized route/guidance data by the data synthesizing section 109.

As described above, the data storage 103 of the navigation apparatus 100 pre-stores predetermined route/guidance data. This predetermined route/guidance data stored in the data storage 103 includes the route/guidance information that has been received from the navigation base apparatus 150.

In this third embodiment, it is to be noted that the program storage 102 of the navigation apparatus 100 stores various programs executed by the processing section 101. Examples of such programs include (1) a program for synthesizing route/guidance data received from the navigation base apparatus 150 with the predetermined route/guidance data stored in the data storage 103; (2) a program for displaying route guidance on the display 106 based on the route/guidance data; and (3) a program for outputting the audio guidance via the audio output section 107; and the like.

Further, the data storage 103 functions as a working area during the program execution, and further stores data such as follows:

(1) Route/guidance data transmitted from the navigation base apparatus 150.

(2) Individual ID data of the vehicle.

(3) Vehicle position data (Longitude, Latitude) measured by the position measuring section 104.

In this connection, the vehicle position data includes current position data measured by the position measuring section 104 at predetermined time intervals as well as data of a plurality of past vehicle positions. The vehicle position data includes, for example, position data for measurement points within a predetermined distance or position data for a predetermined number of measurement points. In this arrangement, when a new measurement is carried out by the position measuring section 104, the position data of such new measurement is stored, while the stored oldest position data is erased. By connecting the points identified by the plurality of position data, it becomes possible to obtain the travel path of the vehicle. As will be described below, the travel path of the vehicle is utilized in "map matching" to identify the road along which the vehicle is traveling.

Next, a description will be made with regard to data transmitted and received in the communications navigation system according to the third embodiment.

In the communications navigation system according to the third embodiment, route/guidance data is transmitted and received between the navigation base apparatus 150 and the navigation apparatus 100. In this connection, the route/guidance data is transmitted in the form of the segmented data as is the same with the second embodiment. Namely, in this embodiment, the route/guidance data to be transmitted is first divided into segments having a minimum amount of data necessary for route guidance, and then each segmented data is individually transmitted from the navigation base apparatus 150 to the navigation apparatus 100 (see FIGS. 15 and 16).

Each segmented data includes data concerning roads, data concerning intersections, and other data. For example, as shown in FIG. 15(B), each segmented data includes road data (e.g., road R200) and intersection data at the end of the road (e.g., intersection C2).

Figure 25:
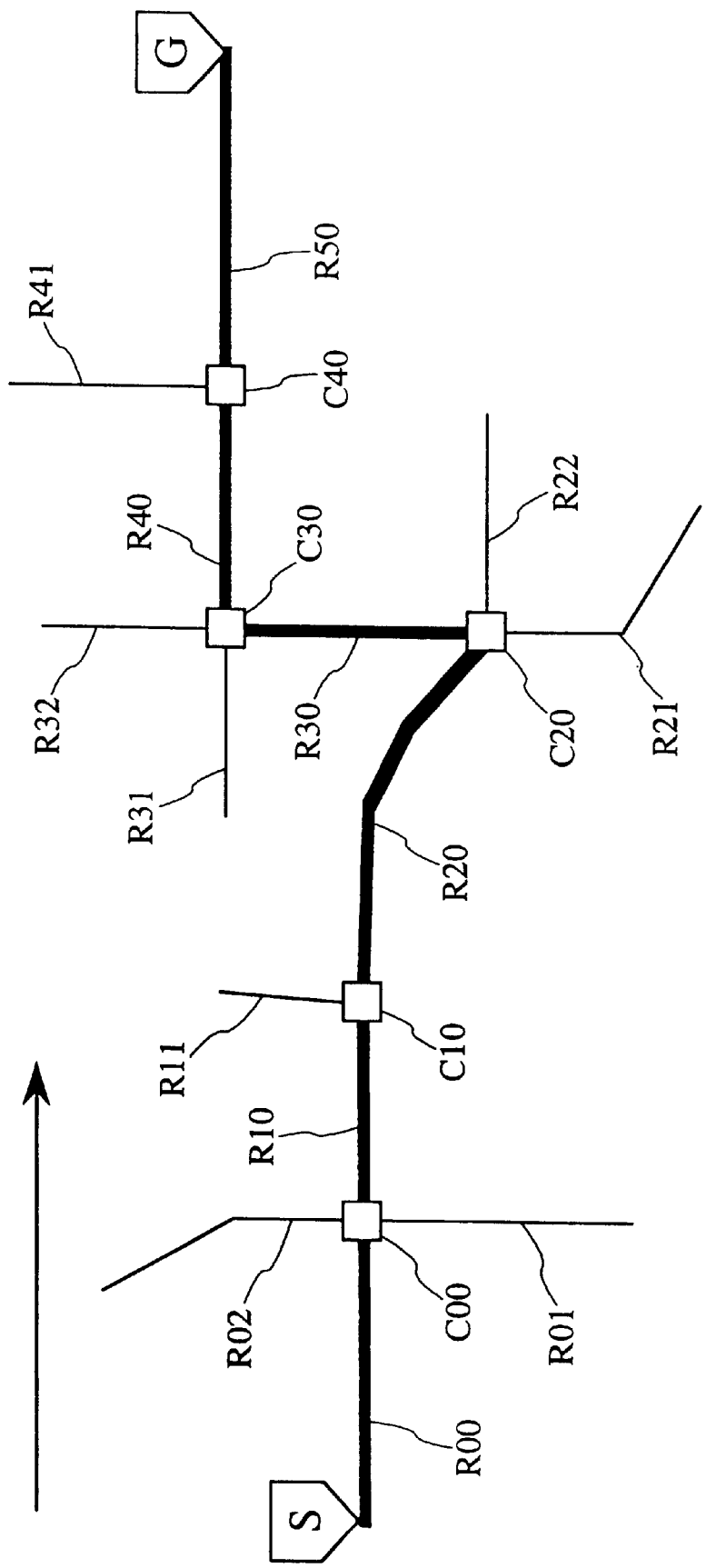
FIG. 25 is a schematic diagram which shows an example of a searched recommended route.

Next, a detailed description of such segmented data will be given with reference to a searched recommended route as shown in FIG. 25. In FIG. 25, a bold line indicates the searched recommended route from the departure point S to the destination G. Further, in FIG. 25, "Cn" (where "n" is an integer) represents intersections and "Rn" (where "n" is an integer) represents roads.

As shown in this figure, the searched route is comprised of roads and intersections indicated by R00, C00, R10, C10, R20, C20, R30, C30, R40, C40 and R50. Further, the figure shows that road R01 and road R02 are connected at the intersection C00, and that road R10, road R11 and road R20 are connected at the intersection C10. The other portion of the figure should be understood in the same way.

Figure 26:
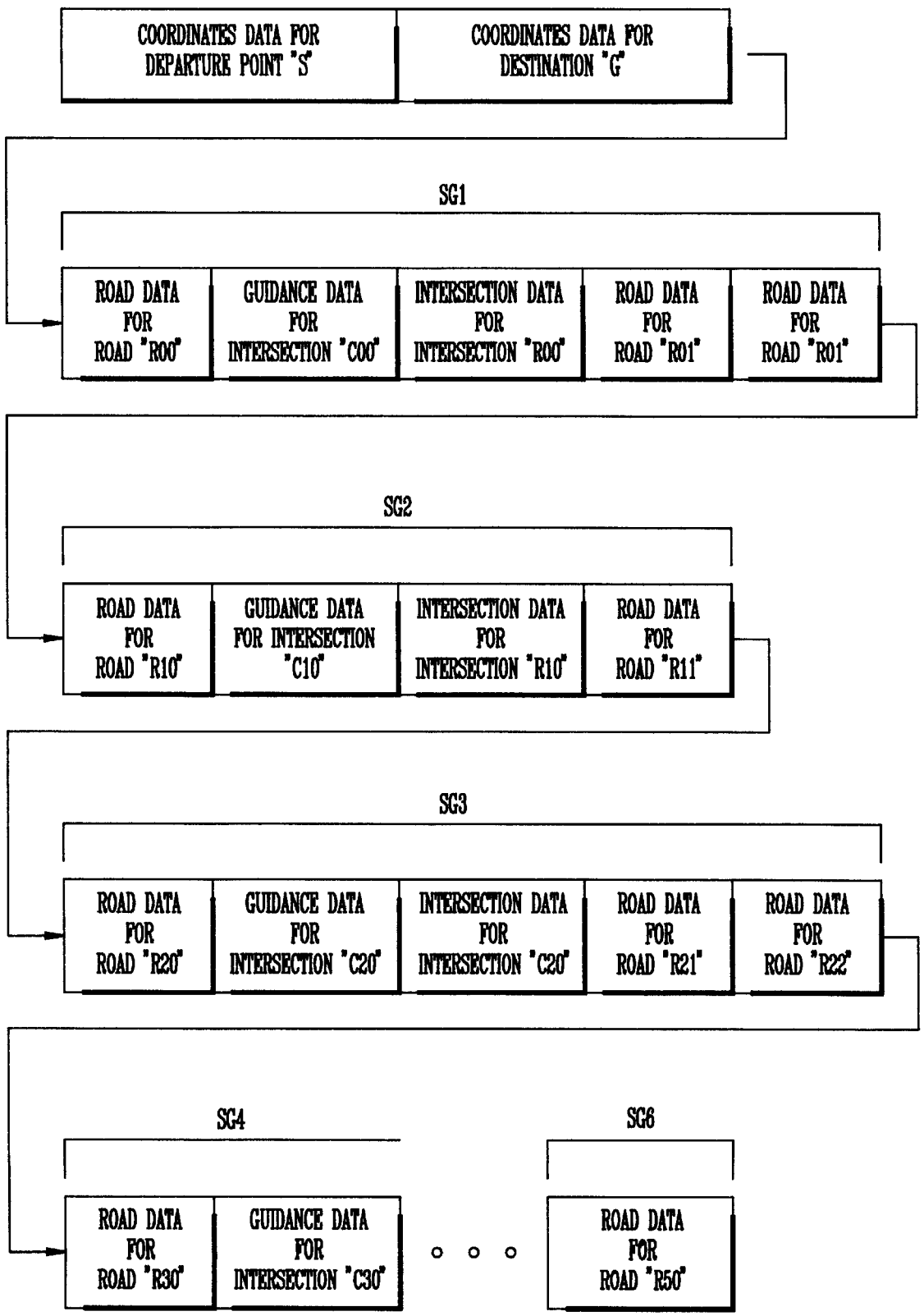
FIG. 26 schematically shows data structure of route/guidance information.

In order to carry out the route guidance for the recommended route shown in FIG. 25, route/guidance information shown in FIG. 26 is utilized.

As shown in FIG. 26, the route/guidance information for the searched recommended route is constructed from a plurality of segmented data. Namely, the route/guidance information shown in FIG. 26 includes segmented data SG1, segmented data SG2, segmented data SG3, segmented data SG4, . . . and segmented data SG6. The segmented data SG1 is formed from route data and guidance data for the road R00 and the intersection C00 and road data for the connected roads R01 and R02. Further, the segmented data SG2 is formed from route data and guidance data for the road R10 and the intersection C10 and road data for other connected road R11, and the other segmented data is also formed in a similar manner. In this connection, the last segmented data SG6 includes only route data for the road R50.

Next, the process for carrying out a route search and the process for extracting route/guidance information will be described with reference to FIG. 27.

First, the process carried out by the navigation apparatus 100 will be described. Namely, in the navigation apparatus 100, the position measuring section 104 receives GPS data in order to measure the current position (Longitude, Latitude) of the vehicle. Further, the user of the navigation apparatus 100 uses the input device 105 to input data concerning the destination, such as the facility name, telephone number or address thereof.

Next, the data of the measured current position of the vehicle is transmitted as departure point data to the navigation base apparatus 150. Further, the data concerning the destination (i.e., the facility name, telephone number or address) inputted by the user is transmitted as destination data to the navigation base apparatus 150 together with ID data of the navigation apparatus 100.

Then, this data is received by the transmitting and receiving section 151 of the navigation base apparatus 150 ("YES" judgement at Step S1), and sent to the system control section 156.

Next, based on the current position data of the vehicle transmitted from the navigation apparatus 100, the system control section 152 sets the departure point at the current position of the vehicle or at an intersection near the current position of the vehicle.

Further, based on the data concerning the destination (i.e., the facility name, telephone number or address) transmitted from the navigation apparatus 100, the system control section 156 reads out corresponding destination data from the route/guidance data in the database 152.

Next, based on the departure point and destination established by the system control section 152, the navigation base apparatus 150 carries out a route search (Step S3). Hereinafter, the process for carrying out such a route search is described below.

First, a route search program is run in the system control section 152 to search for a recommended route from the departure point to the destination based on the established departure point and destination. Then, data of the searched recommended route (see FIG. 6) is produced. In this connection, an example of such a searched route is shown in FIG. 25.

Next, the navigation base apparatus 150 compares the newly searched recommended route with the searched routes obtained by the previous route searches. In other words, by referring to the ID data of the navigation apparatus 100, the navigation base apparatus 150 makes a judgement as to whether or not the route/guidance data for the newly searched recommended route includes any route/guidance data which has been transmitted to the navigation apparatus 100 in the past (Steps S5, S6).

In the Step S6, if the guidance data in the i'th segment is judged to have been previously transmitted to the navigation apparatus 100 ("YES" judgement at Step S6), a number transmission flag which indicates that only the route data for the road and intersection contained in the i'th segment should be transmitted is set in an "ON" state (Step S7).

On the other hand, if the guidance data of the i'th segment is judged to have not been previously transmitted to the navigation apparatus 100 ("NO" judgement at Step S6), a segment transmission flag which indicates that both the route data and the guidance data should be transmitted is set in an "ON" state (Step S8). In this case, the guidance data for such segment is extracted from the database 152 (Step S9). The statement in the parentheses of Step S9 will be explained below.

By means of the judgment process described above, segmented data (which includes both the route data and guidance data) having a segment transmission flag in an "ON" state and segmented data (which includes only the route data) having a number transmission flag in an "ON" state are transmitted from the navigation base apparatus 150 to the navigation apparatus 100 identified by the ID in the order in which each segmented data appears along the searched route (i.e., in the order in which the driver will encounter the corresponding route segments) (Step S12). Then, this transmitted data is received by the navigation apparatus 100 and stored in the data storage 103. In this connection, it should be noted that the navigation base apparatus 150 carries out such a route search, extraction of the guidance data and transmission of the extracted data to the navigation apparatus 100 in accordance with the particular requirements from the navigation apparatuses 100 in the respective vehicles.

Further, the route data is not only transmitted to the navigation apparatus 100 but also stored in the user's information storage of the navigation base apparatus 150 together with the ID data of the corresponding navigation apparatus.

Next, the route search process and the guidance data extracting process will be described based on a specific example.

First, it is assumed that the recommended route shown by the bold line in FIG. 25 was previously searched and then route/guidance data concerning the searched recommended route was transmitted to the navigation apparatus 100 in the form of the segmented data. Thereafter, a recommended route shown by the bold line in FIG. 28 has been newly searched by taking various factors such as road conditions (e.g., road repair and lane restrictions), intermediate locations, driving time and driving distance into consideration.

Figure 28:
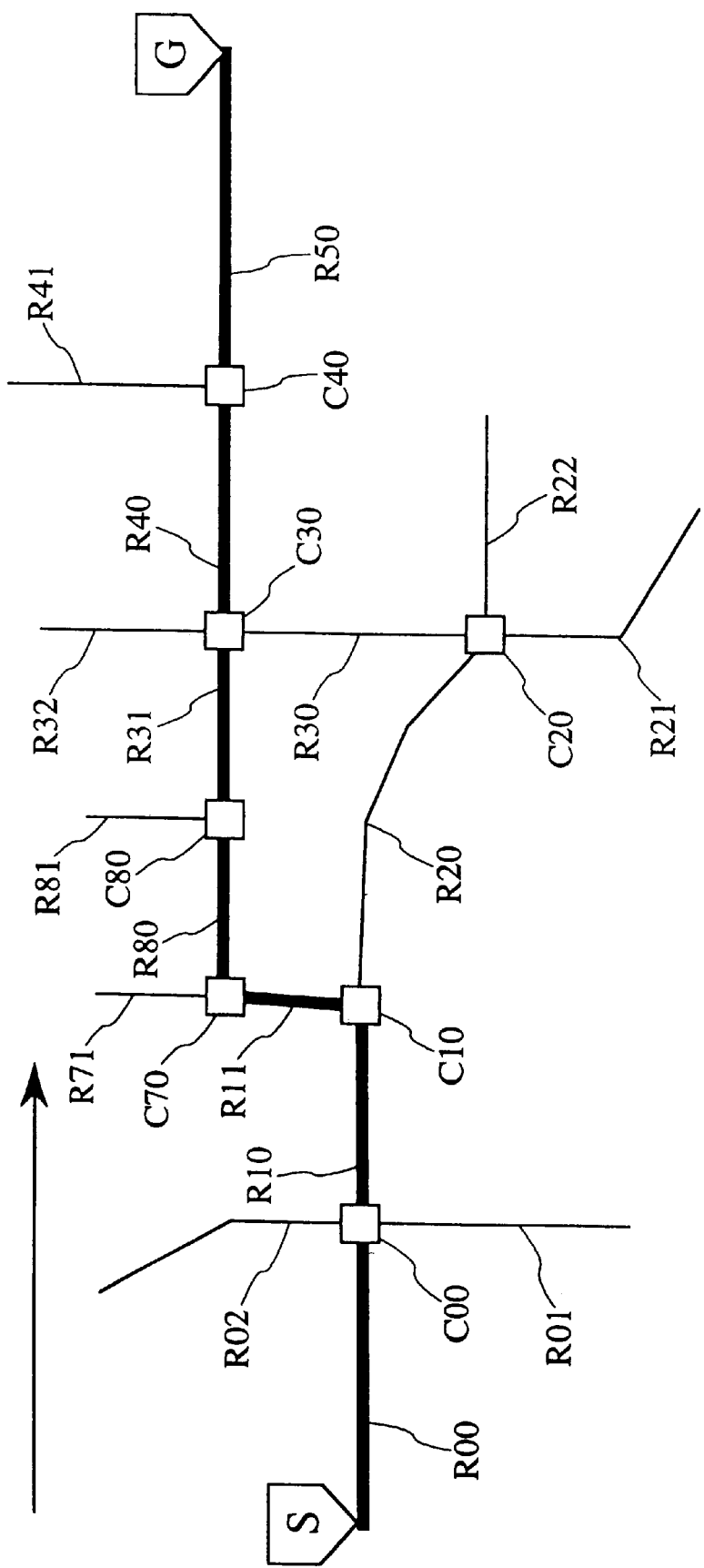
FIG. 28 is a schematic diagram which shows an example of route.

Now, a comparison of FIG. 28 with FIG. 25 reveals that, although the recommended route shown in FIG. 28 has the same departure point "S" and destination "G" as those of the recommended route shown in FIG. 25, there is a difference in some of the portions of the route therebetween.

Namely, the recommend route to the destination according to the past route search shown in FIG. 25 is as follows: Departure Point S—Intersection C10—Road R20—Intersection C20—Road R30—Intersection C30—Destination G.

On the other hand, the recommend route to the destination according to the newly conducted route search shown in FIG. 28 is as follows: Departure Point S—Intersection C10—Road R11—Intersection C70—Road R80—Intersection C80—Road R31—Intersection C30—Destination G.

Accordingly, for the newly searched recommended route shown in FIG. 28, guidance data for the route from the departure point S to the intersection C10 and guidance data for the route from the intersection C30 to the destination G were previously transmitted to the navigation apparatus 100 during the past route guidance.

In this case, in the communications navigation system according to the present embodiment, only route data (i.e., data such as road numbers and intersection numbers to indicate the route) for the route from the departure point S to the intersection C10 and the route from the intersection C30 to the destination G are transmitted from the navigation base apparatus 150 to the navigation apparatus 100.

Further, for the route from the intersection C10 to the intersection C30 shown in FIG. 28, the navigation base apparatus 150 transmits both route data and guidance data to the navigation apparatus 100.

Next, the data structure of the route/guidance data to be transmitted in the assumption case will be described with reference to FIG. 29.

Figure 29:
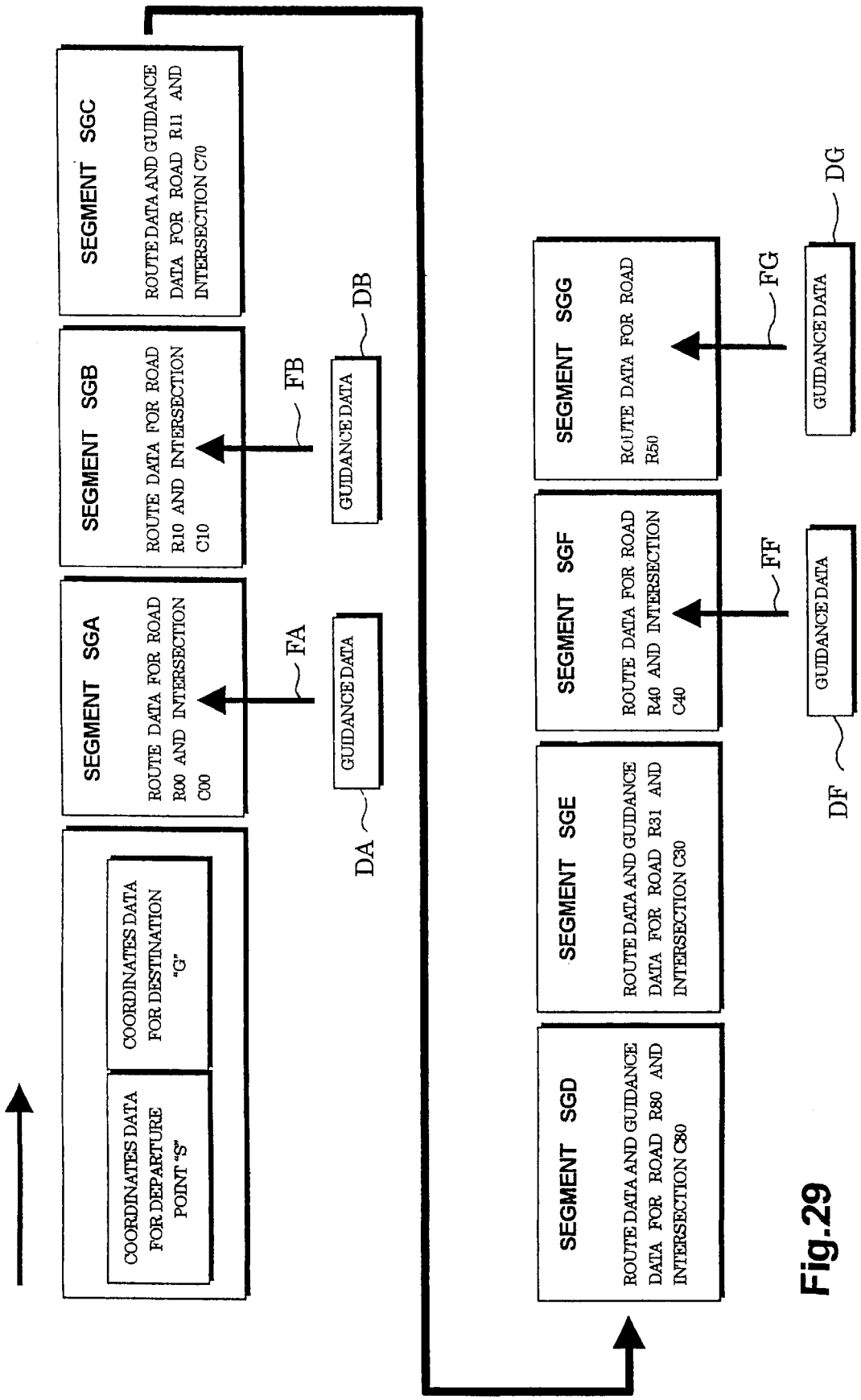
FIG. 29 schematically shows data structure of route/guidance information.

Namely, FIG. 29 shows the structure of the route/guidance data transmitted to the navigation apparatus 100 for the case where route guidance was carried out in the past based on the recommended route shown in FIG. 25 and a recommended route shown in FIG. 28 is newly searched.

In this case, all the route/guidance data shown in FIG. 29 is assumed to be a single file. Hereinbelow, a description will be given for the data structure of the file in the order in which each segmented data appears along the searched route.

The head segment of this file includes the coordinate data of the departure point and destination. Next, the segment SGA includes route data for the road R00 and the intersection C00. The segment SGB arranged after the segment SGB includes route data for the road R10 and the intersection C10. Each data in the segments SGA and SGB is synthesized with guidance data DA and DB stored in the navigation apparatus 100, respectively, to carry out the route guidance.

The segment SGC arranged after the segment SGB includes route data and guidance data for the road R11 and intersection 70. The reason why the guidance data is included in this segment is because the route/guidance data for the road 11 and intersection 70 was not transmitted to the navigation apparatus 100 during the past route guidance.

The segments SGD and SGE arranged after the segment SGC include route data and guidance data from the same reason as the segment SGC.

The segment SGF arranged after the segment SGE includes route data for the road R40 and the intersection C40, and the segment SGG arranged after the segment SGE includes route data for the road R50. Each of these segments is formed from only the route data of the road, to which guidance data DF and DG stored in the navigation apparatus 100 is respectively synthesized at the navigation apparatus 100 to carry out the route guidance.

Next, the data synthesizing process carried out at the navigation apparatus 100 will be described with reference to FIG. 30. Further, the process carried out by the navigation apparatus 100 during route guidance will also be described.

The following description will be made on the assumption that the route/guidance data shown in FIG. 26 which was received from the navigation base apparatus 150 during the past route search is stored in the data storage 103 of the navigation apparatus 100.

First, the navigation apparatus 100 receives route/guidance data corresponding to the ID from the navigation base apparatus 150 (Step S20). This received route/guidance data is stored in the data storage 103 of the navigation apparatus 100.

Next, from the route/guidance data stored in the data storage 103, the processing section 101 reads out guidance data corresponding to the current position of the vehicle measured by the position measuring section 104.

Further, the processing section 101 displays images and massages on the display 106. In addition, when necessary, the processing section 101 outputs audio guidance via the audio output section 107.

Then, by viewing the display 106 and/or listening to the audio guidance outputted from the audio output section 107, the driver of the vehicle can travel along the recommended route (Step S21).

In the route guidance process described above, the processing section 101 also runs a data synthesizing program stored in the program storage 102 to carry out the data synthesizing process as described below.

First, a judgement is made to determine whether or not segmented data transmitted from the navigation base apparatus 150 contains only route data (which includes only road number and intersection number) (Step S23).

In the case where the transmitted segmented data is judged to contain only route data ("YES" judgement at Step S23), the guidance data related to such route data is read out from the previously transmitted data stored in the data storage 103, and then after this guidance data is synthesized with the route data, route guidance is carried out using the synthesized data (Step S24).

On the other hand, in the case where the transmitted segmented data is judged to contain both route data and guidance data ("NO" judgement at Step S23), the guidance data contained in the transmitted data segment is used to carry out route guidance (Step S25).

Figure 30:
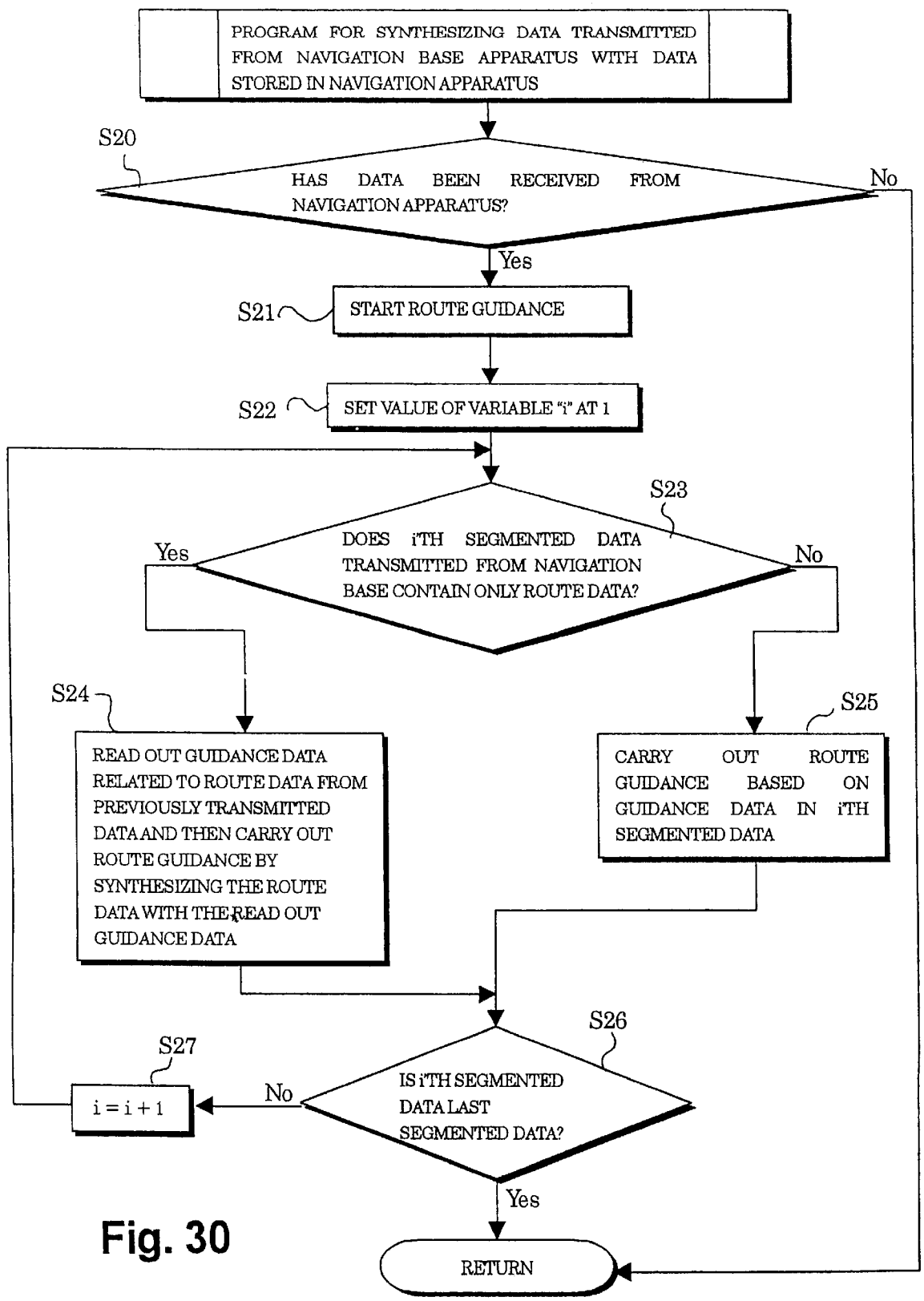
FIG. 30 is a flow chart showing a route/guidance data synthesizing process which is carried out in the navigation base apparatus.

Then, when the data synthesizing process has been carried out for all the segmented data included in the route/guidance information received from the navigation base apparatus 150 ("YES" judgement at Step S26), the program shown in FIG. 30 is ended.

Next, the process described above will be described in greater detail with reference to FIG. 29.

First, the segment SGA shown in FIG. 29 contains only route data (i.e., road number and intersection number). For this reason, the guidance data DA which was used in the past route guidance is synthesized with the route data in the segment SGA, as indicated by the arrow FA.

The guidance data DA contains display data and audio guidance data instructing the driver to "proceed straight through Intersection C00." In this regard, the recommended routes in FIG. 25 and FIG. 28 both proceed straight through the intersection C00. For this reason, the navigation apparatus 100 can carry out route guidance for the segment SGA using the guidance data which was transmitted to the navigation apparatus 100 in the past.

Next, as shown in FIG. 29, the segment SGB contains only route data in the same manner as the segment SGA. For this reason, the guidance data DB which was used in the passed route guidance is synthesized with the route data in the segment SGB, as indicated by the arrow FB.

Next, as shown in FIG. 29, the segment SGC contains both route data and guidance data. Accordingly, the guidance data contained in the segment SGC is used to carry out route guidance.

Namely, instead of proceeding straight through the intersection C10 in the past searched route shown in FIG. 25, in the newly searched route shown in FIG. 28, the driver should turn left at the intersection C10. For this reason, the newly transmitted guidance data contained in the segment SGC is used. This is also the same with the segments SGD and SGE.

Next, the segment SGF contains only route data. Therefore, the route data in the segment SGF is synthesized with guidance data DF stored in the data storage 103, as indicated by the arrow FF in FIG. 29. The guidance data DF contains display data and audio guidance data for the instruction "Proceed straight through Intersection C40." Namely, because both the newly recommended route shown in FIG. 28 and the passed recommended route shown in FIG. 25 pass straight through the intersection C40, the guidance data for the intersection C40 previously stored in the navigation apparatus 100 during the past route search can be used again for guidance through the intersection C40 on the newly searched recommended route shown in FIG. 29. Similarly, the route data of the segment SGG is synthesized with guidance data DG, as indicated by the arrow FG in FIG. 29.

As described above, in the communications navigation system according to the third embodiment of the present invention, the navigation apparatus 100 carries out route guidance by synthesizing guidance data that was previously transmitted to and stored in the navigation apparatus 100 during the past route search with route data in route/guidance data newly transmitted from the navigation base apparatus 150.

In this way, it is not necessary for the navigation base apparatus to transmit data that is the same as the data which was previously stored in the navigation apparatus 100. As a result, it becomes possible to reduce the amount of data to be transmitted to the navigation apparatus 100, which in turn makes it possible to shorten required communication time and thereby reduce communication cost.

Further, with the route/guidance data structure described above, it becomes possible to transmit the route/guidance information to the navigation apparatus 100 in the form of a plurality of blocks (segments).

Furthermore, by employing such method of transmitting the route/guidance information in the form of a plurality of segments, it becomes possible to reduce the amount of data to be retransmitted to the navigation apparatus 100 when an interruption or the like occurs in the communication line during data transmission.

Next, modifications to the communications navigation system according to the third embodiment will be described with reference to FIGS. 31 and 32.

In the third embodiment described above, using either the newly transmitted data or the previously transmitted data, it is possible to carry out route guidance is carried out for the entire of the searched route from the departure point to the destination thereof by displaying map images and outputting audio instructions.

However, actually, the driver of the vehicle does not always view the display of the navigation apparatus while driving. In most cases, the driver needs to have assistance of the navigation apparatus at the main points of the route such as intersections to be turned to right or left and the like. Thus, with regard to intersections through which the driver is to proceed straight, it is not necessary for the driver to make reference to the navigation apparatus.

This means that it is possible to carry out navigation if there is route data and map images only for the main points of the route at which guidance is needed, such as the intersections and forks where the driver is to turn right or left. Further, if the navigation base apparatus is adapted to transmit only such data necessary for guidance to the navigation apparatus, it becomes possible to considerably reduce the amount of data to be transmitted to the navigation apparatus.

Figure 27:
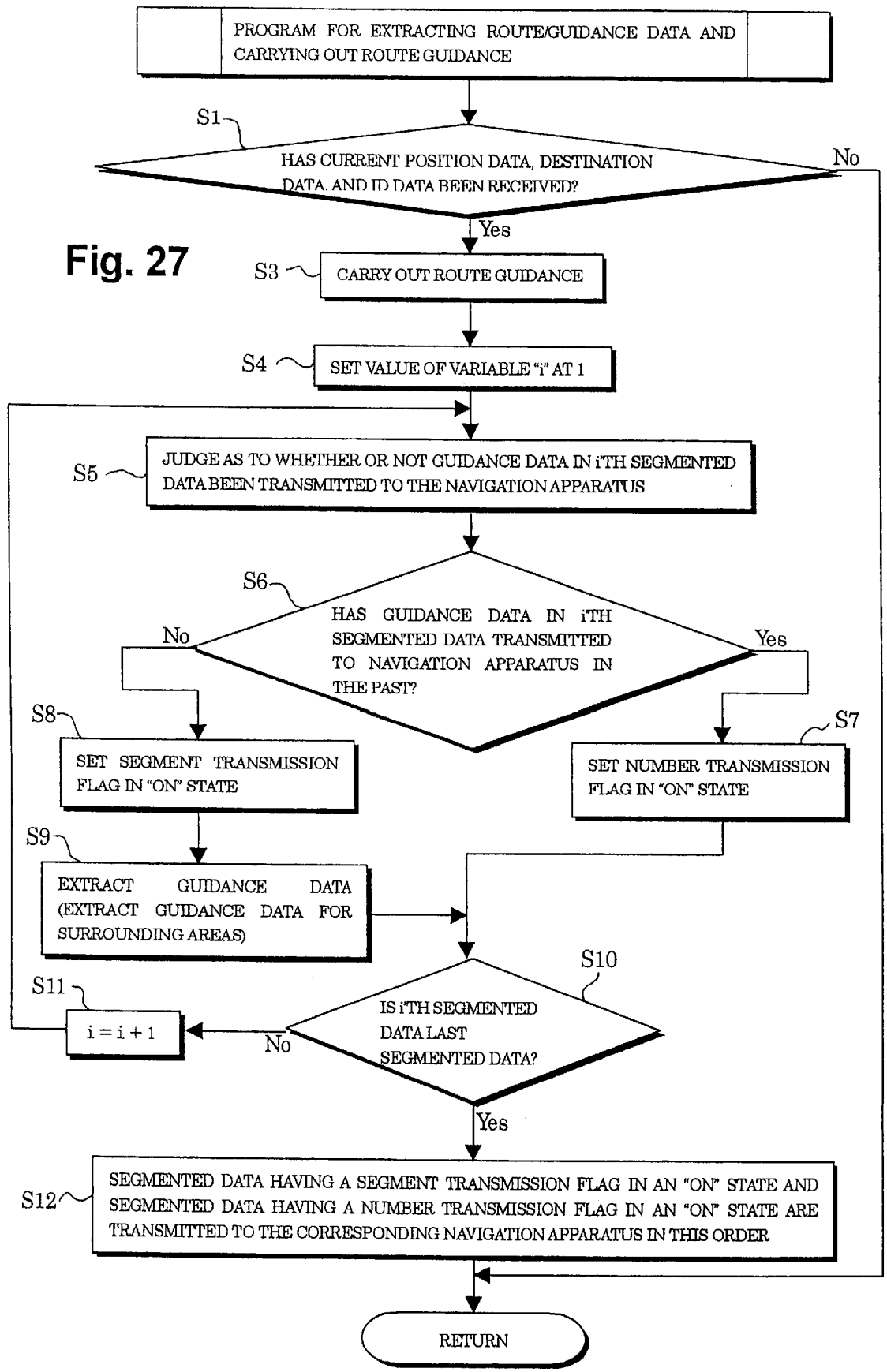
FIG. 27 is a flow chart showing processes for searching a recommended route and for extracting guidance data, which are carried out in the navigation base apparatus.
Figure 31:
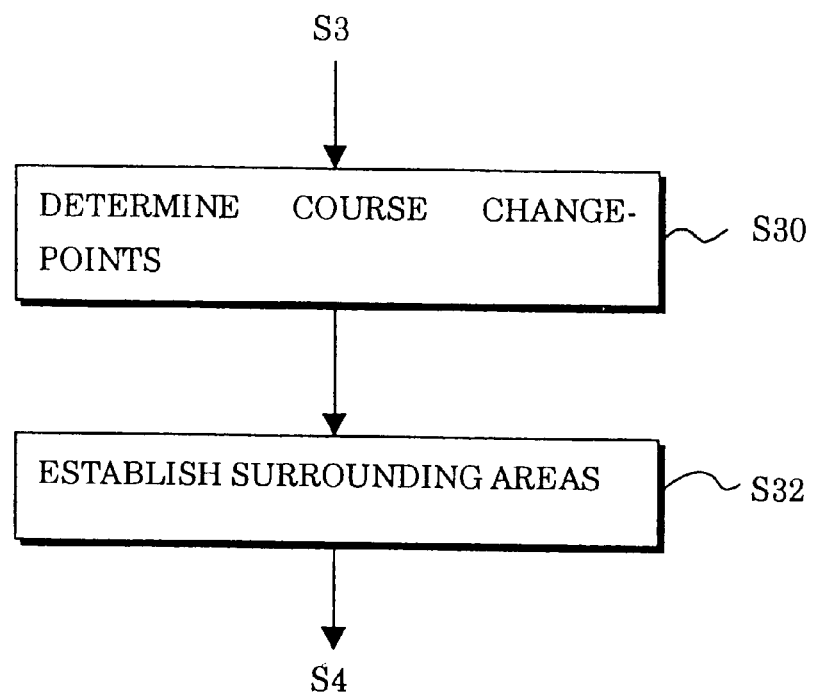
FIG. 31 is a flow chart showing a process for determining course change points and for establishing surrounding areas.

Therefore, in this modification, after Step S3 in FIG. 27, the process as shown in FIG. 31 is carried out. First, an intersection judgement process is carried out in the system control section 156 to determine as to whether or not the intersections on the searched route are course-change points. In this connection, the course-change points include intersections and forks at which vehicle should change a course, or at which vehicle should turn right or left.

The course-change point judgement is carried out for all intersections existing on the searched route by determining whether or not the path of the vehicle into and out of each intersection is a straight or gently curving path. Namely, when the angle between the road entering the intersection (entrance road) and the road exiting the intersection (exit road) is below a predetermined value, an intersection is judged to be a course-change point.

Figure 32:
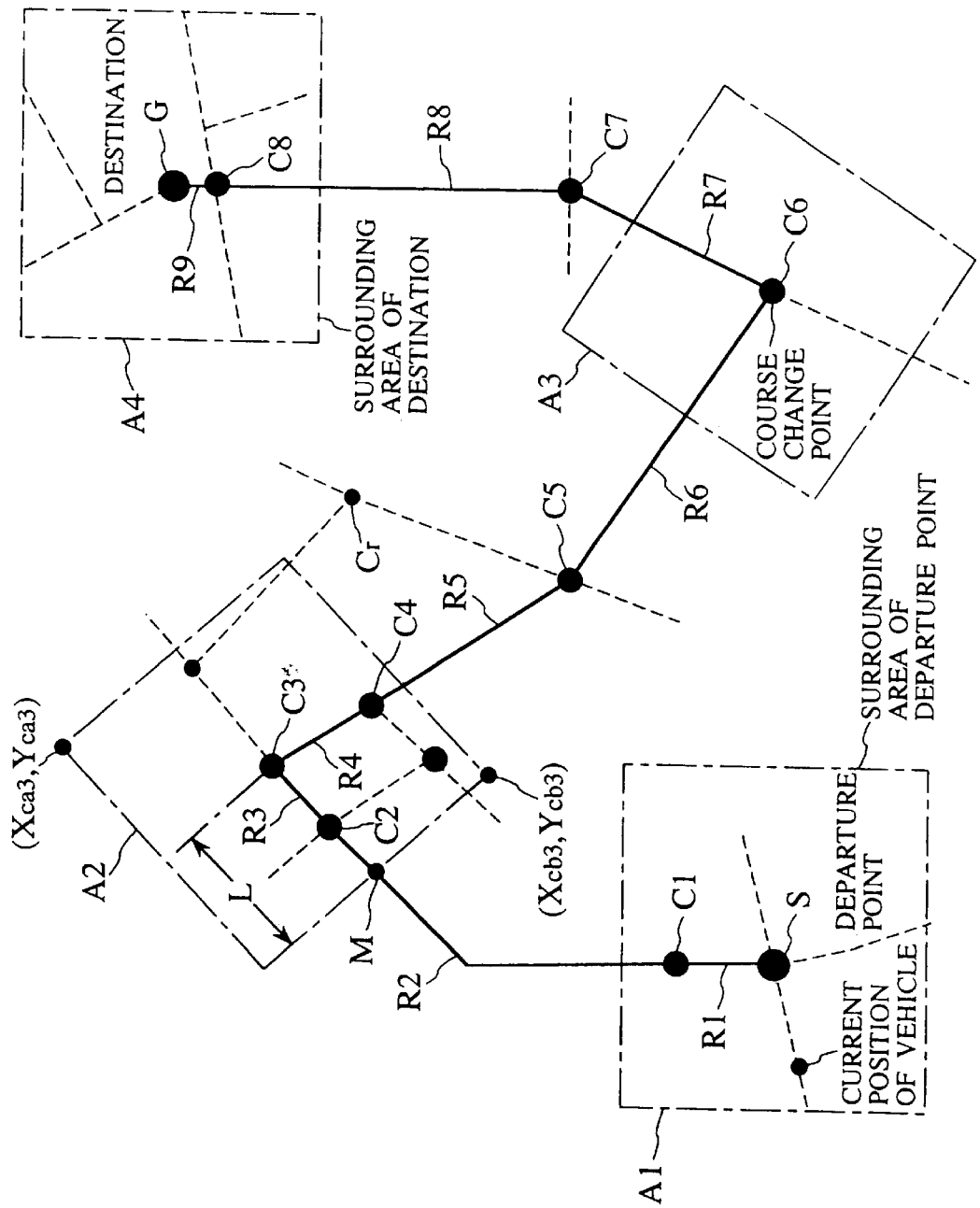
FIG. 32 is a schematic diagram showing a method of establishing a surrounding area around a course-change point.
Figure 33:
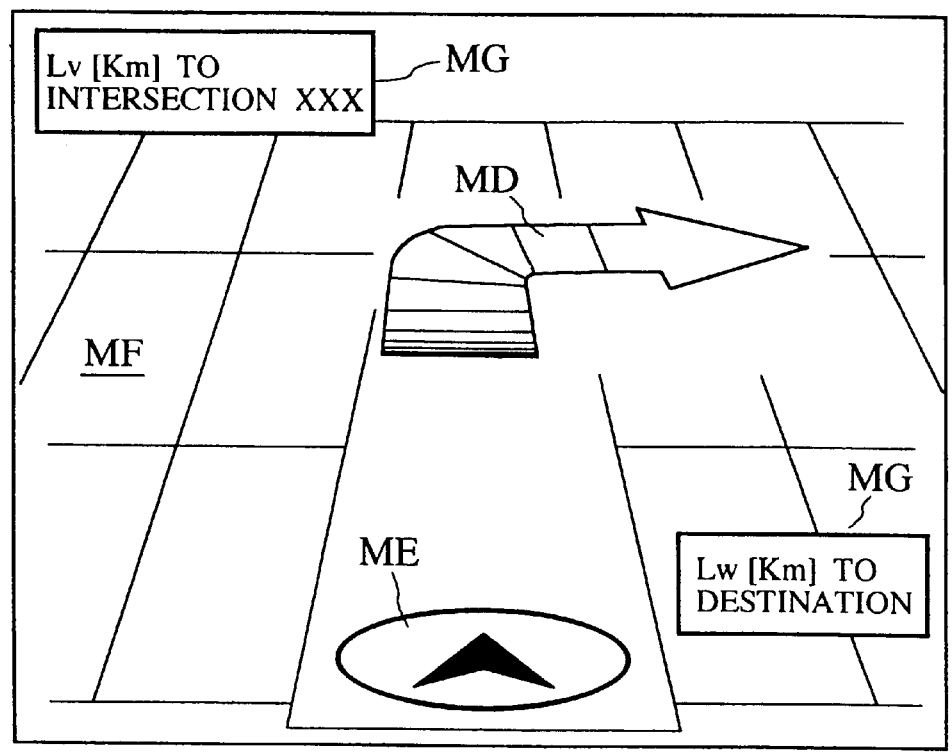
FIG. 33 is an illustration which shows an example of a displayed image in the navigation apparatus.

FIG. 32 shows a specific example of a searched route (indicated by the solid line), in which R1–R9 indicate the road numbers and C1–C8 indicate the intersection numbers, respectively. In this example, the intersections C3 and C6 are judged to be the course-change points. In this regard, none of the intersections C1, C2, C4, C5, C7 and C8 are judged to be course-change points because the searched route proceeds roughly straight through such intersections.

Next, for each course-change point, a predetermined area which includes the course-change point is established as the surrounding area by system control section 156. In the example shown in FIG. 32, a surrounding area A2 is established around the intersection C3 which is the course-change point. Further, a surrounding area A3 is also established around the intersection C6 which is the course-change point.

Now, in the case where the vehicle proceeds straight along a road, the absence of a map does not create any particular problems. However, because a course change such as turning right or left must be carried out at a course-change point, it is necessary to carry out guidance by displaying a map and landmarks and/or by outputting audio guidance. Therefore, for the area around the course change point, it is convenient if detailed route/guidance is carried out. For this reason, in this modification, the above-described surrounding area is established for the respective course change points.

Next, with reference to FIG. 32, a description will be given for a method of establishing a surrounding area around a course-change point.

The surrounding area is established, for example, around the course-change point so as to have an appropriate shape such as a circle or rectangle which extends forward the entrance road to the course-change point. In this regard, the surrounding area does not need to be centered around the course-change point. It is sufficient if the course-change point is contained anywhere in the surrounding area. In the case where a circular surrounding area is established, the simplest technique is to establish a circle having a diameter "d" [km] around the course-change point. However, a rectangular surrounding area is preferred in view of the fact that navigation apparatuses generally have a rectangular display.

In the case where such a rectangular surrounding area is established, it is necessary to determine the dimensions "n[km]×m[km]" of the rectangle and the directions of the respective sides thereof. For example, the surrounding area A2 (shown by the dashed line in FIG. 32) for the course-change point C3 is a square-shaped area having dimensions "n[km]×n[km]". The value of "n" which determines the size of the surrounding area A2 may be pre-established in a program of the system control section 152, or the value of "n" may be freely established at the navigation apparatus 100 and then transmitted to the navigation base apparatus 150. Either way, map matching (as described below) must be taken into account when establishing the value of "n". Further, in the case of a rectangular surrounding area, the value of "m" must be determined. The value of "m" may be determined, for example, by multiplying the value "n" by a prescribed coefficient.

Next, based on the value of "n", a square region having dimensions "n×n" is established around the course-change point at the intersection C3. Then, the square region is rotated around the intersection C3 so that the surrounding area is established at an appropriate position. For example, the square region around the intersection C3 shown in FIG. 32 is arranged so that one side of the surrounding area intersects the entrance road at an intersection point M in a direction that enables a line connecting the intersection point M and the intersection C3 to be orthogonal to such side. In other words, the square region is arranged so that the entrance road for the intersection C3 is orthogonal to one side of the surrounding area which intersects the entrance road. Further, this manner of establishing regions of the surrounding area takes into account the fact that maps in the navigation apparatus 100 (described below) are displayed on a rectangular screen in a heading up manner.

Further, in the system control section 152, diagonal positions (Xca3, Yca3), (Xcb3, Ycb3) of the square region "n×n" around the intersection C3 are determined by an appropriate method, and then such diagonal positions are used to establish the surrounding area A2. In this regard, the actual values of the diagonal positions (Xca3, Yca3), (Xcb3, Ycb3) are represented by geographic coordinates defined by Longitudinal and Latitude. Further, a similar process is carried out for the surrounding area A3 of the intersection C6.

In this regard, it is possible to previously establish surrounding areas for each intersection using a combination of its entrance road data and exit road data and then store guidance data for the respective established surrounding areas in the database 152 in the forms of a table. In this case, when any intersection is designated, corresponding area guidance data is read out from the surrounding area table. This way is advantageous in that that there is no need to carry out a calculation process to establish surrounding areas.

Further, if required, a surrounding area A1 is established around the departure point S and a surrounding area A4 is established around the destination G, respectively. For example, in the case where the departure point and destination are well known places, it is sufficient for a user (driver) to have guidance for only the areas around the course-change points on the route between the departure point and the destination. However, in the case where the driver is not clear about which direction to proceed at the departure point S. it is convenient for the driver if there is area guidance data for the departure point. Further, in the case of the destination G, it is convenient for the driver to have area guidance information on the presence or absence of parking and various facilities in the area around the destination.

After determining the course-change points and establishing the surrounding areas thereof according to the method described above, the process after Step 4 of FIG. 27 is executed. In this case, in Step 9, guidance data only for the surrounding area is extracted as indicated in the parentheses of Step S9.

In this modification, the navigation base apparatus 150 extracts route/guidance data for the surrounding area of the course-change points from which guidance data which was transmitted to the navigation apparatus 100 during the past route guidance is excluded. The navigation apparatus 100 carries out a route guidance by synthesizing newly transmitted route/guidance data for the surrounding area of the course-change point with the guidance data previously stored in the data storage 103. In this way, a detailed route guidance including landmarks and other information is displayed on the display 106, and audio guidance is outputted via the output section 107.

For the portions of the route other than the surrounding areas, a simple guidance is provided. The simple guidance provides a guidance screen image shown in FIG. 33 which includes an arrow MD for indicating the direction of travel; a mark ME for indicating the position of the vehicle; a landscape image MF; and distance information MG. In this regard, the arrow MD indicates the course change direction of the route at the next course-change point from the viewpoint of the vehicle position. Namely, in the example shown in FIG. 32, since the vehicle must be turned to the right at the course-change point that is the intersection C3, the direction of the arrow MD in FIG. 33 turns to the right. In this connection, the image data necessary for the above information (MD, ME, MF and MG) may be included in the route/guidance data to be transmitted from the navigation base apparatus 150 to the navigation apparatus 100, or such image data may be stored in the data storage 103 of the navigation apparatus 100 beforehand. Because the vehicle only needs to proceed along the current road, this simplified display does not create any inconvenience to the driver.

As described above, after a recommended route has been searched, the navigation base apparatus 150 of this modification determines course-change points and extracts route/guidance data for the surrounding areas including the course-change points. Then, the navigation base apparatus 150 transmits the route/guidance data such as map data or audio guidance data for the surrounding areas except for the guidance data which was transmitted to the navigation apparatus 100 during the past route guidance. At the navigation apparatus 100, the newly transmitted route/guidance data is synthesized with the guidance data previously stored in the data storage 103 so that a detailed guidance is carried out for the surrounding area. In this way, because the navigation base apparatus 150 transmits only necessary route/guidance data to the navigation apparatus 100, it becomes possible to reduce the amount of data to be transmitted from the navigation base apparatus 150 to the navigation apparatus 100. As a result, the navigation apparatus 100 can be simplified since a memory capacity can be reduced. Further, it is possible to carry out sufficient route guidance irrespective of the reduced amount of the data.

It should be noted that many modifications and additions can be made to the communication navigation system according to the third embodiment of the present invention. Examples of the modifications include the followings.

(1) In the modification of the third embodiment, the transmitted data is stored in the navigation base apparatus 100, and a newly searched route data is compared with the previously transmitted route/guidance data in the navigation base apparatus 150 when determining route/guidance data to be transmitted to the navigation apparatus 100. However, it is also possible to transmit the received route/guidance data to the navigation base apparatus 150 upon a request from the navigation base apparatus 100. At the navigation base apparatus 150, a judgement is made to determined as to whether which data should be transmitted to the navigation apparatus 100 based on the route/guidance data transmitted from the navigation apparatus 100. In such a case, it is not necessary for the navigation base apparatus 150 to have the route/guidance data which have already transmitted to the respective navigation apparatuses 100.

(2) In the third embodiment, the data synthesizing process is carried out when all of the route/guidance data is received from the navigation base apparatus 150. However, such synthesizing process can be carried out each time upon receipt of the segmented data or after all the segmented data have been received.

(3) When transmitting route/guidance data from the navigation base apparatus 150 to the navigation apparatus 100, the number of the segments contained in the searched route may be in advance transmitted to the navigation apparatus 100. In this way, if an interruption occurs during the data transmission of the route/guidance data, the navigation base apparatus 150 can determine which segmented data needs to be retransmitted when communication is re-established.

(4) In the third embodiment described above, the route/guidance data obtained from the navigation base apparatus in the previous route search, that is just preceding route search, is synthesized with the route/guidance data obtained in the new route search. However, in the present invention, it is also possible to synthesize the route/guidance data which were obtained in the two or more times before the new route search with the route/guidance data for the newly searched route if the storage capacity at the navigation apparatus allows to do so.

Further, it is also possible for the navigation apparatus to have one or more types of guidance data associated with all routes. For example, the navigation apparatus stores large size image data such as landmark data, view data and map data associated with all routes at its storage device. In this case, it is preferred the navigation apparatus is equipped with large capacity storage medium such as CD-ROM or DVD-ROM which stores such landmark data, view data and map data. According to this modification, the navigation center apparatus transmits only the route data for the searched route to the navigation apparatus, and at the navigation apparatus the transmitted route data is synthesized with the guidance data described above stored in the storage device of the navigation apparatus to produce synthesized route/guidance data for the searched route, and then, route guidance is carried out using the synthesized route/guidance data. In this way, it becomes possible to further reduce the amount of data to be transmitted from the navigation center apparatus to the navigation apparatus.

(5) The navigation apparatus 100 may be constructed so as to have guidance data for a specified area. For example, when used in Japan, the navigation apparatus can store guidance data for the Kanto area, and the route/guidance data for other area is obtained from the navigation base apparatus 150.

(6) The road data, intersection data and guidance data used in the third embodiment can be modified as needed, and the format of such data can be also modified as needed.

(7) In the third embodiment described above, each segmented data is formed from a combination of a road and an intersection. However, each segmented data may be formed from any appropriate combination of data so long as guidance can be carried out with the data. For example, segmented data may contain only roads or only intersections.

(8) In the third embodiment, this invention is applied to a vehicle, but this invention is applicable to other moving bodies such a portable mobile terminals.

The communications navigation system according to the third embodiment of the present invention makes it possible to achieve the effects described below.

(1) Since route guidance is carried out using route/guidance data obtained by synthesizing the data transmitted from the navigation base apparatus 150 with the previously transmitted data stored in the navigation apparatus 100, it is possible to prevent the navigation base apparatus 150 from transmitting unnecessary data (overlapped data) to the navigation apparatus 100. As a result, it becomes possible to reduce the amount of data to be transmitted to the navigation apparatus 100, and this in turn makes it possible to shorten communication time and thereby reduce communication cost. Further, although the amount of the data transmitted from the navigation base apparatus is reduced, it is possible to carry out sufficient route guidance using the synthesized data.

(2) Further, in this embodiment, the route/guidance data is transmitted from the navigation base apparatus 150 in the form of the segmented data each containing the minimum amount of data necessary for guidance. Therefore, even if transmission of the route/guidance data is interrupted during the data transmission, it is sufficient to re-transmit the route/guidance data of the segments starting from the segment of which data transmission, and it is not necessary to re-transmit the route/guidance data of all the segments. Further, before the interrupted communication is re-established, it is possible to continue route guidance using the route/guidance data which has been received before the interruption of the communication.

(3) Further, in the modification described above, detailed route/guidance is carried out only for the surrounding areas around the course-change points, thereby enabling to further reduce the amount of the data transmitted from the navigation base apparatus to the navigation apparatus. In this case, since the driver (user) can have detailed route/guidance data for the course-change points which are main portions on the searched route, sufficient route guidance can be carried out irrespective of the reduced amount of the data transmitted from the navigation base apparatus to the navigation apparatus.

What is claimed is:

1. A communications navigation system in which data communications are transmitted and received between a navigation base apparatus provided at a navigation base and each of a plurality of navigation apparatuses provided in moving bodies such as vehicles,
   wherein at least one navigation apparatus of the plurality of the navigation apparatuses includes:
   (a) transmitting means for transmitting, to the navigation base apparatus, at least current position data for a current position of one moving body on which the one navigation apparatus is mounted, destination data indicating a destination thereof and identification data identifying the one navigation apparatus,
   (b) receiving means for receiving data from the navigation base apparatus, and
   (c) route guidance means for providing route guidance using the data received from the navigation base apparatus; and
   wherein the navigation base apparatus includes:
   (a) route/guidance information storage means which stores route/guidance information therein;
   (b) route search means for searching to determine a recommended route based on the current position data and the destination data received from the one navigation apparatus;
   (c) determination means for determining, based on the identification data received from the one navigation apparatus, necessary route/guidance information that a user of the one navigation apparatus needs to have with regard to the recommended route,
   wherein the navigation base apparatus extracts route/guidance data corresponding to the necessary route/guidance information determined by the determination means from the route/guidance information stored in the route/guidance information storage means, and then transmits the extracted route/guidance data to the navigation apparatus identified by the identification data; and
   segmented data producing means for producing segmented data by dividing the extracted route/guidance data geographically into a plurality of data segments which link together geographically in series along the recommended route, for transmission of the extracted route/guidance data in the form of said plurality of data segments to the one navigation apparatus, each data segment containing route/guidance data for a geographical part of the recommended route and being independently usable in the one navigation apparatus for route guidance.

2. The communications navigation system as claimed in claim 1, wherein the determination means of the navigation base apparatus includes user information storage means which stores:
   items of identification information identifying the respective navigation apparatuses and
   user's information for determining the necessary route/guidance information for respective users of the plurality of the navigation apparatuses, each item of identification information being associated in storage with user's information for a user of the one navigation apparatus identified by the item of identification information,
   wherein the determination means determines the necessary route/guidance information for the respective user by referring to the user's information stored in the user information storage means.

3. The communications navigation system as claimed in claim 1, wherein said at least one navigation apparatus further includes data storage means for storing predetermined route/guidance data, data integrating means for integrating the route/guidance data received from the navigation base apparatus with the predetermined route/guidance data stored in the data storage means, and wherein the route guidance means provides the route guidance using the integrated route/guidance data.

4. The communications navigation system as claimed in claim 1, wherein the navigation base apparatus transmits to the one navigation apparatus the plurality of data segments sequentially in an order beginning with a data segment for that portion of the recommended route which is closest to the one moving body.

5. The communications navigation system as claimed in claim 1, wherein the navigation base apparatus checks to determine whether or not each data segment is successfully transmitted from the navigation base apparatus to the one navigation apparatus and when the navigation base apparatus determines that a data segment has not been successfully transmitted to the one navigation apparatus, the navigation base apparatus retries to transmit that data segment determined not to have been successfully transmitted.

6. The communications navigation system as claimed in claim 1, wherein responsive to completion of reception of at least one data segment from the navigation base apparatus, said route guidance means provides guidance for a part of the recommended route corresponding to the received at least one data segment.

7. The communications navigation system as claimed in claim 1, wherein the navigation base apparatus performs data compression for each data segment before transmission of that data segment to the one navigation apparatus.

8. A communications navigation system in which data communications are transmitted and received between a navigation base apparatus provided at a navigation base and each of a plurality of navigation apparatuses provided in moving bodies such as vehicles, wherein at least one navigation apparatus of the plurality of the navigation apparatuses includes:
  (a) transmitting means for transmitting, to the navigation base apparatus, at least current position data for a current position of one moving body on which the one navigation apparatus is mounted, destination data indicating a destination thereof and identification data identifying the one navigation apparatus;
  (b) receiving means for receiving data from the navigation base apparatus, and
  (c) route guidance means for providing route guidance using the data received from the navigation base apparatus; and wherein the navigation base apparatus includes:
  (a) route/guidance information storage means which stores route/guidance information therein;
  (b) route search means for searching to determine a recommended route based on the current position data and the destination data received from the one navigation apparatus; and
  (c) determination means for determining, based on the identification data received from the one navigation apparatus, necessary route/guidance information that a user of the one navigation apparatus needs to have with regard to the recommended route,
  said determination means comprising:
    (i) user information storage means which stores items of identification information identifying the respective navigation apparatuses and user's information for determining the necessary route/guidance information for respective users of the plurality of the navigation apparatuses, each item of identification information being associated in storage with user's information for a user of the navigation apparatus identified by the item of identification information; and
    (ii) untraveled route portion determining means for determining an untraveled route portion which is a part of the recommended route on which the one moving body has not yet traveled, based on the user's information stored in the user's information storage means;
  (d) extracting means for extracting only route/guidance data for the untraveled route portion determined by the untraveled route portion determining means from the route/guidance information stored in the route/guidance information storage means as the necessary route/guidance information; and
  (e) transmitting means for transmitting the extracted route/guidance data to the one navigation apparatus identified by the identification data.

9. The communications navigation system as claimed in claim 8, wherein the navigation base apparatus divides the route/guidance data for the untraveled route portion into a plurality of segments for transmitting to the one navigation apparatus.

10. The communications navigation system as claimed in claim 8, wherein the user information storage means includes traveled route information storage means which stores information concerning traveled routes that the one moving body has traveled in the past, the information concerning the traveled routes being stored as the user's information, wherein the untraveled route portion determining means determines the untraveled route portion by comparing the traveled route information stored in the traveled route information storage means with the recommended route.

11. The communications navigation system as claimed in claim 10, wherein the navigation base apparatus produces the traveled route information based on route/guidance data that has been transmitted from the navigation base apparatus to the navigation apparatus in the past.

12. The communications navigation system as claimed in claim 10, wherein the navigation base apparatus produces the traveled route information based on route information which has been received from the navigation apparatus, the traveled route information including information concerning all routes that the one moving body has ever traveled.

13. The communications navigation system as claimed in claim 10, wherein the untraveled route portion determining means determines a portion of the recommended route as the untraveled route portion only in the case where the traveled route information shows that the moving body has not yet traveled on the portion of the recommended route more than a predetermined number of times.

14. The communications navigation system as claimed in claim 10, wherein the navigation apparatus further includes:
  data storage means for storing predetermined route/guidance data; and
  data integrating means for integrating the route/guidance data received from the navigation base apparatus with the predetermined route/guidance data stored in the data storage means, said route guidance means providing the route guidance using the integrated route/guidance data produced by the data integrating means.

15. A communications navigation system in which data communications are transmitted and received between a navigation base apparatus provided at a navigation base and each of a plurality of navigation apparatuses provided in moving bodies such as vehicles, wherein at least one navigation apparatus of the plurality of the navigation apparatuses includes:
  (a) transmitting means for transmitting, to the navigation base apparatus, at least current position data for a current position of the one moving body on which the one navigation apparatus is mounted, destination data indicating a destination thereof and identification data identifying the one navigation apparatus;
  (b) receiving means for receiving data from the navigation base apparatus and
  (c) route guidance means for providing route guidance using data received from the navigation base apparatus, and wherein the navigation base apparatus includes:
  (a) route/guidance information storage means which stores route/guidance information therein;
  (b) route search means for searching to determine a recommended route based on the current position data and the destination data received from the navigation apparatus;
(c) extracting means for extracting route/guidance data for the recommended route produced by the route search means, the route guidance data being used by the route guidance means in the navigation apparatus to provide the route guidance to a user of the one navigation apparatus; and
(d) segmented data producing means for dividing the extracted route/guidance data geographically into a plurality of data segments which link together geographically in series along the recommended route, each of said data segments containing route/guidance data for a geographical part of the recommended route which is specified by a road number or road name;
wherein the navigation base apparatus transmits the route/guidance data in the form of said plurality of data segments to the one navigation apparatus identified by the identification data, in which each data segment is independently utilizable by said route guidance means navigation apparatus to provide the route guidance.

16. The communications navigation system as claimed in claim 15, wherein the navigation base apparatus transmits to the one navigation apparatus the plurality of data segments sequentially in an order beginning with a data segment for that portion of the recommended route which is closest to the one moving body.

17. The communications navigation system as claimed in claim 15, wherein the navigation base apparatus checks to determine whether or not each data segment is successfully transmitted from the navigation base apparatus to the one navigation apparatus and when the navigation base apparatus determines that a data segment has not been successfully transmitted to the one navigation apparatus, the navigation base apparatus retries to transmit that data segment determined not to have been successfully transmitted.

18. The communications navigation system as claimed in claim 15, wherein responsive to completion of reception of at least one data segment from the navigation base apparatus, said route guidance means provides guidance for a part of the recommended route corresponding to the received at least one data segment.

19. The communications navigation system as claimed in claim 15, wherein the navigation base apparatus performs data compression for each data segment before transmission of that data segment to the one navigation apparatus.

20. A communications navigation system in which data communications are transmitted and received between a navigation base apparatus provided at a navigation base and each of a plurality of navigation apparatuses provided in moving bodies such as vehicles, wherein
at least one navigation apparatus of the plurality of the navigation apparatuses includes:
(a) transmitting means for transmitting, to the navigation base apparatus, at least current position data for a current position of the one moving body on which the one navigation apparatus is mounted, destination data indicating a destination thereof and identification data identifying the one navigation apparatus; and
(b) receiving means for receiving data from the navigation base apparatus; and
(c) route guidance means for providing route guidance using data received from the navigation base apparatus,
and wherein the navigation base apparatus includes:
(a) route/guidance information storage means which stores route/guidance information therein;
(b) route search means for searching to determine a recommended route based on the current position data and the destination data received from the navigation apparatus;
(c) extracting means for extracting route/guidance data for the recommended route produced by the route search means, the route guidance data being used by the route guidance means in the navigation apparatus to provide the route guidance to a user of the one navigation apparatus; and
(d) segmented data producing means for dividing the extracted route/guidance data geographically into a plurality of data segments which link together geographically along the recommended route, each data segment containing route/guidance data for a geographical part of the recommended route which is defined by two adjacent intersections;
wherein the navigation base apparatus transmits the route/guidance data in the form of said plurality of segments to the one navigation apparatus identified by the identification data in which each data segment is independently used by the route guidance means to provide the route guidance.

21. The communications navigation system as claimed in claim 20, wherein the navigation base apparatus transmits to the one navigation apparatus the plurality of data segments sequentially in an order beginning with a data segment for that portion of the recommended route which is closest to the one moving body.

22. The communications navigation system as claimed in claim 20, wherein the navigation base apparatus checks to determine whether or not each data segment is successfully transmitted from the navigation base apparatus to the one navigation apparatus and when the navigation base apparatus determines that a data segment has not been successfully transmitted to the one navigation apparatus, the navigation base apparatus retries to transmit that data segment determined not to have been successfully transmitted.

23. The communications navigation system as claimed in claim 20, wherein responsive to completion of reception of at least one data segment from the navigation base apparatus, said route guidance means provides guidance for a part of the recommended route corresponding to the received at least one data segment.

24. The communications navigation system as claimed in claim 20, wherein the navigation base apparatus performs data compression for each data segment before transmission of that data segment to the one navigation apparatus.

* * * * *